United States Patent [19]
Dickinson et al.

[11] Patent Number: 4,471,459
[45] Date of Patent: Sep. 11, 1984

[54] DIGITAL DATA PROCESSING METHOD AND MEANS FOR WORD CLASSIFICATION BY PATTERN ANALYSIS

[75] Inventors: Robert V. Dickinson, Westport; Louis M. Galie, Sandy Hook, both of Conn.

[73] Assignee: System Development Corp., Santa Monica, Calif.

[21] Appl. No.: 307,631

[22] Filed: Sep. 30, 1981

[51] Int. Cl.³ .................... G06F 15/20; G06F 15/21
[52] U.S. Cl. .................................. 364/900; 364/419
[58] Field of Search ................. 364/200, 900, 419

[56] References Cited

U.S. PATENT DOCUMENTS

| | | | |
|---|---|---|---|
| 3,648,249 | 3/1972 | Goldsberry | 364/900 |
| 3,707,725 | 12/1972 | Dellheim | 364/200 |
| 4,092,729 | 5/1978 | Rosenbaum et al. | 364/900 |
| 4,158,236 | 6/1979 | Levy | 364/900 |
| 4,159,536 | 6/1979 | Keloo et al. | 364/900 |

OTHER PUBLICATIONS

Morgan, "Spelling Corrections in Systems Programs", Communication of the ACM, vol. 13, No. 2, 2/70–pp. 90–94.
Damerau, "A Technique for Computer Detection and Correction of Spelling Errors", Communication of the ACM, vol. 17, No. 3, 3/64, pp. 171–176.
"Computer Programs for Detecting and Correcting Spelling Errors", Communication of the ACM, vol. 23, No. 12, 12/80.
Alberga, "String Similarity and Misspellings", Communication of the ACM, vol. 10, No. 5, 5/67–pp. 302–313.
Speedcop; Task B2, Automatic Correction of Misspellings, by Joseph J. Pollock, May, 1981, pp. 1–62.
The String-to-String Correction Problem, by Robert A. Wagner and Michael J. Fischer, Journal of the Association for Computing Machinery (1974), vol. 21, pp. 168–173.
An Extension of the String-to-String Correction Problem, by Roy Lowrance and Robert A. Wagner, Journal of the Association for Computing Machinery (1975), vol. 22, pp. 177–183.
A Binary n-Gram Technique for Automatic Correction of Substitution, Deletion, Insertion and Reversal Errors in Words, by J. R. Ullmann, The Computer Journal (1977), vol. 20, pp. 141–147.

*Primary Examiner*—Jerry Smith
*Assistant Examiner*—Michael R. Fleming
*Attorney, Agent, or Firm*—Christie, Parker & Hale

[57] ABSTRACT

Digital data processing means employing a method for separating acceptable spellings of words from nonacceptable spellings wherein each word comprises characters assigned positions. The character positions in each word are assigned increasing values from one end of the word to the other, positions of the same number of characters from the same end of each word being assigned the same value. Two words to be compared are called a query word and a candidate word. The method includes the following steps. A representation of a character in a given position of the query word is compared with representations of characters in the next lower position, the same position, and the next higher position in the candidate word and a compare type indication is formed representing a match or a mismatch between each query word character and the candidate word characters under comparison. The given position of the query word under comparison is changed to the next higher valued position of the query word and the preceding step is repeated to form another compare type indication. The compare type indications are processed to thereby form a spelling classification indication for one of the words under comparison representing an acceptable spelling or a nonacceptable spelling with respect to the other.

31 Claims, 43 Drawing Figures

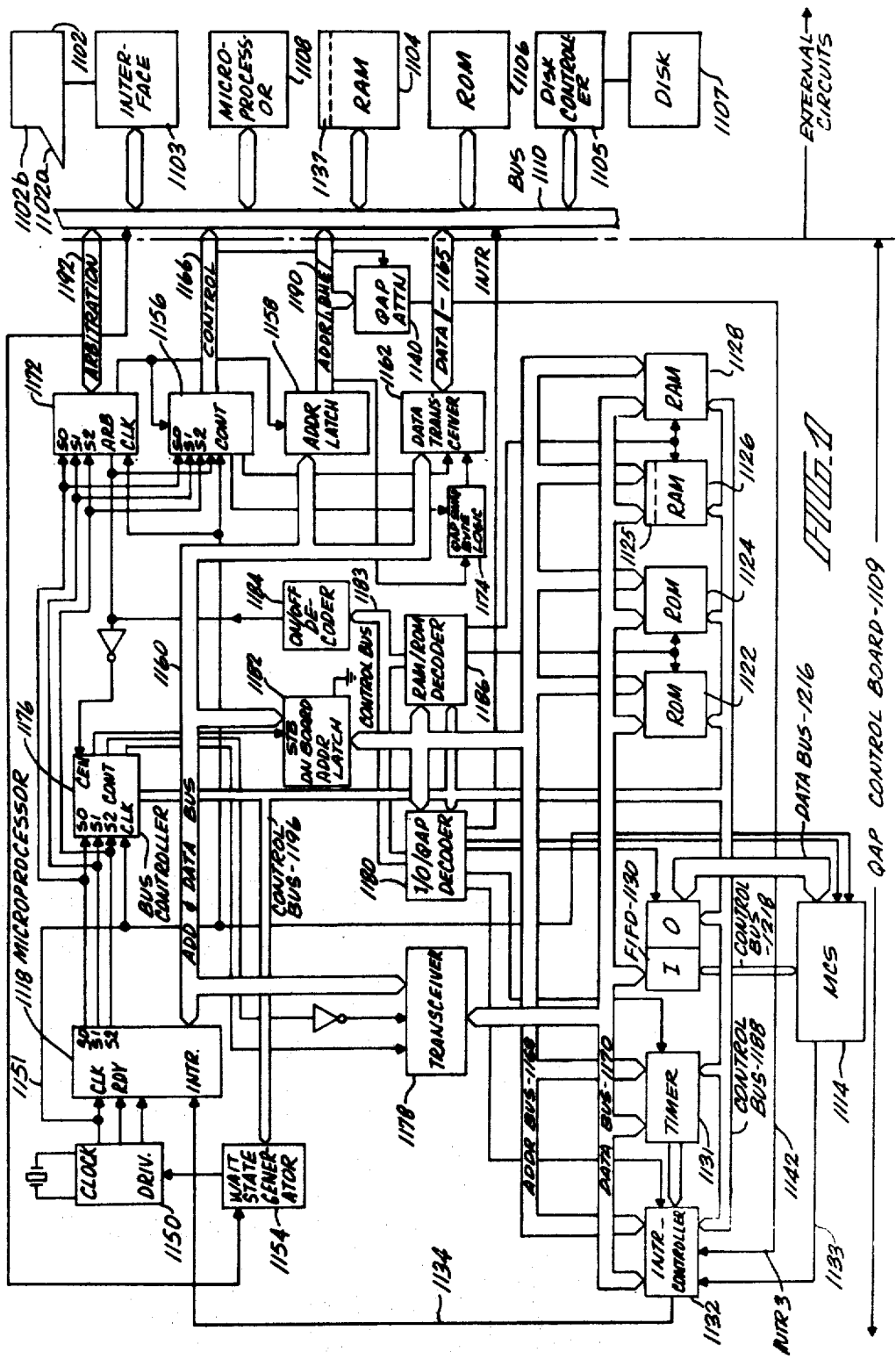

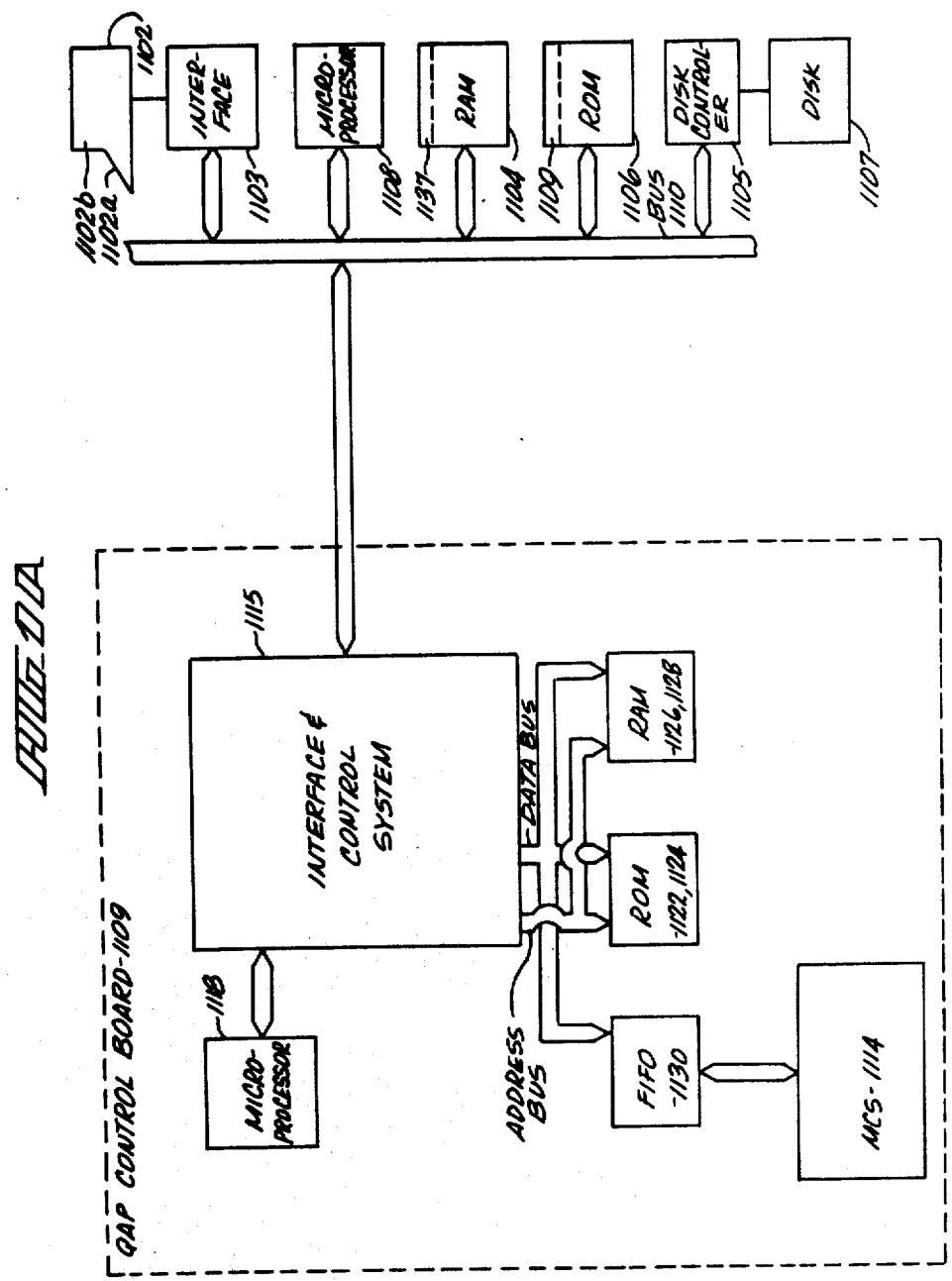

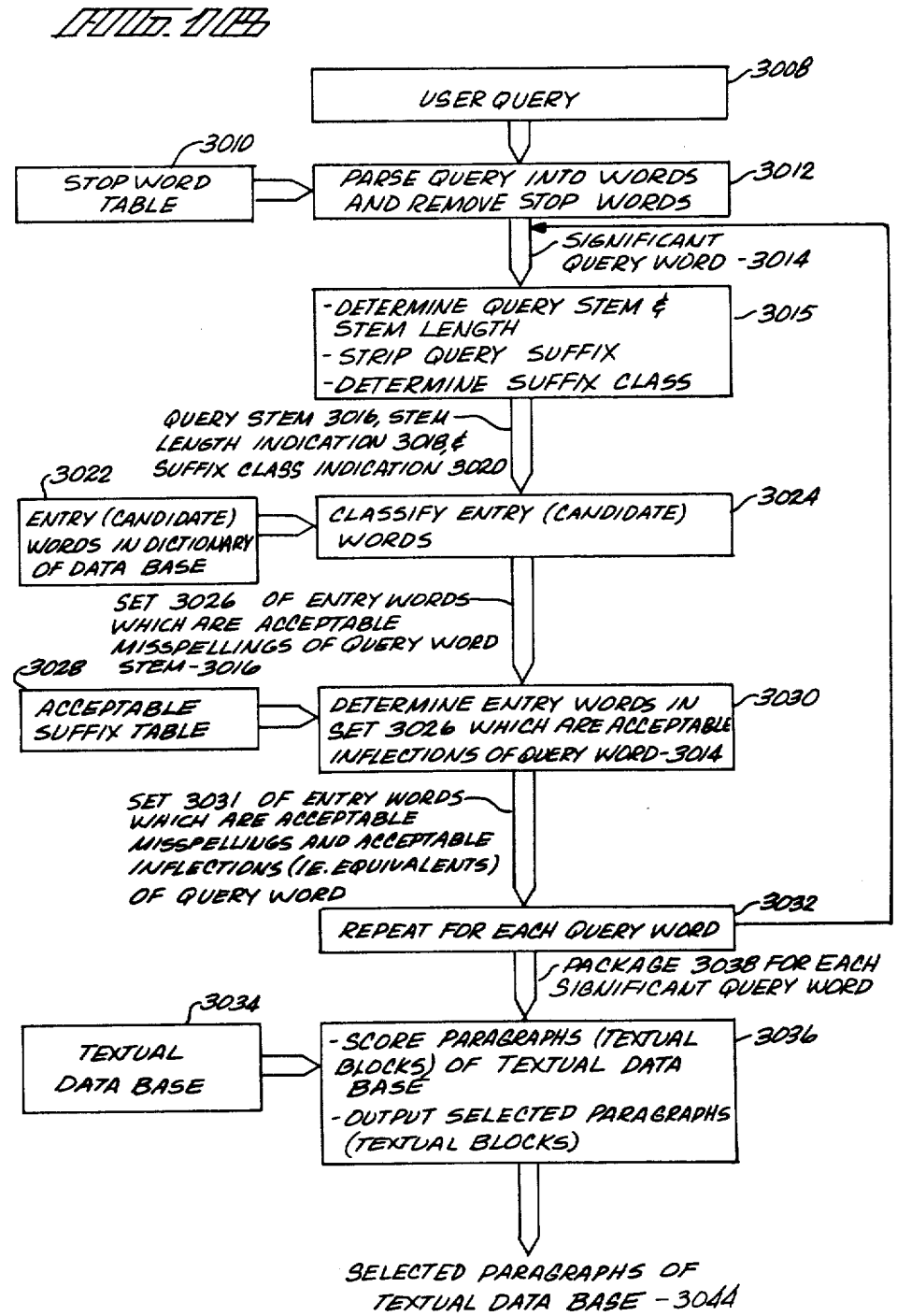

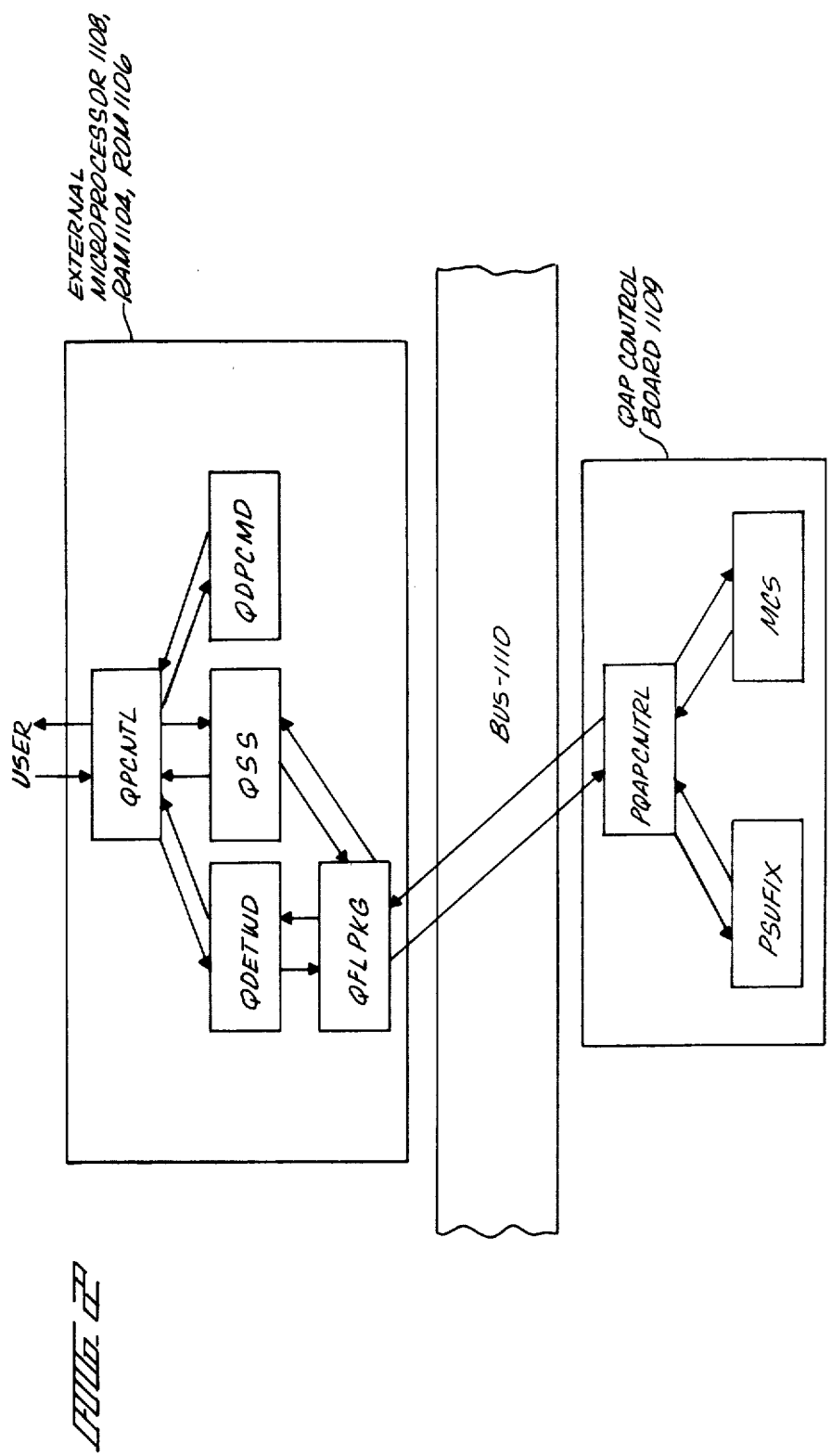

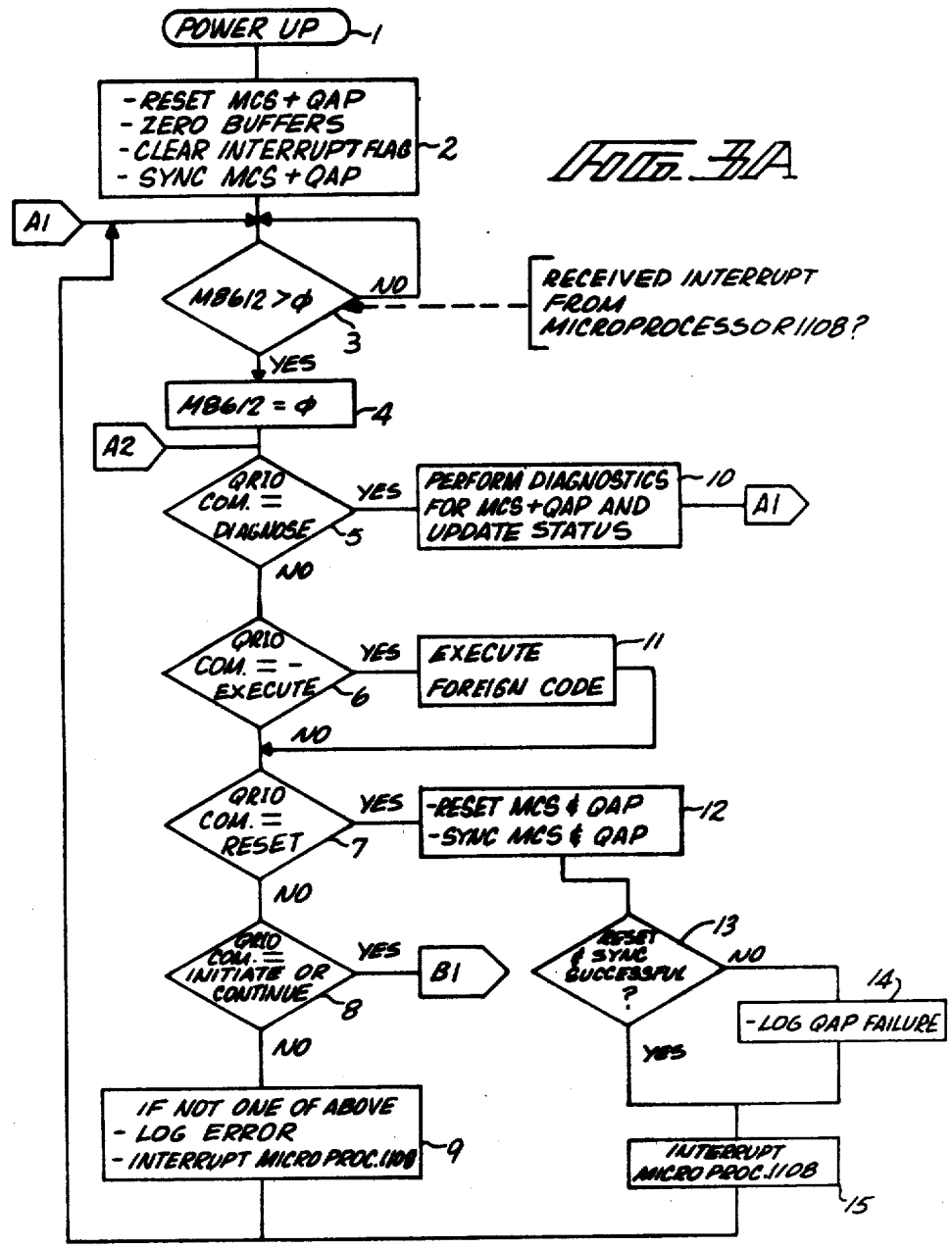

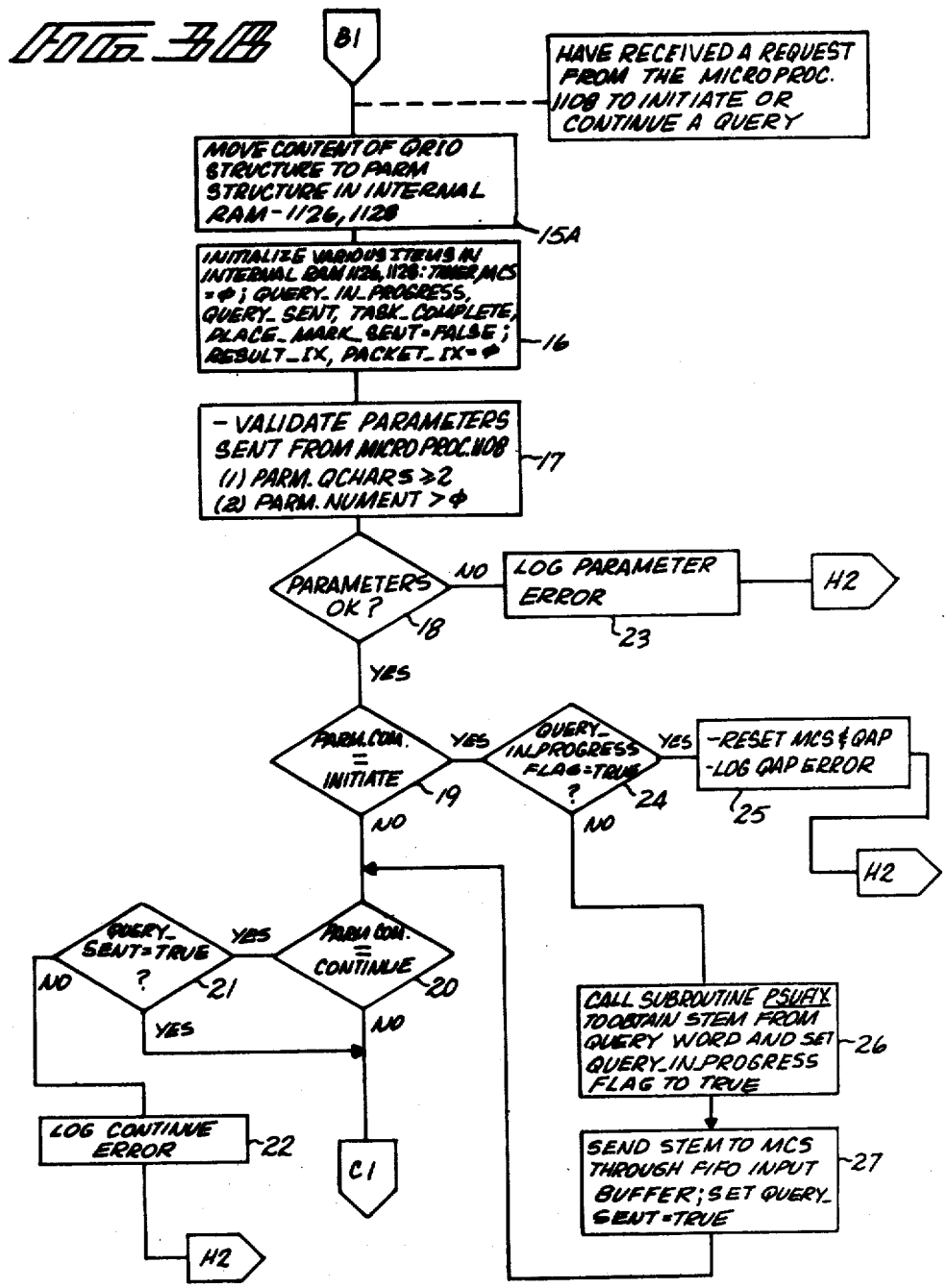

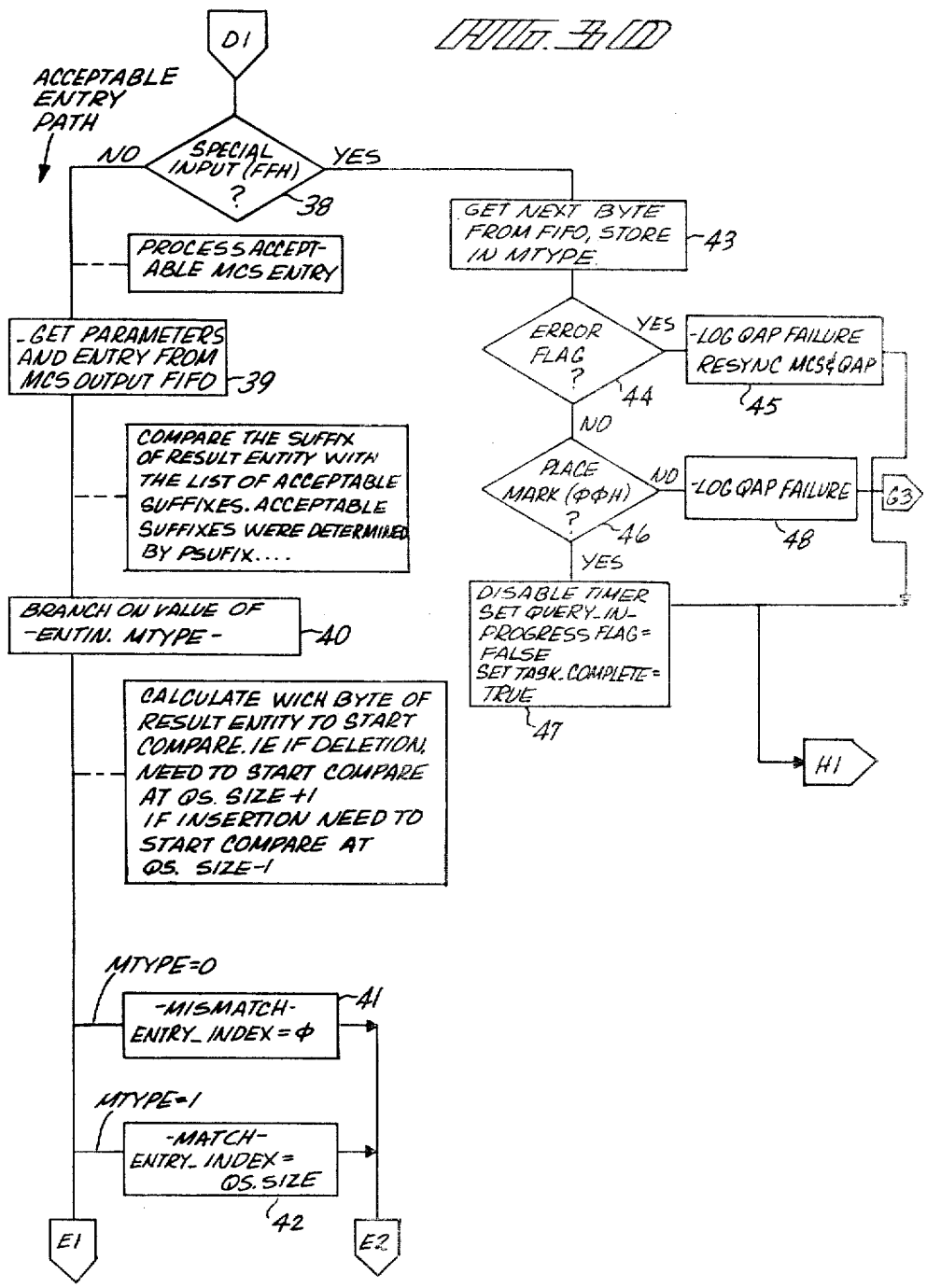

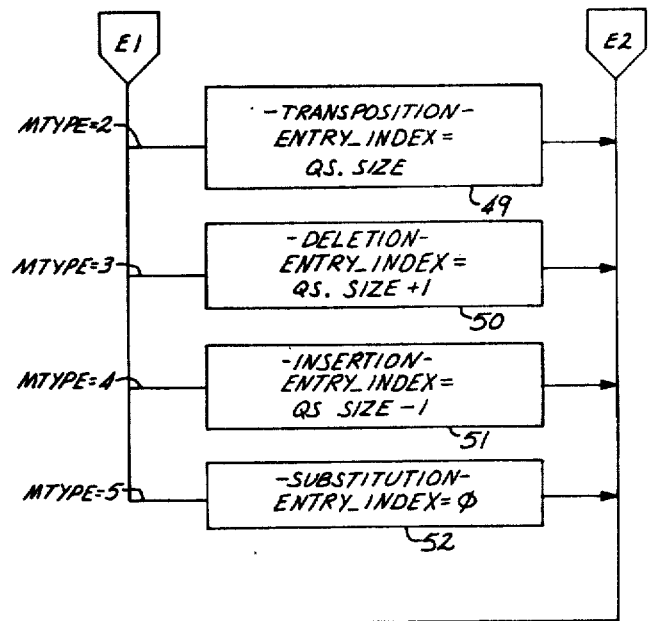
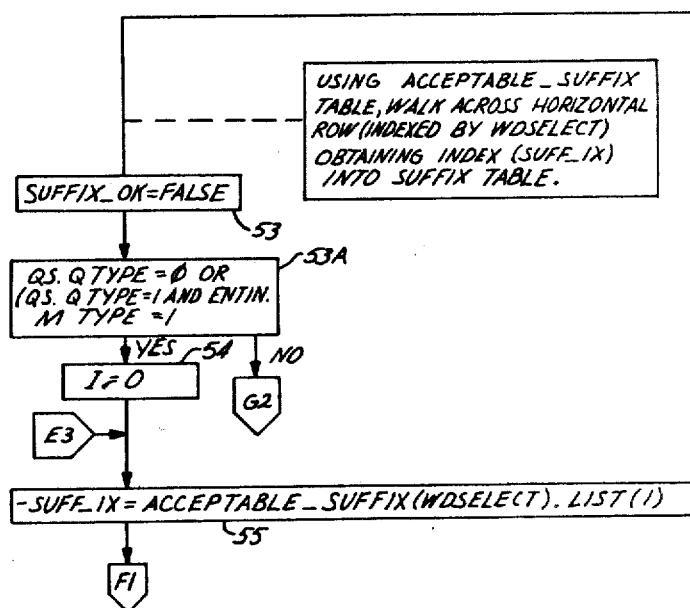

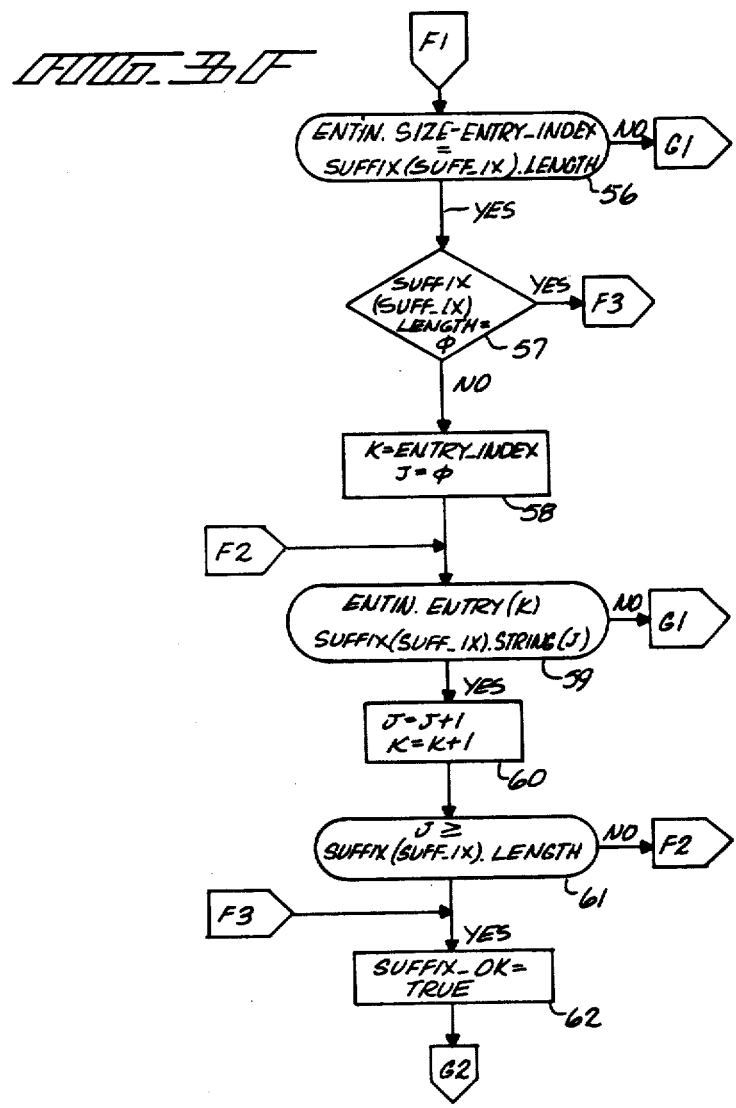

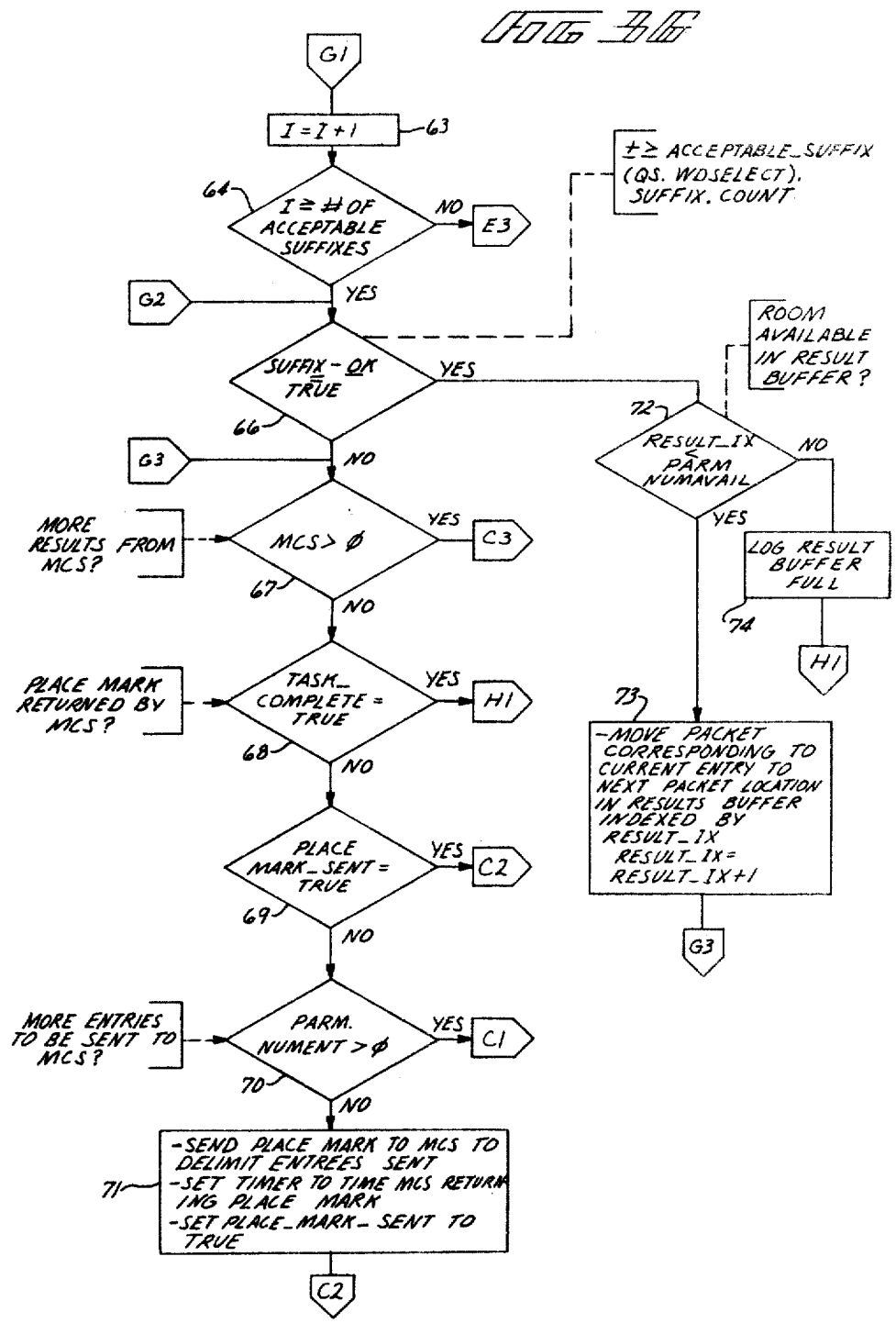

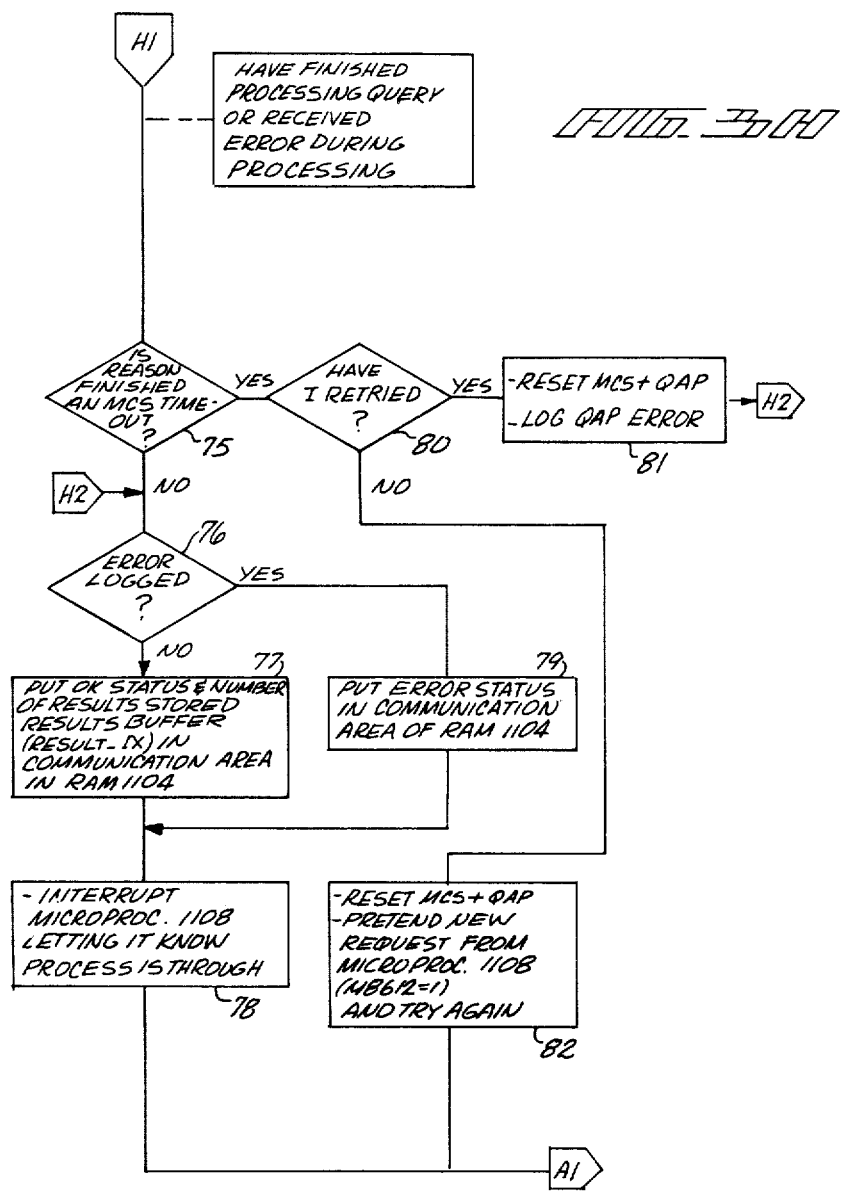

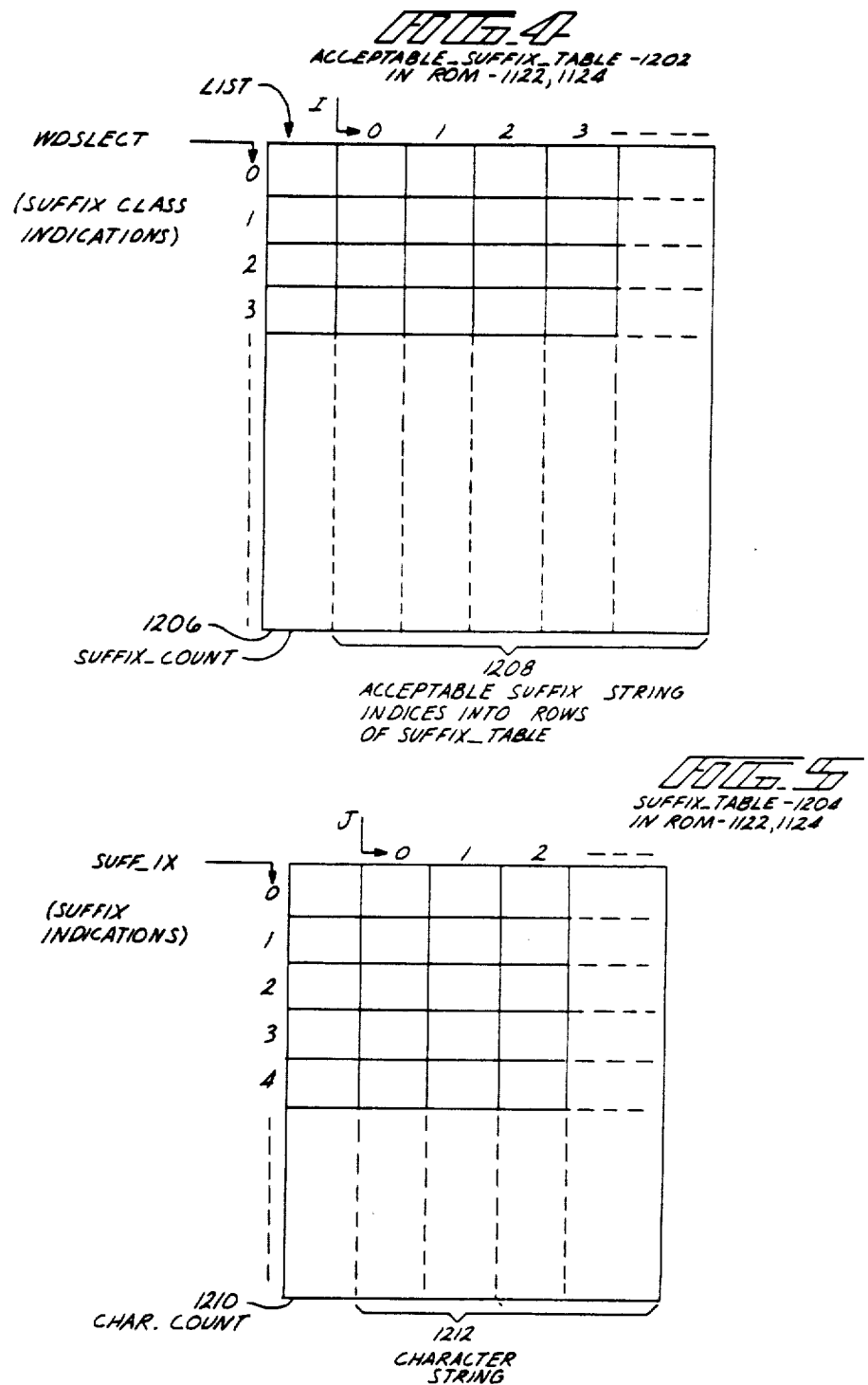

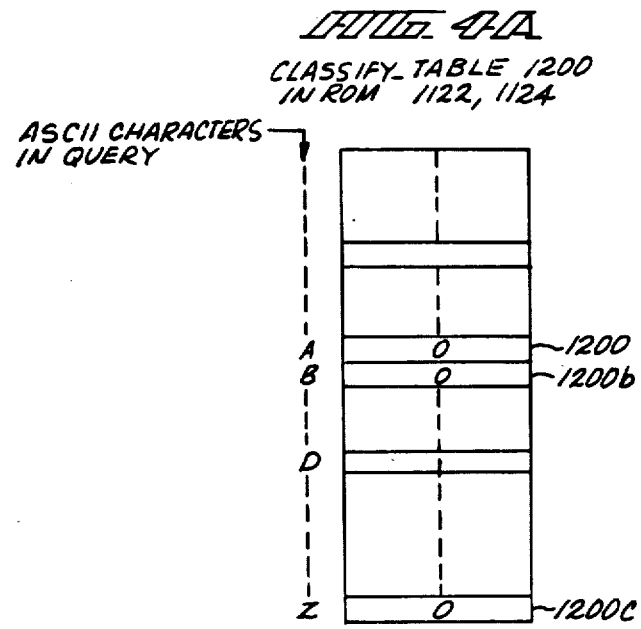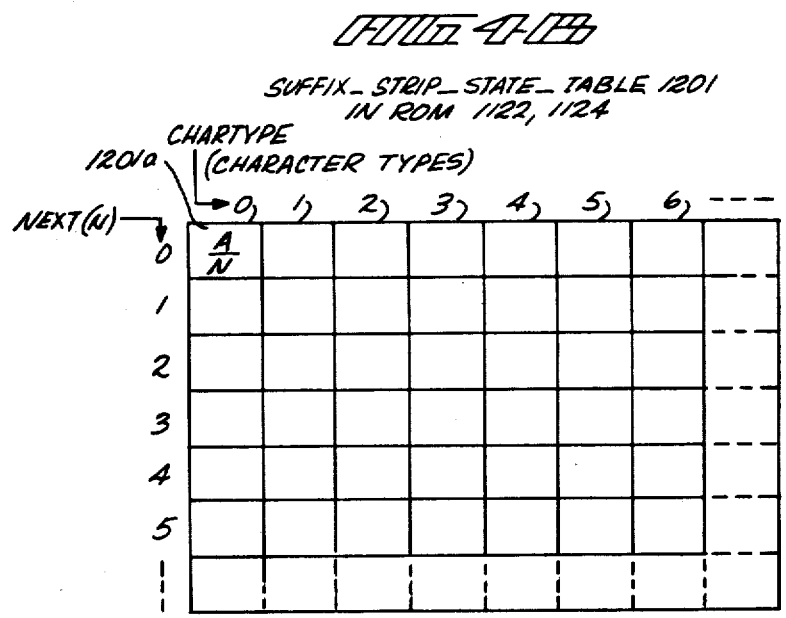

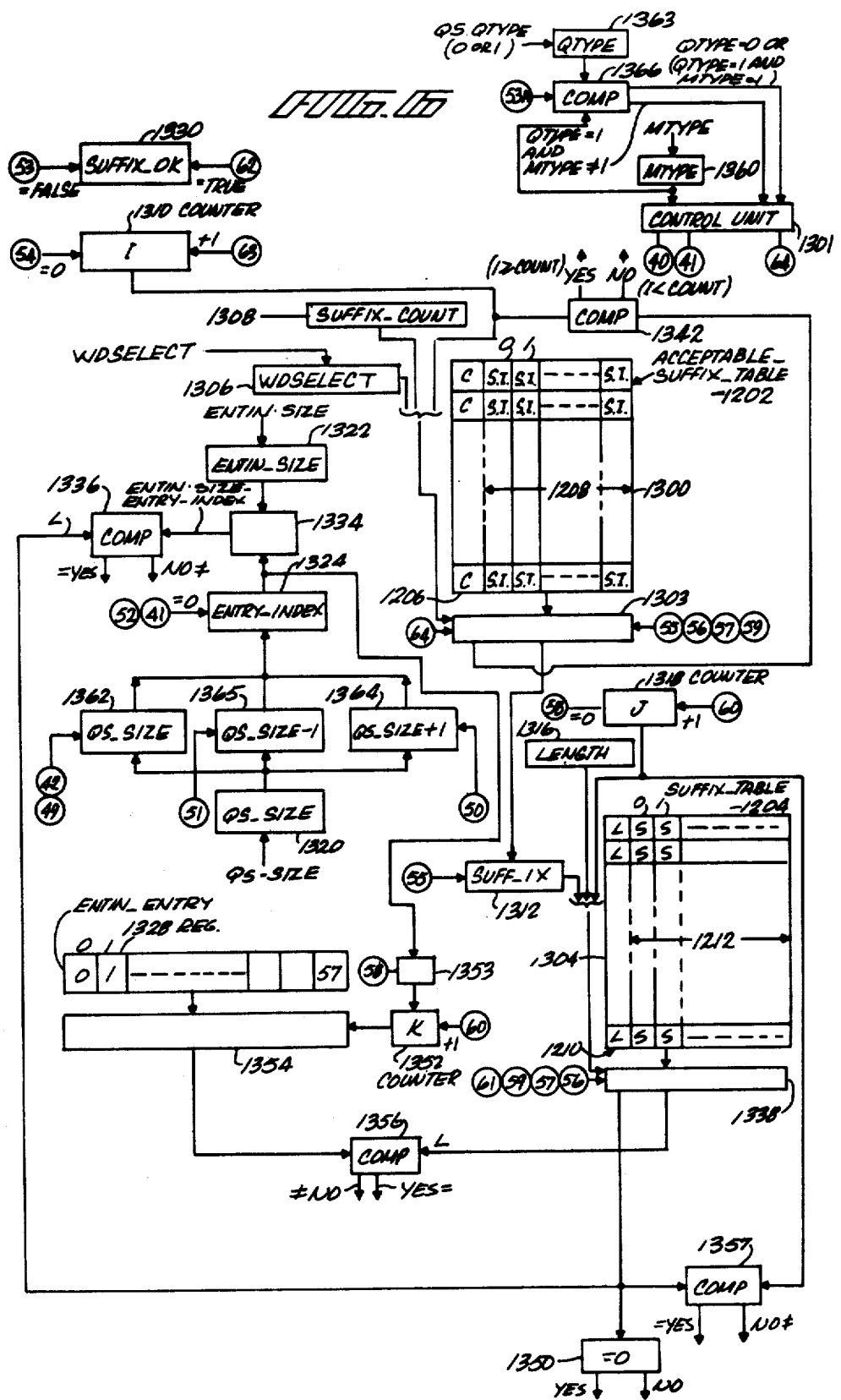

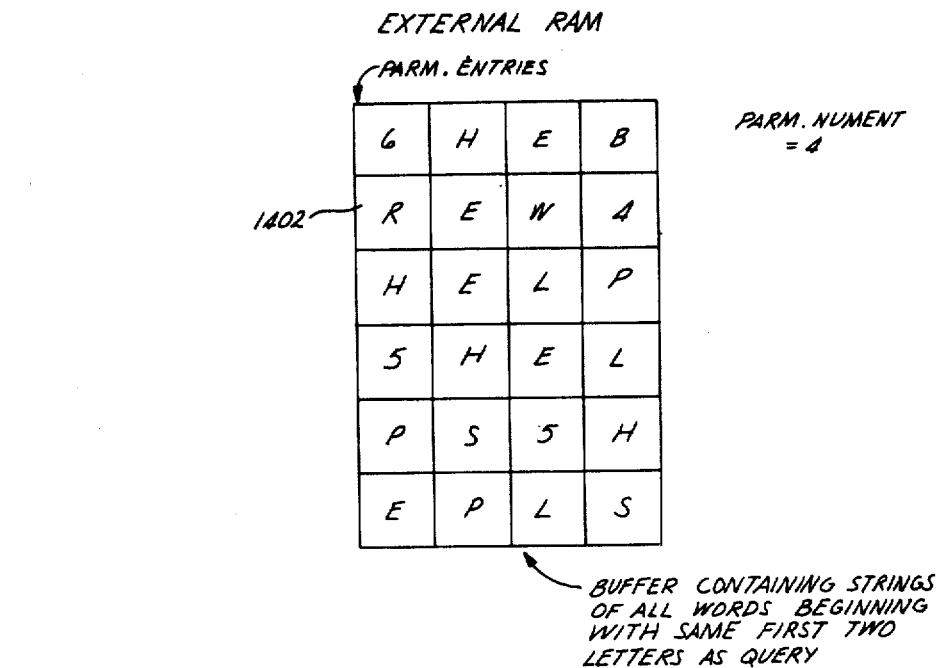
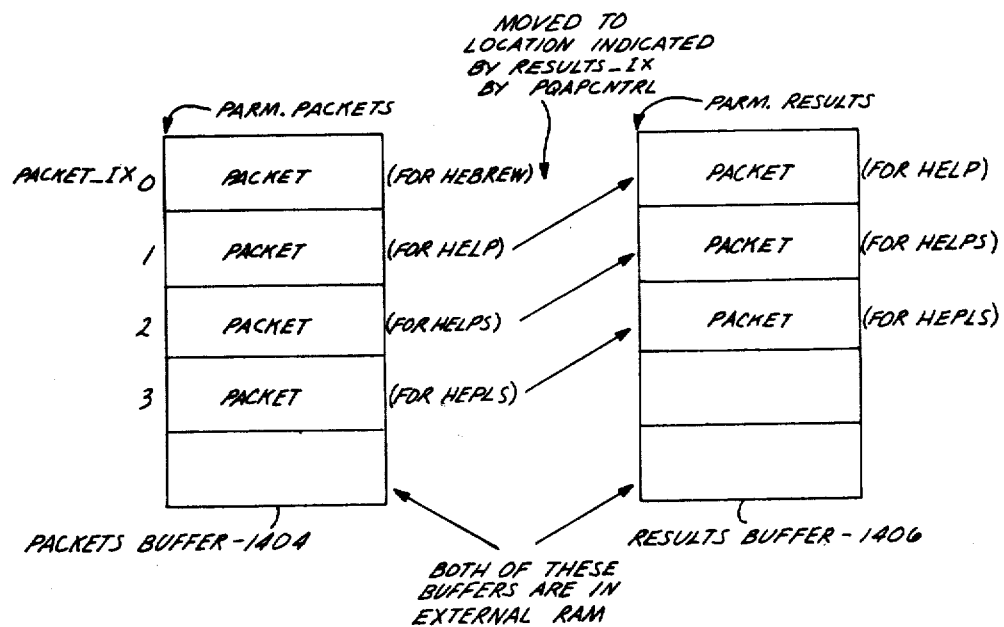

WORD ENTRIES FORMED BY MICROPROCESSOR 1118
IN INPUT OF FIFO 1130

| | | | | | | | |
|---|---|---|---|---|---|---|---|
| 1— | 0 | 0 | 6 | H | E | B | R | E | W |
| 2— | 0 | 1 | 4 | H | E | L | P | | |
| 3— | 0 | 2 | 5 | H | E | L | P | S | * |
| 4— | 0 | 3 | 5 | H | E | P | L | S | * |

UNUSED / PACKET_IX / ENTRY SIZE / ENTRY BYTE STRINGS (* FILL CHAR. TO MAKE BYTE COUNT EVEN)

WORD ENTRIES RETURNED BY MCS 1114

|   |   |   |   | 0 | 1 | 2 | 3 |
|---|---|---|---|---|---|---|---|
| 1 | 0 | 1 | 4 | H | E | L | P |   |
| 1 | 0 | 2 | 5 | H | E | L | P | S |
| 2 | 0 | 3 | 5 | H | E | P | L | S |

ENTIN.MTYPE / ENTIN.UNUSED / ENTIN.PKINDEX / ENTIN.SIZE / ENTIN.ENTRY

ENTRY WORD SUFFIXES FOR QUERY STEM OF HELP

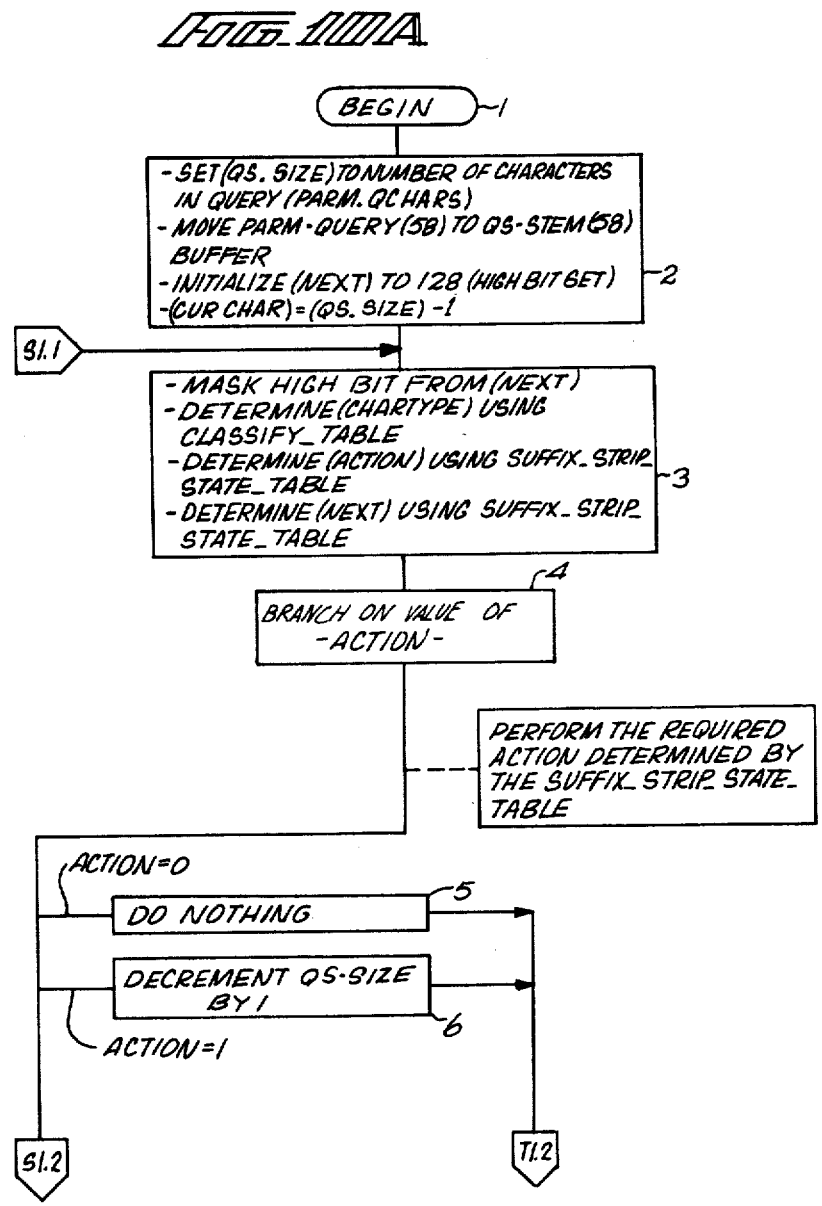

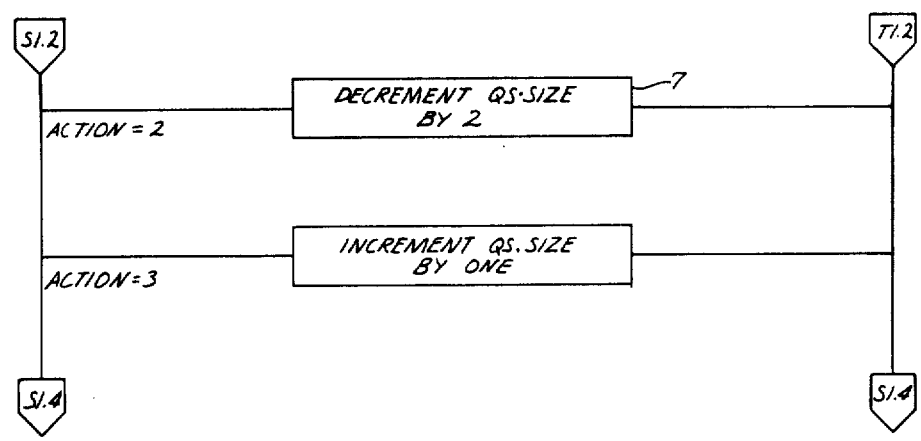

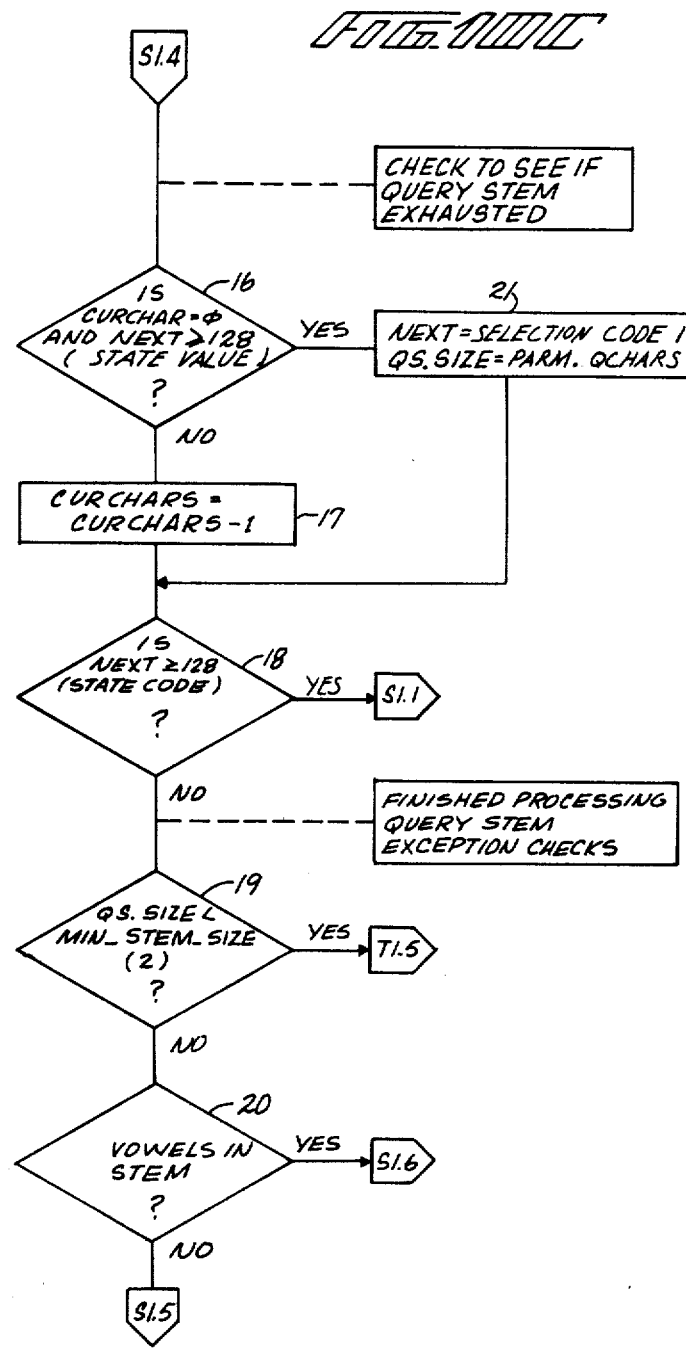

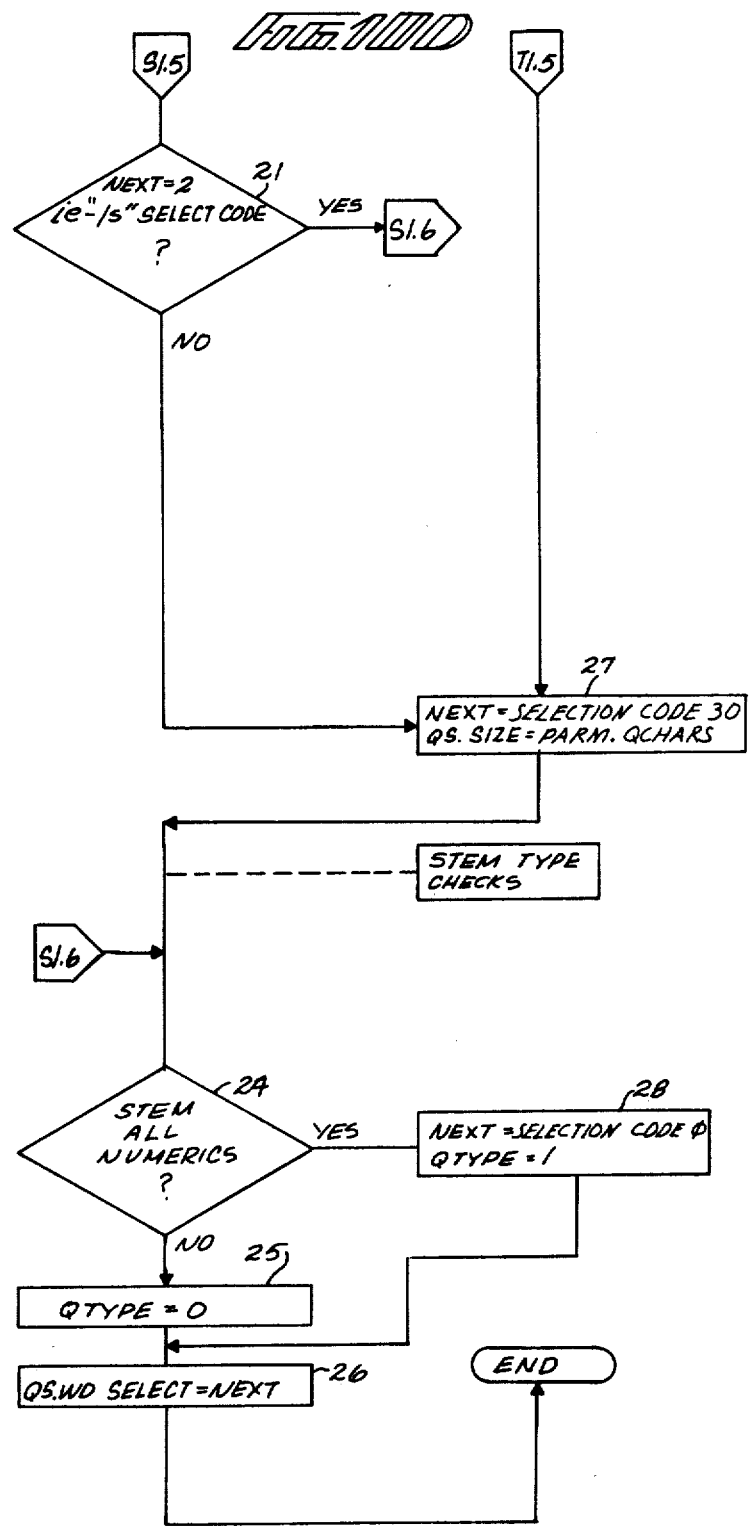

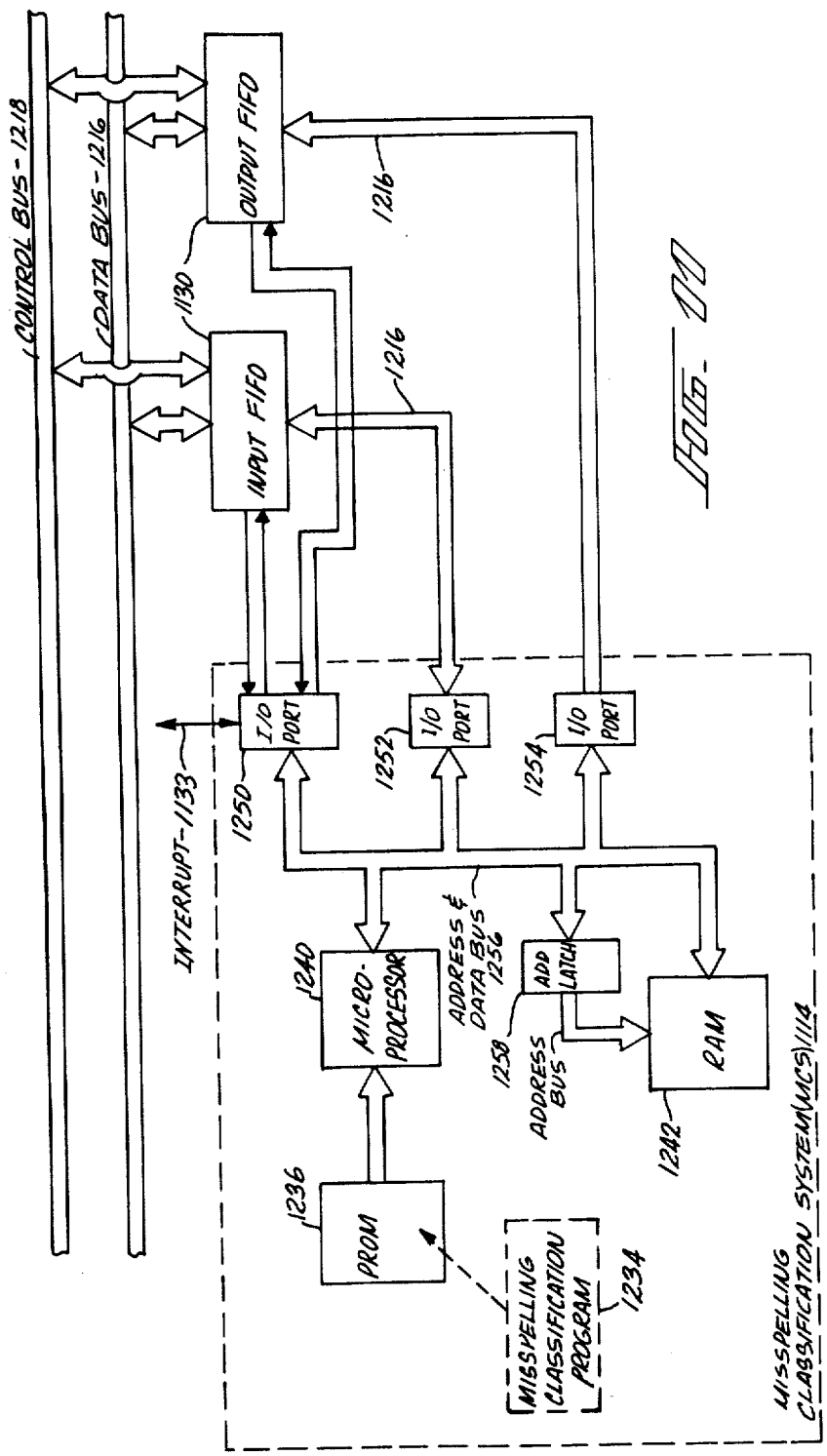

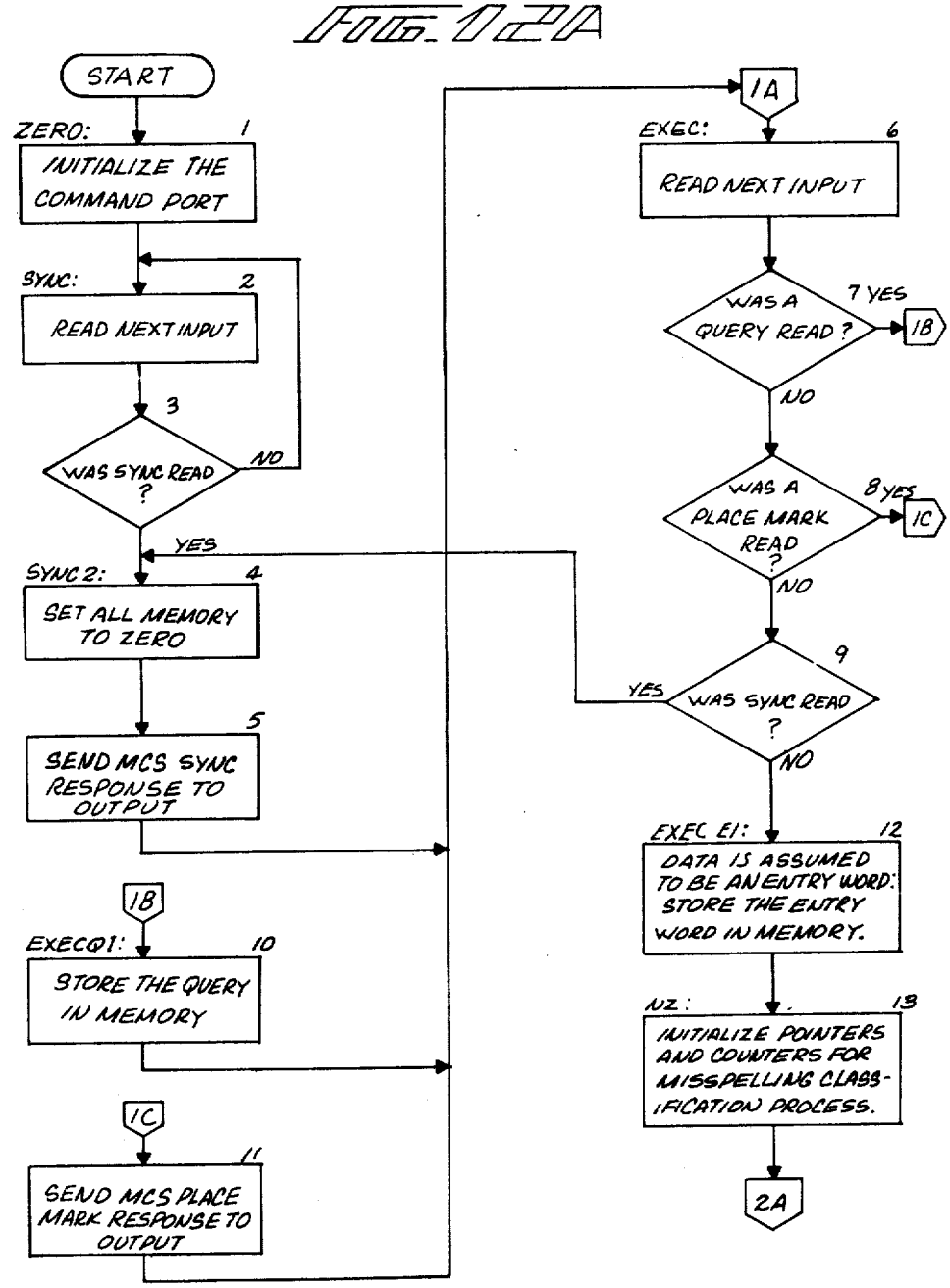

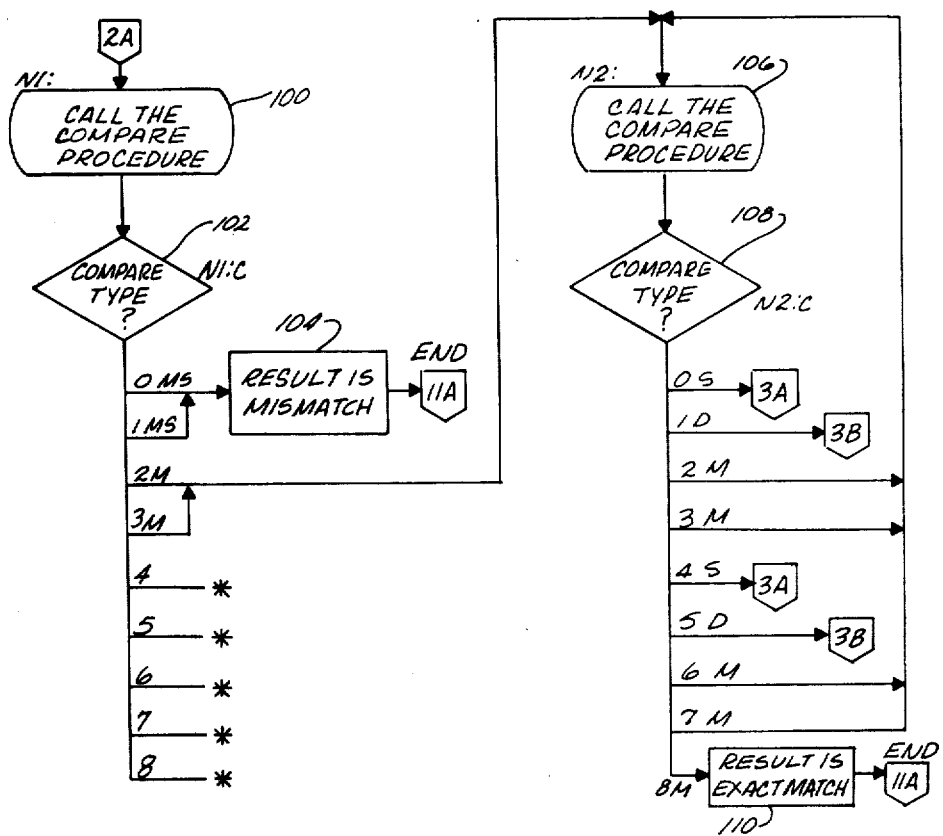

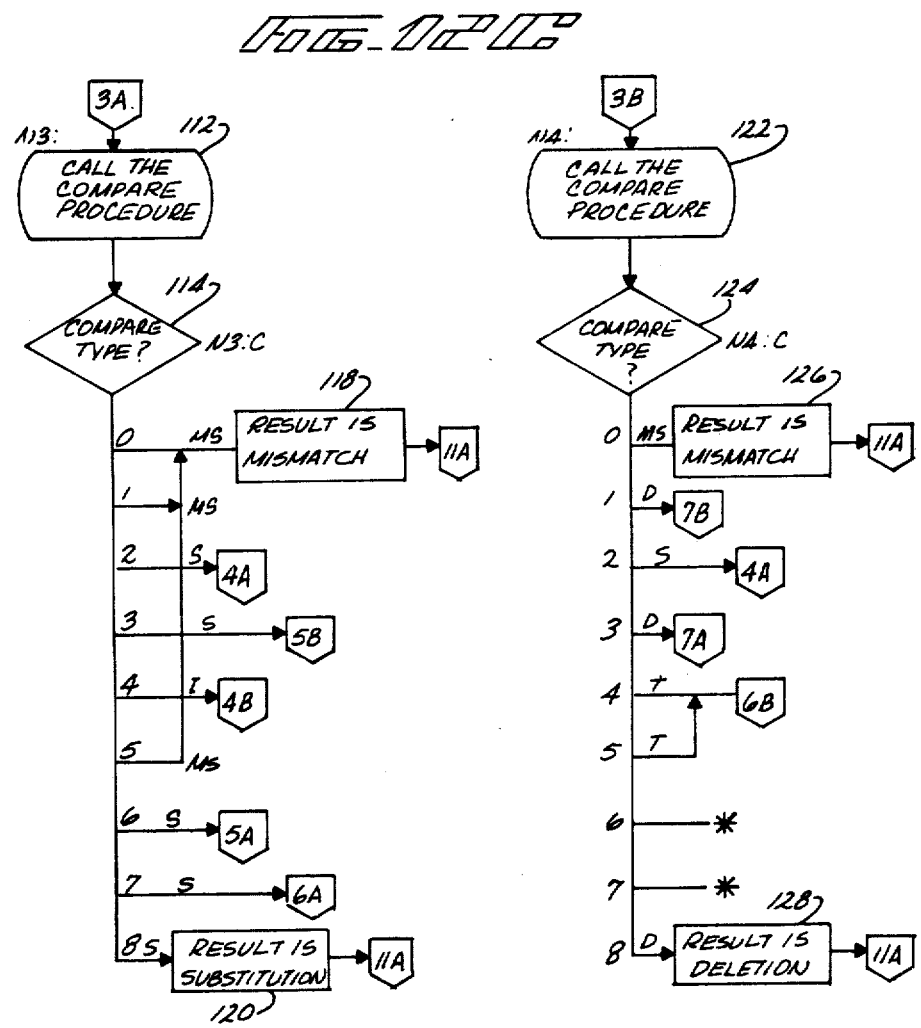

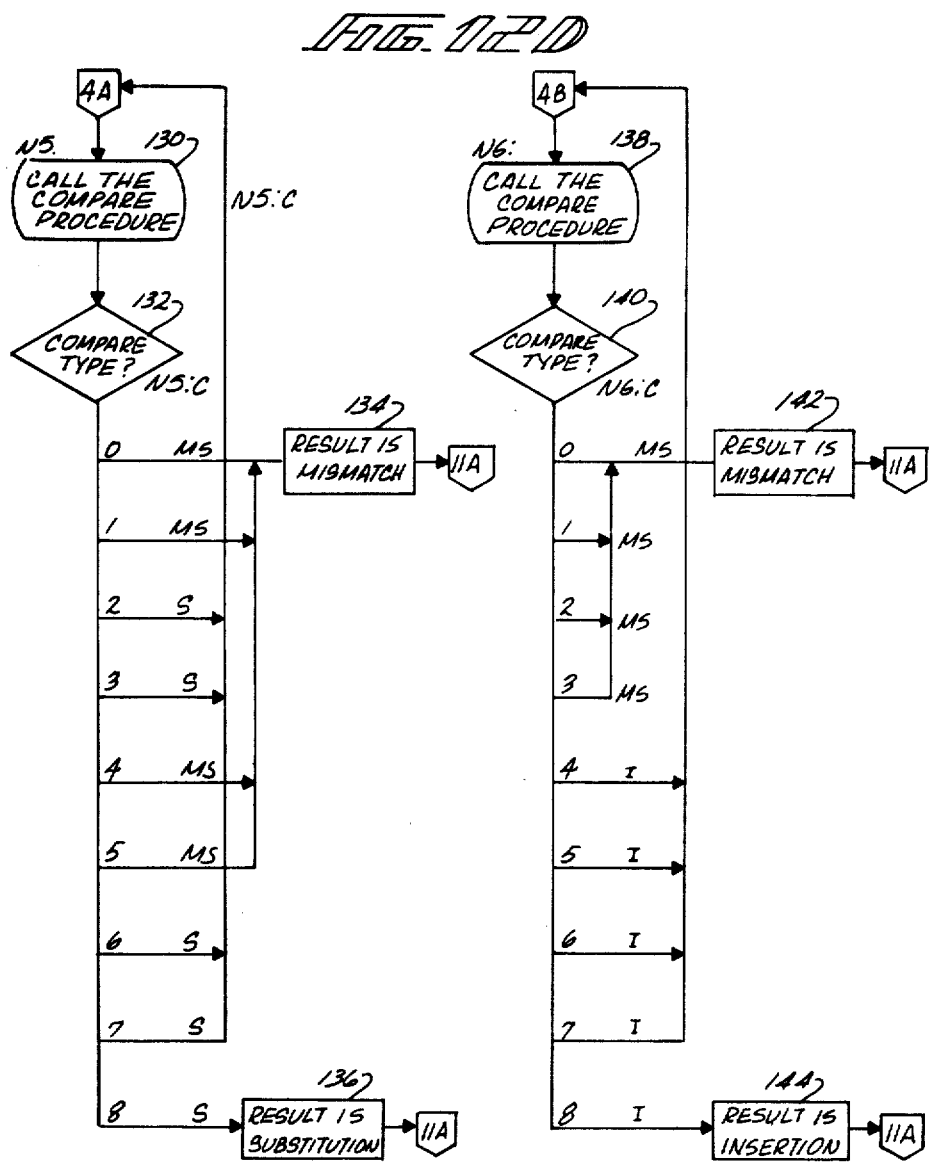

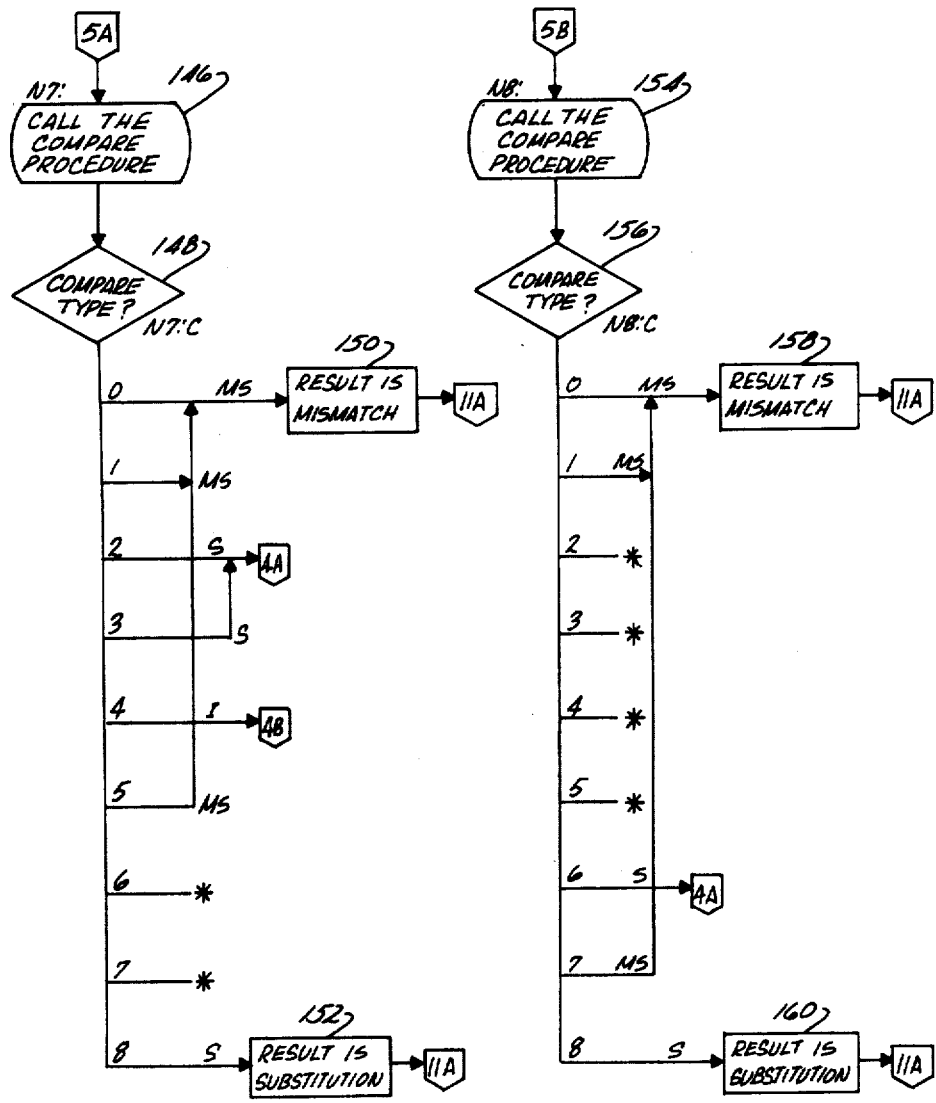

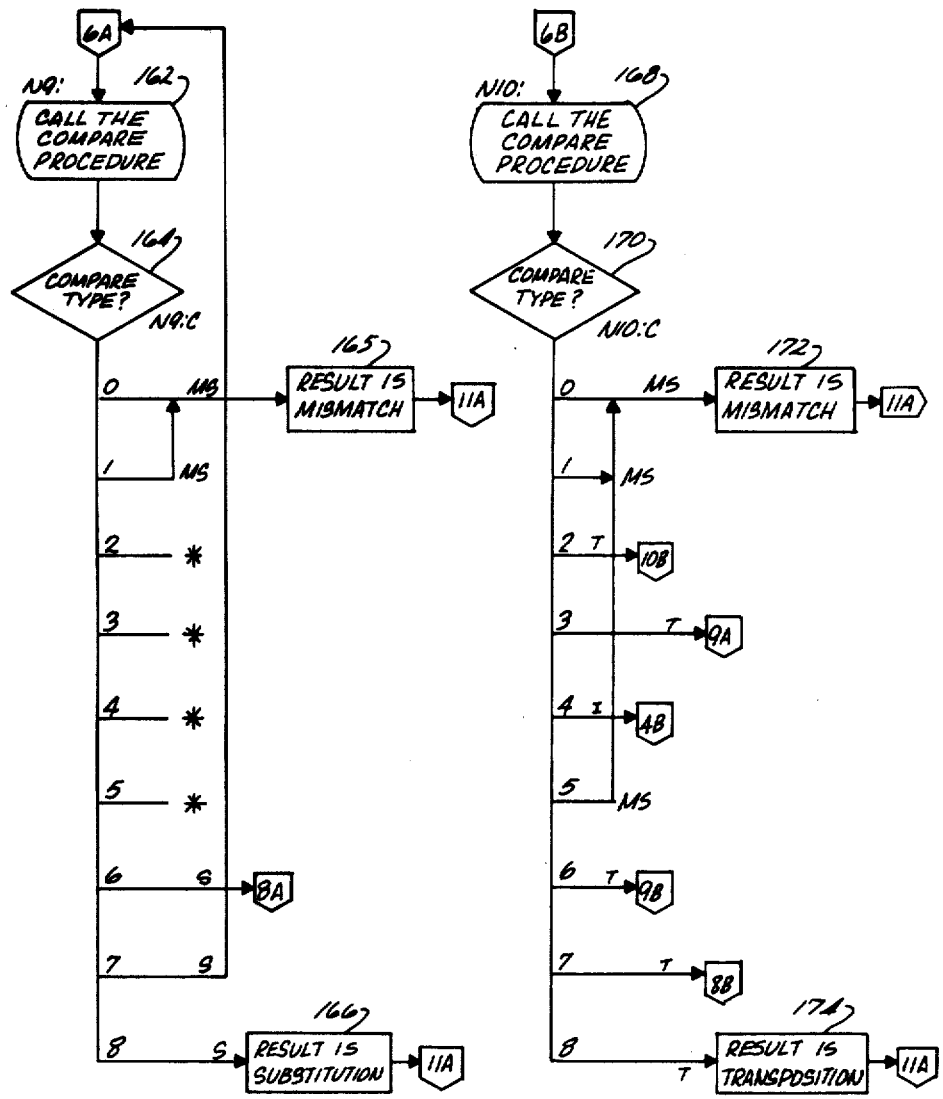

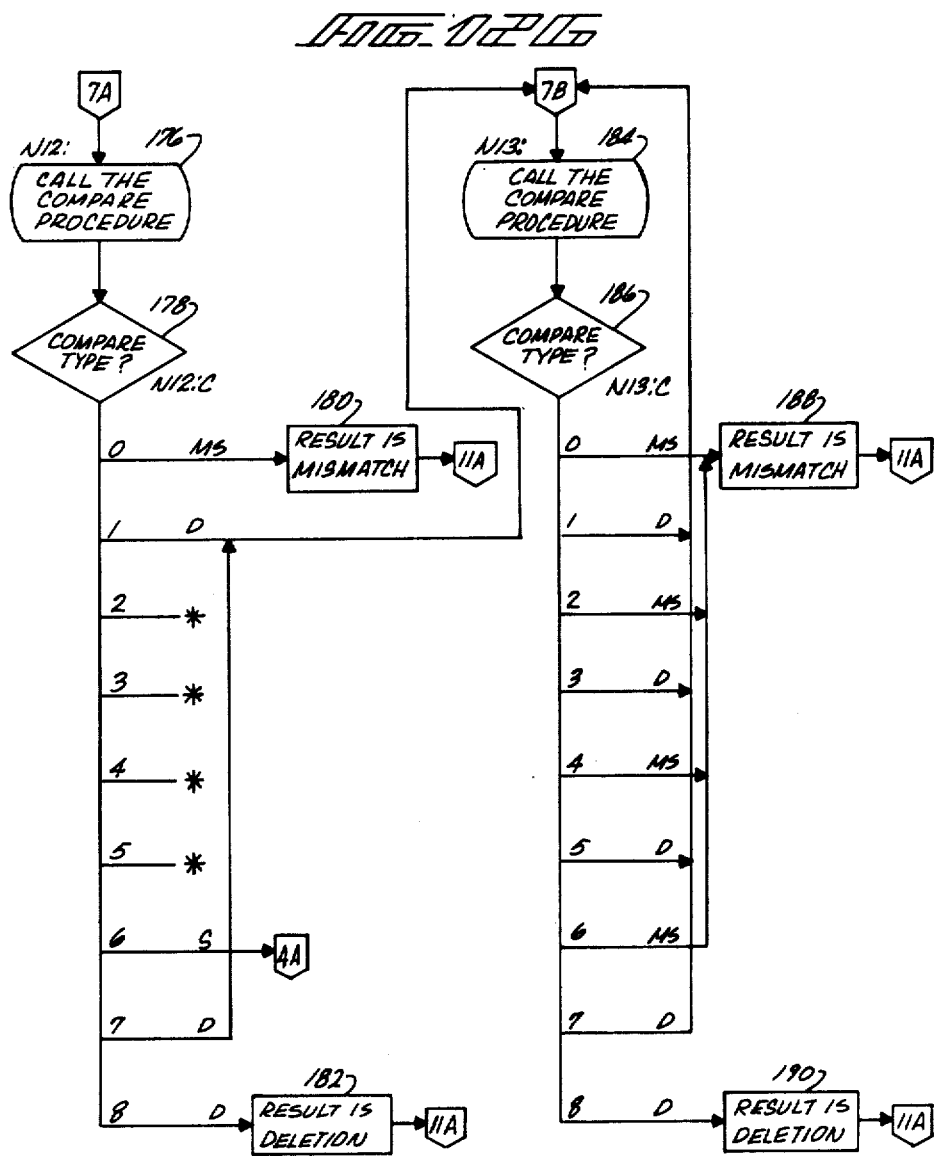

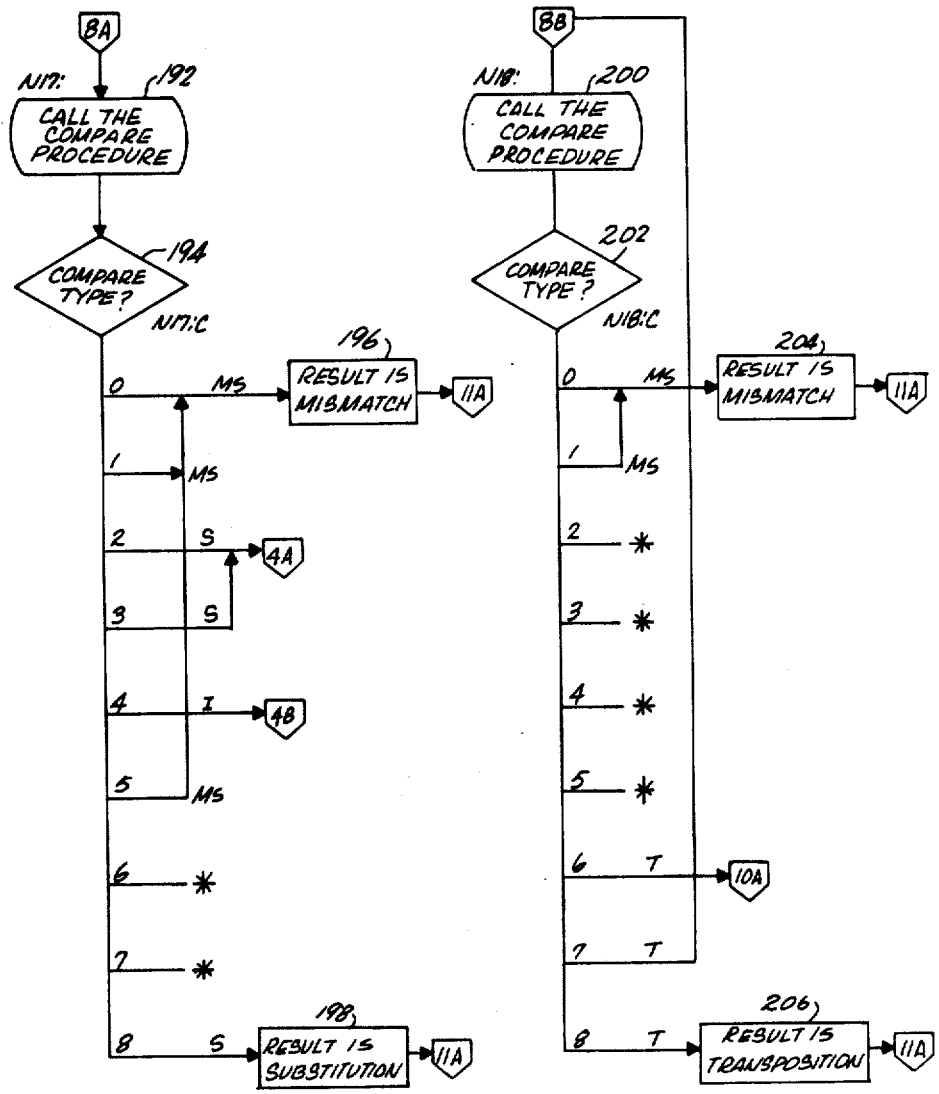

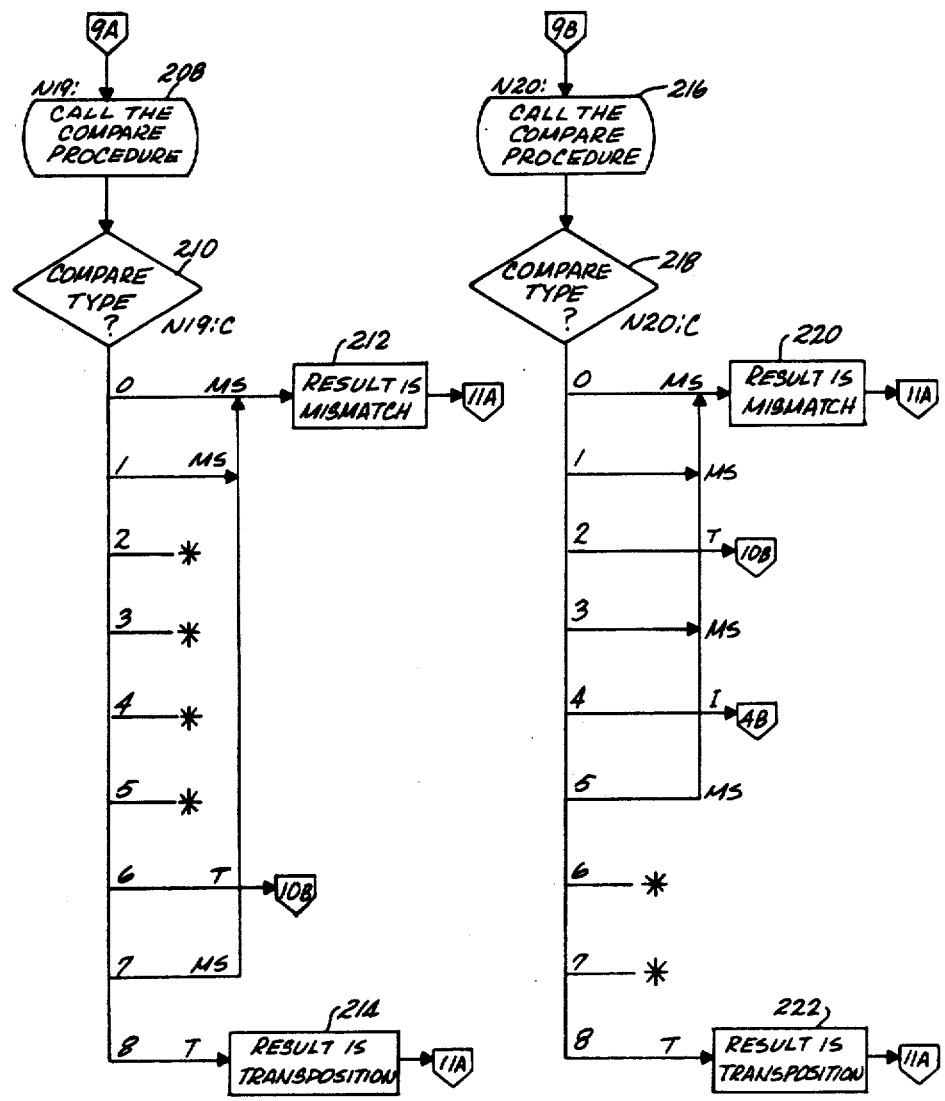

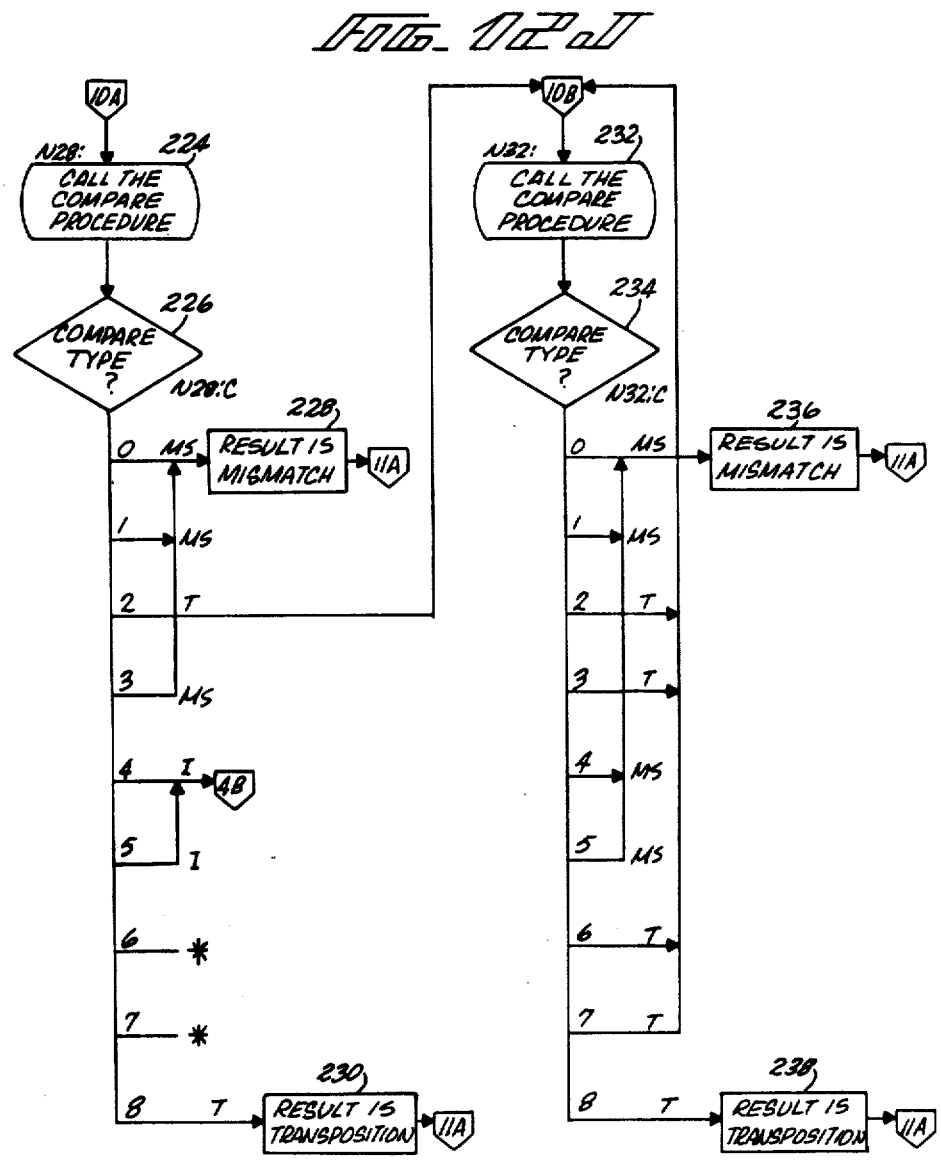

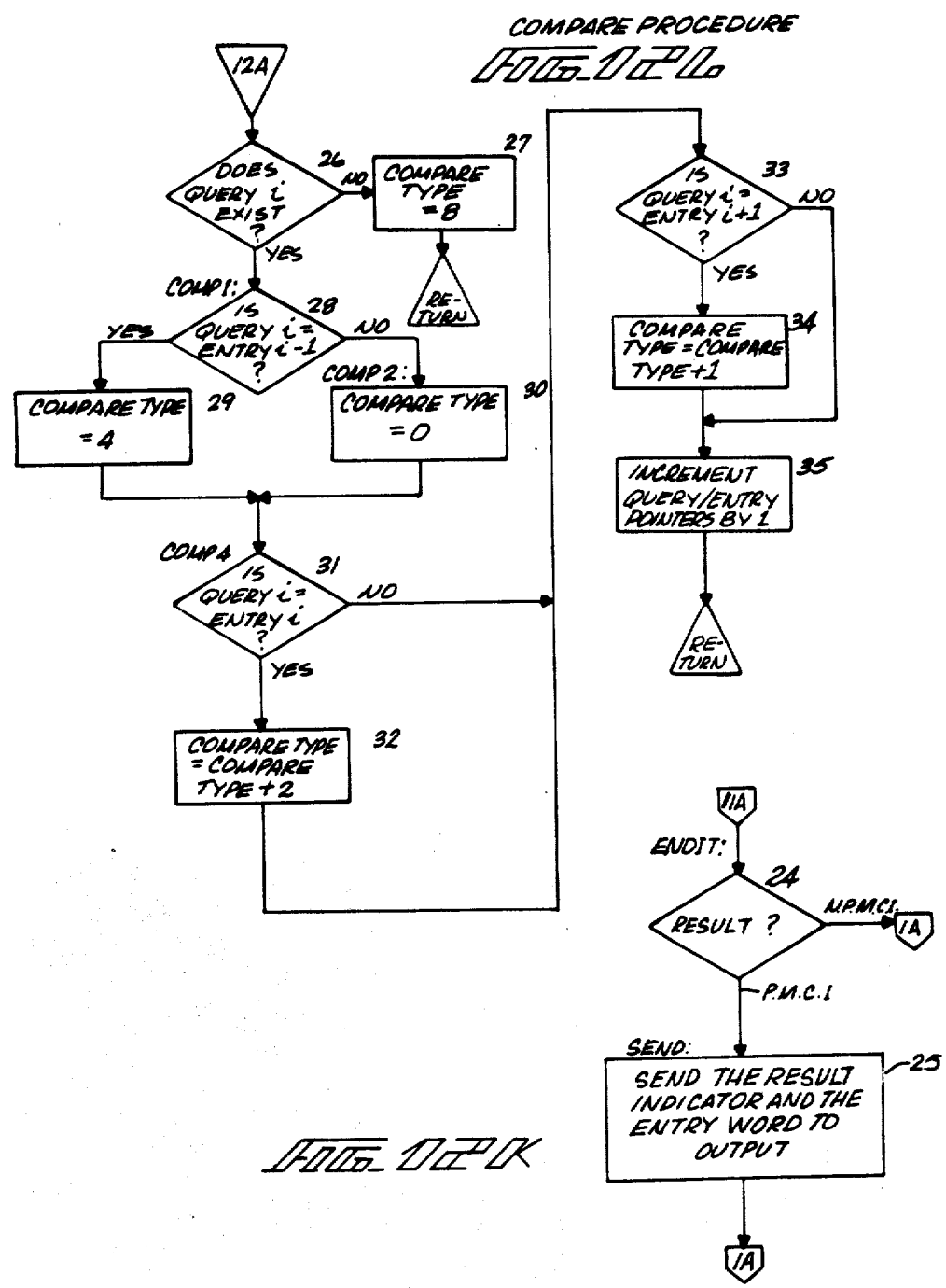

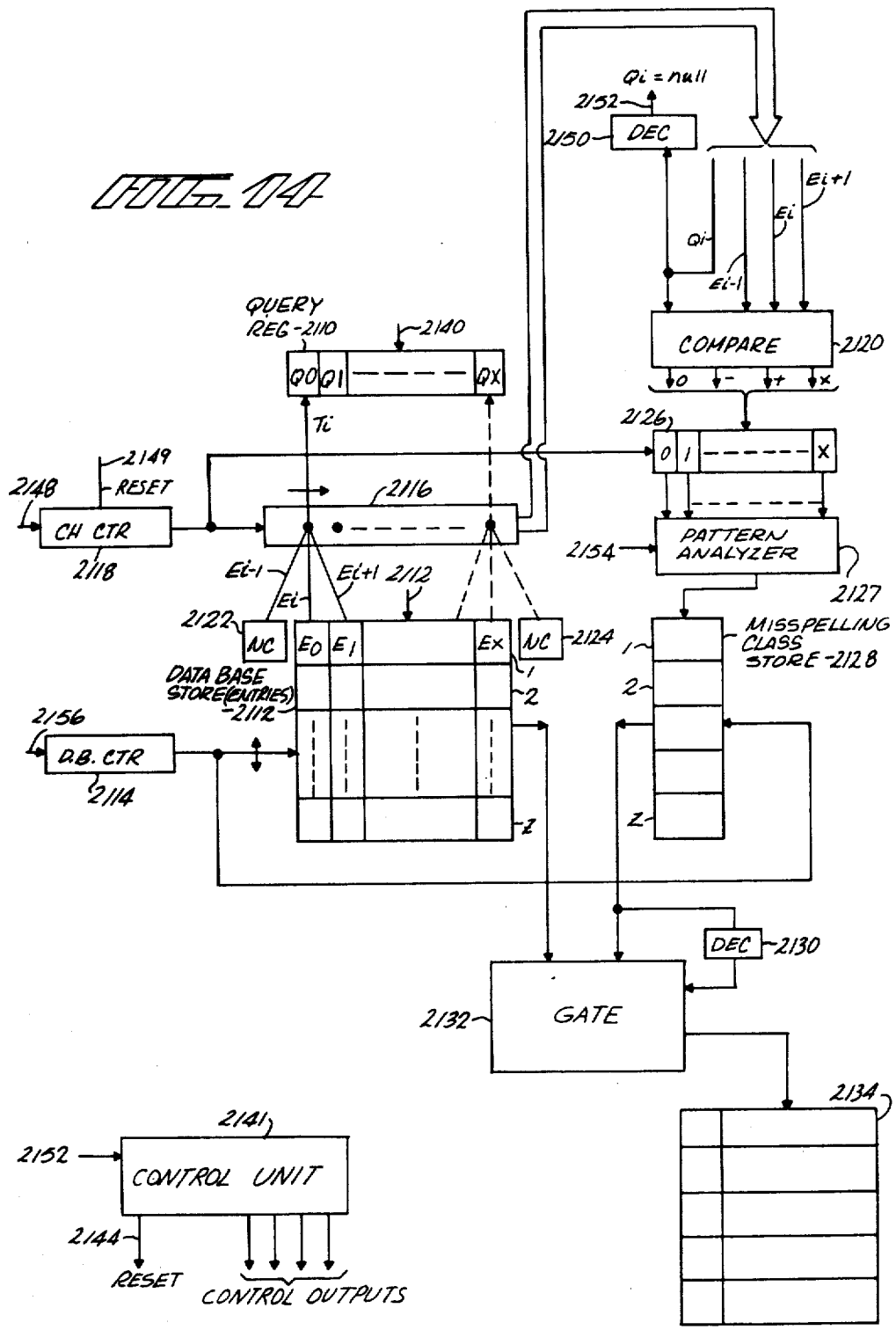

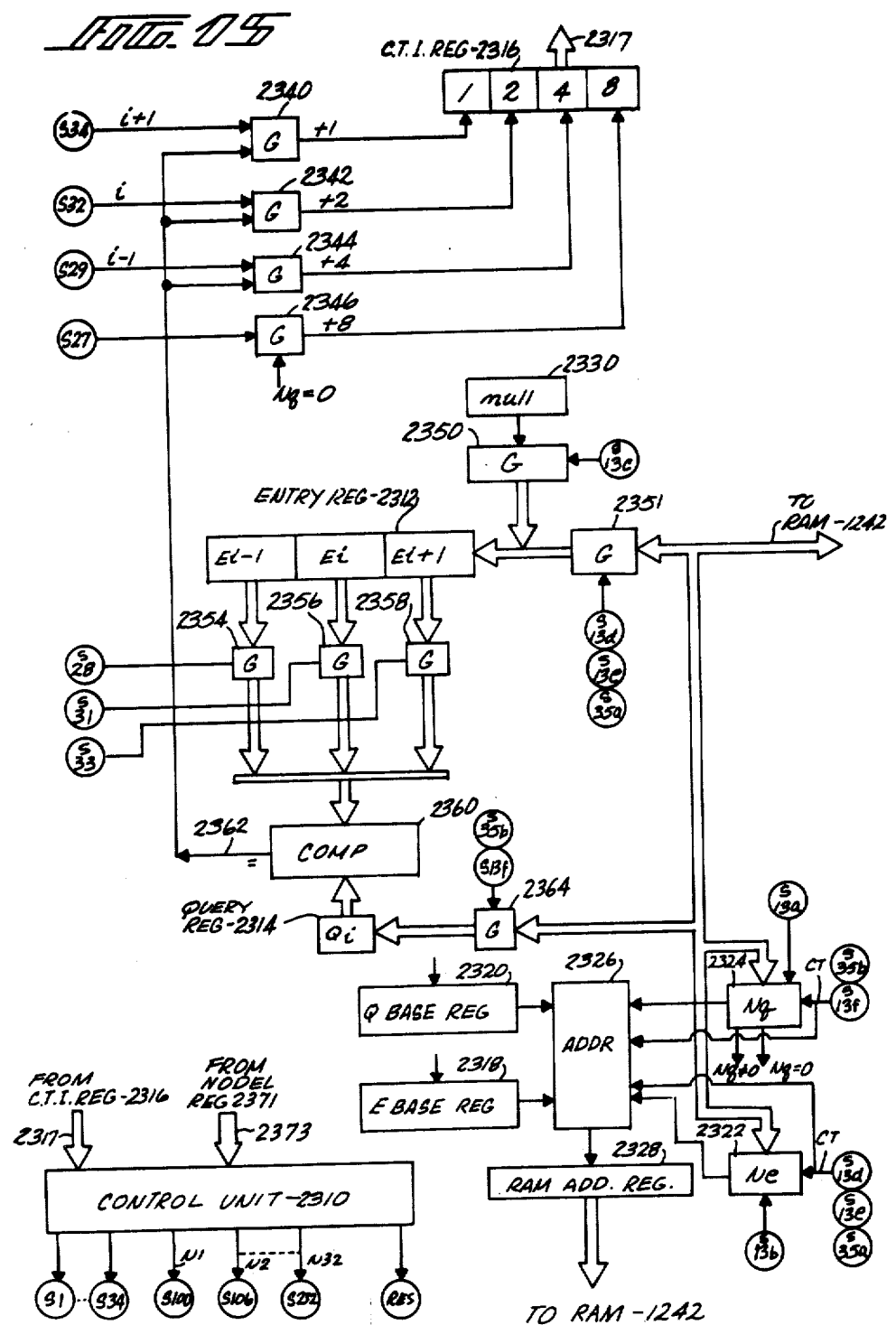

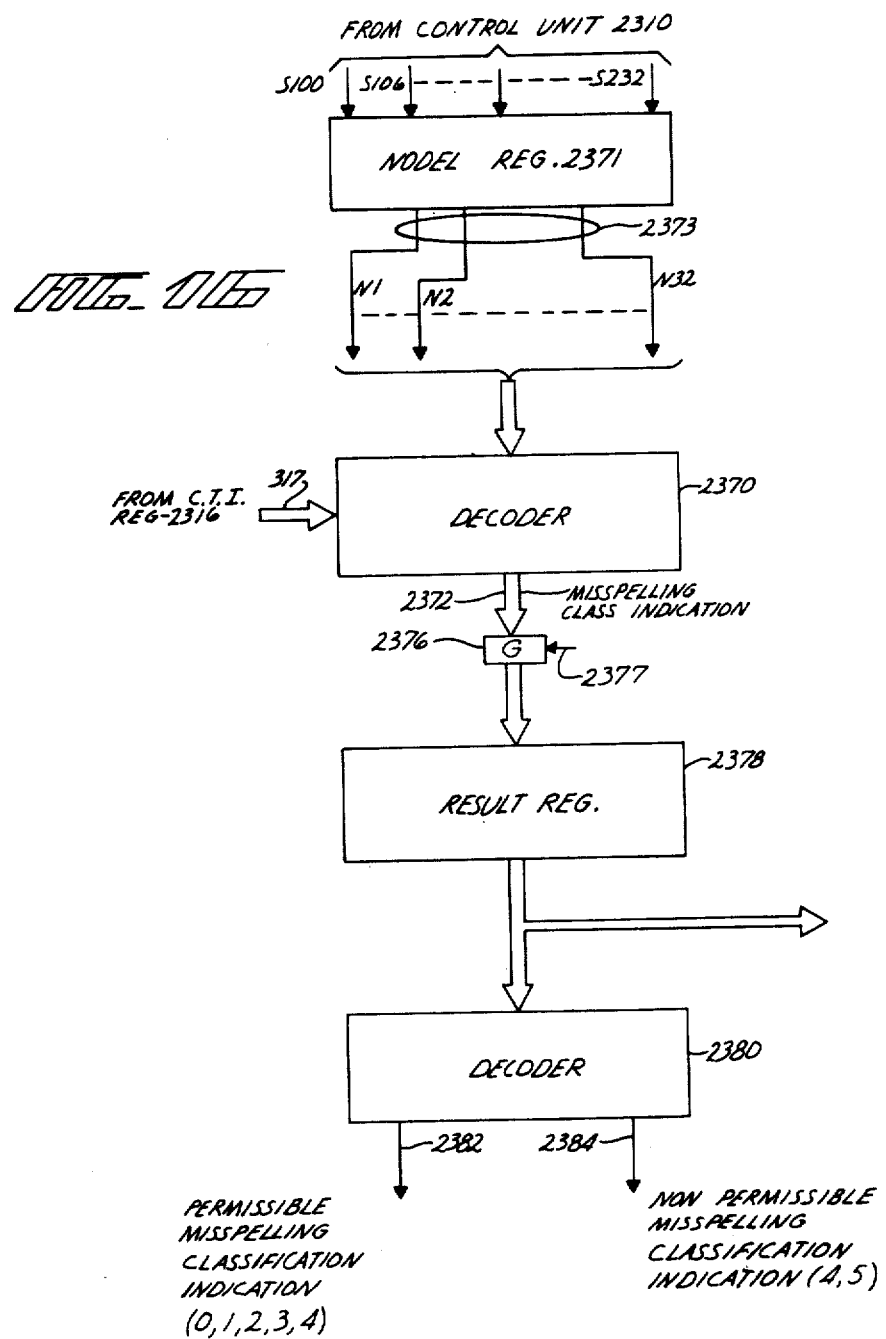

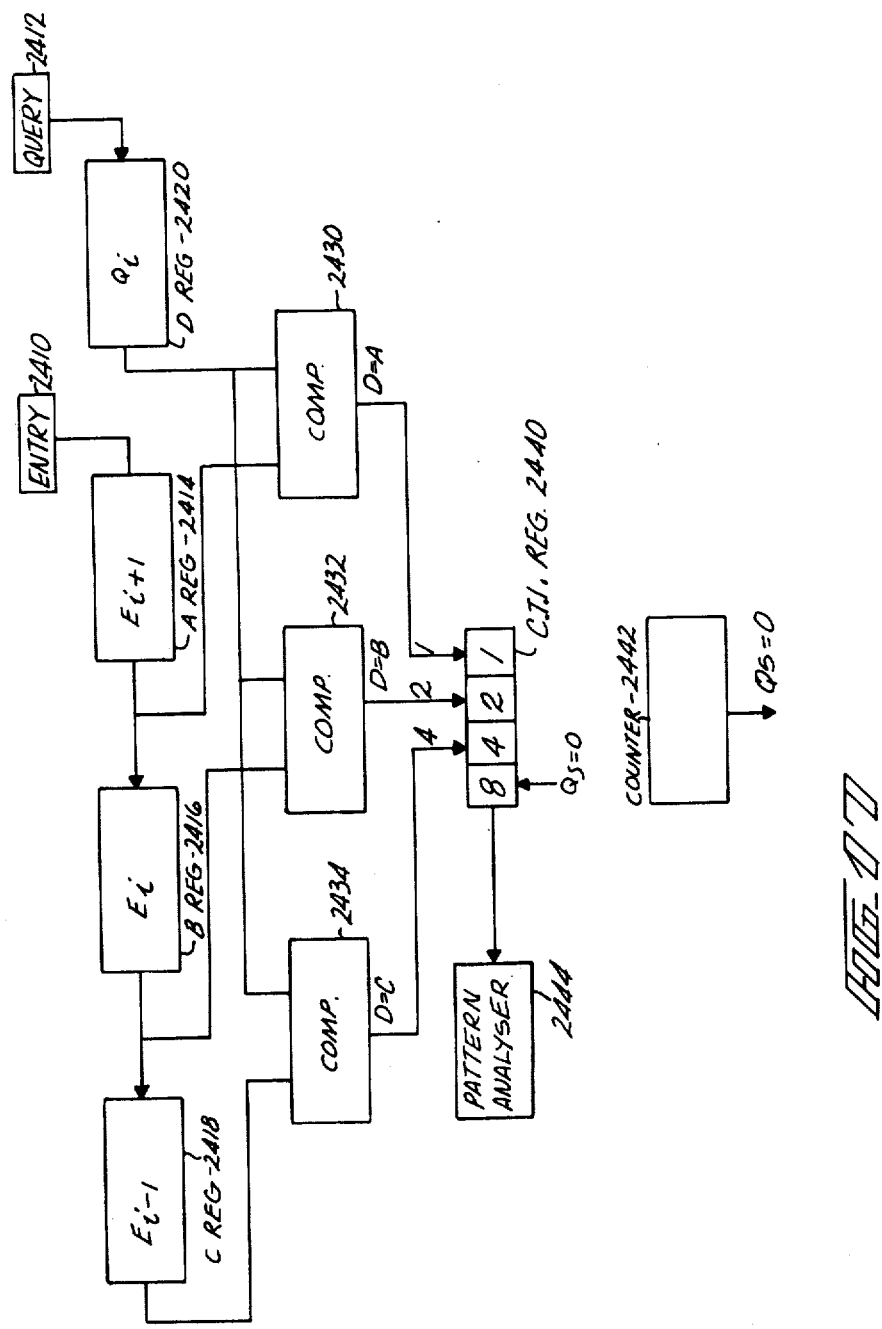

DIGITAL DATA PROCESSING METHOD AND MEANS FOR WORD CLASSIFICATION BY PATTERN ANALYSIS

CROSS-REFERENCE TO RELATED APPLICATIONS

This invention is related to the subject of U.S. patent application Ser. No. 307,571 filed Sept. 30, 1981 entitled LOCATING DIGITAL CODED WORDS WHICH ARE BOTH ACCEPTABLE MISSPELLINGS AND ACCEPTABLE INFLECTIONS OF DIGITAL CODED QUERY WORDS, and to the subject of U.S. patent application Ser. No. 307,093 filed Sept. 30, 1981 entitled METHOD AND MEANS USING DIGITAL DATA PROCESSING MEANS FOR LOCATING REPRESENTATIONS IN A STORED TEXTUAL DATA BASE.

BACKGROUND OF THE INVENTION

This invention relates to digital data processing methods and means for separating acceptable spellings of words from nonacceptable spellings.

Methods have been proposed for using a programmed digital computer for correcting spelling errors. Efficiency is obtained by limiting the class of spelling errors to be considered. In this regard it has been found that over 80% of spelling errors fall into one of four classes of single error, namely, substitution of a character, deletion of a character, insertion of a character, or transposition of adjacent characters.

A specific computer program implemented method for correcting spelling errors is discussed in the *Communications of the ACM*, Volume 13, No, 2, February 1970, in an article entitled "Spelling Correction in Systems Programs" by Howard L. Morgan, pp. 90-94. This article discusses a first case where the entry word and the dictionary word are the same length. The method involves comparing the word in question against a dictionary of correctly spelled words. In this situation the method involves taking an exclusive OR of the word in question and the correctly spelled words and examining the nonzero postions in the result. If a character position is the same in both the word in question and the dictionary word, an exclusive OR will produce a zero result. If there is exactly one nonzero position, a substitution error has occurred. If there are more than two nonzero positions, the two positions are checked for equality. If they are equal, the presence of a transposition is checked in the word in question and in the dictionary word, at these positions, and the correction is made.

A second case occurs when the length of the two words differs by one character. In this situation an exclusive OR is used to find the first nonequal position, starting at the left. Subsequently the remaining parts of the word in question and the dictionary are aligned from the right and checked again by using the exclusive OR. If the two words match from the right down to the same unequal position, a single missing or added letter misspelling has been found at the position in question.

The aforementioned method discussed in the February 1970 *Communications of the ACM* suffers from the following disadvantages:

It must search all words in the dictionary.

It does not cope with candidates larger than query size plus or minus one, which can be valid misspellings of inflected forms of the query word.

It does not classify multiple errors.

Another technique is disclosed in *Communications of the ACM*, Volume 7, No. 3, March 1964, in an article entitled "A Technique for Computer Detection and Correction of Spelling Errors" by Fred J. Damerau, pp. 171-176. Again the word in question is compared against a dictionary of correctly spelled words. The search is accelerated by performing a comparison of words only when the character counts of the word in question and the word from the dictionary are the same length. If the word is found the processing is terminated and the word in question is assumed to be correctly spelled.

If the word in question is not found, the program again searches the dictionary this time using spelling correction rules. If the difference between the two words is greater than 1, the word in question cannot be an acceptable misspelling of the dictionary word. If the two words are equal or differ by only one character or if the character register is different in more than 2 bit positions, no comparison is possible and no further comparison is required.

If after the foregoing a match is still considered possible, the two words are compared position-for-position If the number of characters in the two words are the same and the words differ in only one character position, it is assumed that the two words are the same. If the two words differ in two adjacent character positions, the two characters of the word in question are interchanged and compared to the same two characters of the dictionary word and, if a match results, the two words are assumed to be the same. For all other cases of equal character length, a no-match condition is assumed. The next dictionary entry is compared to the word in question.

If the word in question is a character longer than the dictionary word, the first difference character of the word in question is discarded and the remaining characters are shifted left one position. If a match in all positions occurs, it is assumed that the words are the same. If the dictionary word is a character longer, the first difference character of the dictionary word is discarded and the words are compared the same as above.

The method is repeated until a match of the word in question is found or until all entries in the dictionary have been tested.

The method disclosed in the *Communications of the ACM* of March 1964 suffers from the following disadvantages:

It must search the entire dictionary.

It cannot handle candidate words larger than +1 greater than the query word.

The *Communications of the ACM*, December 1980, Volume 23, No. 12, contains an article entitled "Computer Programs for Detecting and Correcting Spelling Errors". This also makes reference to the fact that 80% of all spelling errors are of one of four classes. The article goes on to discuss a method whereby misspelled words in a dictionary may be matched against a token (i.e., word) which is being searched in the dictionary. In this regard, transpositions are detected by transposing each pair of adjacent characters in the token, one at a time, and searching for the resultant token. One extra letter is handled by deleting each character in the token, one at a time, and searching for the resultant tokens. One missing letter and one wrong letter are handled by one of two strategies. One of the approaches suggested is to substitute each potential character in each character position and search for the token in the dictionary. The problem with this approach is that a very large number of repeated searches is required. Another suggested approach is to create a table of tokens which are, in effect, acceptable misspellings of words. When a questionable word is encountered, one must search the table of acceptable misspellings to locate a token which matches the one in question. Obviously where a very large number of acceptable misspellings is involved, the search can be quite tedious.

Another approach discussed in that article involves the frequency of two letter pairs and three letter triples to detect potential misspellings in order to form an index into a table of acceptable misspellings.

Other approaches that have been taken involve so-called interactive spelling checkers. In this regard, each word is checked against a dictionary of correctly spelled words and, if the word is not in the dictionary, the user is asked what to do. This approach obviously does not provide any type of automatic matching of misspelled words. Another technique employed is to take tokens and convert them into standard phonetic spelling and to find similar sounding words in a dictionary. This, for example, works well with double errors using, for example, "f" for "ph" or "k" for "qu."

The problem of programming a computer to determine whether or not a string of characters is an acceptable misspelling of a given word has been widely considered. See for example "String Similarity and Misspellings" by Cyril N. Alberga, *Communications of the ACM*, Volume 10, No. 5, May 1967, pp. 302-313; "Approximate String Matching" by Patrick A. V. Hall and Geoff R. Dowling, *Computing Surveys*, Volume 12, No. 4, December 1980, pp. 381-402; and "Computer Programs for Detecting and Correcting Spelling Errors" by James L. Peterson, *Communications of ACM*, Volume 23, No. 12, December 1980, pp. 676-687.

These prior art approaches to handling misspelling are generally slow and inefficient for large data bases.

SUMMARY OF THE INVENTION

Briefly, a method is disclosed herein using a digital data processing means for separating acceptable spellings of words from nonacceptable spellings wherein each word comprises characters assigned imaginary positions. Character positions in each word are assigned increasing values from one of the words to the other, positions the same number of characters from one end of each word being assigned the same value. Two words to be compared are called a query word and a candidate word. The method involves the steps of comparing a representation of a character in a given position of the query word with representations of characters in the next lower position, the same position, and the next higher position in the candidate word, and forming a compare type indication representing a match or a mismatch between each query word character and each of such candidate word characters under comparison, changing the given position of the query word under comparison to the next higher value position of the query word and repeating the preceding step to form another compare type indication, and processing and utilizing the compare type indications to thereby form a spelling classification indication for one of the words under comparison representing an acceptable spelling or a nonacceptable spelling.

Preferably the method includes the step of causing a plurality of said candidate words to be compared against the query word to form a plurality of spelling classification indications, at least one for each of a plurality of candidate words. Also included is the step of utilizing spelling classification indications for each of the plurality of candidate words for physically separating representations of those candidate words indicated to be acceptable spellings from representations of those candidate words indicated to be nonacceptable spellings of the received query word.

Preferably a representation of each of the candidate words which are indicated to be acceptable spellings are combined with the representation of the corresponding spelling classification indication.

The step of physically separating preferably comprises the step of physically transferring the combined representations of candidate words and acceptable spelling classifications.

Also preferably the step of comparing and forming a compare type indication comprises the step of forming a compare type indication having first, second and third binary positions corresponding, respectively, to said next lower position, the same position, and the next higher position in the candidate word. Also preferably included are the steps of forming for a query character under comparison a compare type signal comprising a lower storage position, a same storage position, a next higher position corresponding, respectively, to such next lower position, the same position, and the next higher position in the candidate word, and forming in each binary storage position a binary representation of a first value when the comparison with the candidate character in the corresponding position of the candidate word results in an equality, and forming in each binary storage position a binary representation of a second value when the comparison with the candidate character in the corresponding position of the candidate word results in an inequality.

According to a preferred arrangement first and second compare type indications are formed using a query character in a first position and a second query character in a second higher valued position of the query word. The step of processing and utilizing includes the steps of utilizing at least the first compare type indication for forming a first tentative spelling classification indication and utilizes at least the second compare type indication and the first tentative spelling classification indication for forming a second tentative spelling classification.

Preferably the second tentative spelling classification indication is used in forming the final spelling classification indication.

According to a preferred embodiment a digitally coded signal is formed representative of the spelling classification indication.

Preferably the step of forming a spelling classification indication forms a digitally coded signal identifying any one of at least the following acceptable spelling errors between the query word and the candidate word: a character insertion error, a character deletion error, and a character transposition error as well as equality between the characters and their order in the candidate word and the query word.

Preferably the step of processing and utilizing the compare type indications to form a spelling classification indication is partially performed following the formation of each compare type indication for each query character.

BRIEF DESCRIPTION OF THE DRAWINGS

FIG. 1A is a schematic and block diagram of a digital data processing system and embodying the present invention;

FIG. 1B is an overall flow diagram of a method of operation of the system of FIG. 1A according to the present invention;

FIG. 1 is a more detailed schematic and block diagram of the digital data processing system of FIG. 1A and embodying the present invention;

FIG. 2 is a block diagram of the programming utilized in the digital data processing system of FIG. 1 indicating the portions of the system in which the various programs are executed;

FIG. 4A is a pictorial view illustrating the form and organization of the CLASSIFY_TABLE -1200 contained in ROM 1122,1124;

FIG. 4B is a pictorial view illustrating the form and organization of the SUFFIX_STRIP_STATE_TABLE -1201 contained in the ROM 1122,1124;

FIG. 4 is a pictorial view illustrating the form and organization of the ACCEPTABLE_SUFFIX_TABLE stored in the internal ROM 1122,1124 of the system of FIG. 1;

FIG. 5 is a pictorial view depicting the form and organization of the SUFFIX_TABLE contained in the internal ROM 1122,1124 of the system of FIG. 1;

FIG. 6 is a schematic and block diagram embodying an alternate method and means to that implemented using the program PQAPCNTRL and the digital data processing system of FIG. 1;

FIG. 7 depicts the format of a family of entries as they are stored in external RAM 1104; FIG. 7 also contains a pictorial view of the packets buffer and the results buffer in external RAM 1104; the results buffer contains the results from having determined entry words containing acceptable misspellings and acceptable inflections of an original query word; indicated in the Figure are the various PARM structure variables (see Table 4) and what they point to or indicate;

FIG. 8 is a pictorial view depicting the word entries formed by the microprocessor 1118 in the input portion of FIFO 1130 in preparation for the operation of the MCS 1114;

FIG. 9 is a pictorial view depicting the form of the same entry words as in FIG. 8 as they are selected by the MCS 1114 after having determined those entries which are acceptable misspellings of the original query word;

FIG. 10 comprises FIGS. 10A through 10D and is a flow diagram disclosing the sequence of operation of the digital data processing system of FIG. 1 and the method created by the PSUFIX program as it is executed by the system of FIG. 1;

FIG. 11 is a schematic and block diagram of the misspelling classification system (MCS) 1114 as well as the input and output portions of FIFO 1130, the control and data buses 1218 and 1216, the microprocessor 1118, and the internal RAM 1126,1128 of FIG. 1;

FIG. 12 comprises FIGS. 12A through 12L and is a flow diagram disclosing the sequence of operation of the MCS system 1114 of FIG. 11 and the method created by the MCS program as it is executed by the MCS system;

FIGS. 15 and 16 form a schematic and block diagram disclosing an alternate embodiment of a portion of the digital data processing system of FIG. 11;

FIG. 17 is a schematic and block diagram disclosing an alternate embodiment of a portion of the digital data processing system of FIG. 11; and FIG. 18 is a schematic and block diagram disclosing an alternate embodiment of a portion of the digital data processing system of FIG. 11.

DETAILED DESCRIPTION

INDEX

Figure 3C:
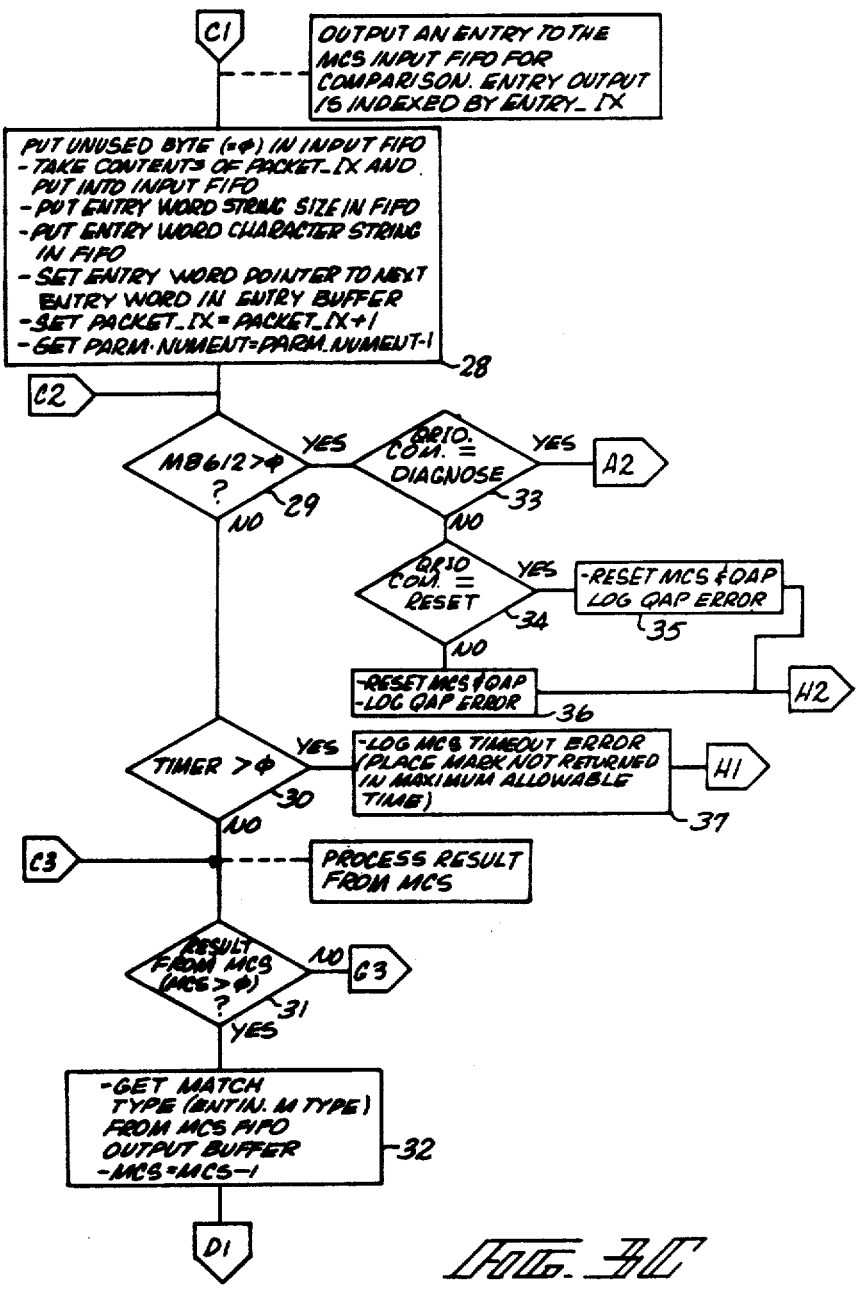
FIG. 3 comprises FIGS. 3A through 3H and comprises a flow diagram disclosing the sequence of operation of the digital data processing system of FIG. 1 and the method created by the program PQAPCNTRL stored in internal ROM 1122,1124 as it is executed by the system of FIG. 1.
Figure 40:
Figure 41:

I. GENERAL DESCRIPTION
  A. COMPUTER PROGRAM METHOD AND MEANS
    1. INTRODUCTION
    2. SUMMARY OF METHOD
    3. PROGRAMS
II. HARDWARE—QAP CONTROL BOARD AND EXTERNAL CIRCUITS OF FIG. 1
III. HARDWARE—MCS OF FIG. 11
IV. METHOD AND MEANS EMPLOYING QAP CONTROL PROGRAM (PQAPCNTRL)
  A. CONSTRUCTION AND USE OF CLASSIFY_TABLE 1200, SUFFIX_STRIP_STATE_TABLE 1201, ACCEPTABLE_SUFFIX_TABLE 1202, AND SUFFIX_TABLE 1204
  B. OPERATION
  C. ALTERNATE EMBODIMENT OF FIG. 6
  D. METHOD AND MEANS EMPLOYING SUFFIX STRIPPER PROGRAM (PSUFIX)
  E. MISSPELLING CLASSIFICATION SYSTEM
    1. INTRODUCTION
    2. DIGITAL DATA PROCESSING METHOD AND MEANS OF FIGS. 11 AND 12A-12L
    3. ALTERNATE EMBODIMENT OF FIG. 14
    4. ALTERNATE EMBODIMENT OF FIGS. 15 AND 16
    5. ALTERNATE EMBODIMENT OF FIG. 17
    6. ALTERNATE EMBODIMENT OF FIG. 18
V. TABLES
  TABLE 1—WORD FORMAT AND SYNC SIGNALS
  TABLE 2—ACCEPTABLE AND NONACCEPTABLE MISSPELLING CLASSES
  TABLE 3—QRIO STRUCTURE IN EXTERNAL RAM 1104
  TABLE 4—PARM STRUCTURE; QUERY INFORMATION TRANSFERRED FROM EXTERNAL RAM 1104 IN INTERNAL RAM 1126,1128
  TABLE 5—VARIABLES/TABLES USED BY PQAPCNTRL
  TABLE 6—PSUFIX RELATED DATA ITEMS INCLUDING PARAMETERS,VARIABLES AND TABLES

TABLE 7—ENTIN STRUCTURE; ENTRY WORD FORMAT RETURNED BY MCS 1114 TO RAM 1126,1128 ON QAP BOARD 1109
TABLE 8—CLASSIFY_TABLE
TABLE 9—SUFFIX_STRIP_STATE_TABLE
TABLE 10—ACCEPTABLE_SUFFIX_TABLE
TABLE 11—SUFFIX_TABLE
TABLE 12—STRIPPING RULES, ACCEPTABLE SUFFIXES AND EXAMPLES
TABLE 13—not used
TABLE 14—EXAMPLE
TABLE 15—not used
TABLE 16—COMPARE TYPE INDICATION
TABLE 17—EXAMPLE OF MISSPELLING CLASS DETERMINATION
TABLE 18—TRIPLET COMPARE TYPE INDICATION
TABLE 19—EXAMPLE OF MISSPELLING CLASS DETERMINATION FOR WORD WITH NON UNIQUE CHARACTERS
TABLE 20—SEQUENCE OF OPERATION FIGS. 7, 8

I. GENERAL DESCRIPTION

A. Computer Program Method and Means

1. Introduction

FIG. 1 is a schematic and block diagram of a programmable digital data processing system. Included are hardware and computer programs, the latter being stored in read only memory, for locating and determining candidate (also called entry) words contained in a stored data base which are both acceptable misspellings and acceptable inflections of query words. The data base preferably is a textual data base arranged into paragraphs and records. Hardware and software are also included that use the entry words which are acceptable misspellings and acceptable inflections of the words of the query and scores the paragraphs of the data base according to how well the paragraphs match the acceptable entry words. Representations of the paragraphs of the data base are returned to the user in decreasing order by score, the best scored paragraph being returned first.

Referring to FIG. 1A, a user using terminal 1102 enters query words, each word composed of one or more characters, into the system. External circuits including interface 1103, microprocessor 1108, random access memory (RAM) 1104, and read only memory (ROM) 1106 then parse the words of the query and throw away those words which have little or no significance to the query, called stop words. The remaining query words are referred to as the significant words of the query. The significant words of the query after parsing are stored in RAM 1104 and are then taken one by one and used to interrogate entries in a stored data base to locate those data base entry words which are both an acceptable misspelling and an acceptable inflection of the significant query words. Representations of the entry words of the data base are stored in various forms in a memory, namely, external disk storage device 1107, and as required are transferred through a disk controller 1105 to a random access memory (RAM) 1104 for processing.

QAP control board 1109 is a programmable microprocessor system. More particularly the QAP control board 1109 contains a microprocessor 1118 and a misspelling classification system 1114 which in turn also contains a programmable microprocessor. Also included in the system are two read only memories which for convenience are shown as one and is designated herein as read only memory (ROM) 1122,1124, two random access memories which for convenience are shown as one and is designated herein as random access memory (RAM) 1126,1128, and a first-in first-out (FIFO) memory 1130. An interface and control system designated generally at 1115 provides an interface between the microprocessor 1118 and the bus 1110 and hence the rest of the external circuits to the right of bus 1110. The interface control system 1115 also provides an interface between microprocessor 1118 and ROM 1122,1124, RAM 1126,1128, and FIFO 1130. The FIFO 1130 provides the main communication for transferring data between the MCS 1114 and the microprocessor 1118.

The programs which control the operation of the microprocessor 1118 are stored in the ROM 1122,1124. RAM 1126,1128 provides a scratch pad memory as well as a storage for various values utilized by the microprocessor 1118 in its operation.

Briefly, representations. of each significant query word are transferred from RAM 1104 to RAM 1126,1128. There the microprocessor 1118 takes the query words, one at a time, strips the suffix from the query words, leaving a stem, and forms a suffix classification indication for the query words. The query word is then passed through the FIFO 1130 to the MCS 1114. In addition the family of entry words for the query word are transferred from RAM 1104 through the FIFO 1130 to the MCS 1114. The microprocessor in the MCS 1114 then takes the stem of the query word, compares it against the beginning characters of the entry words, and, for each entry word, determines a misspelling classification. Those entry words determined to have an acceptable misspelling classification as compared to the query word stem are then transferred back along with the misspelling classification for the entry word to the FIFO 1130 and from there to the RAM 1126,1128. At this point then the RAM 1126,1128 contains the entry words which are acceptable misspellings of the corresponding query word, the length of the stem of the corresponding query word, and the suffix classification indication for the corresponding query word. The microprocessor 1118 then utilizes the length of the stem and the misspelling classification value to determine the position of the suffix in each entry word and further uses the suffix classification indication to determine if each of the entry words is an acceptable inflection of the original query word. Those entry words which are acceptable misspellings and further are acceptable inflections of the original query word are called equivalent words to the query and representations of those equivalent words are then transferred back to the RAM 1104 where they are used to form packages for scoring and output to the user, as explained hereinafter in more detail.

2. Summary of Method

With the overall block diagram of the system of FIG. 1A in mind, consider now the overall flow diagram of FIG. 1B. Initially as depicted at 3008, the user, using the keyboard 1102A of the operator console 1102 (FIG. 1A) forms a query. The query consists of one or more query words which the user would like to find in combination in a paragraph of the textual data base stored in the disk 1107. By way of example, the query words may be "RATES OF INTEREST".

As depicted at block 3012 the data processing system of FIG. 1A then uses a table of stop words 3010 to identify and remove the stop words from the query, leaving significant query words. The significant query words are then passed to the rest of the flow, one by one.

Each query word is processed as depicted at 3015 by determining the stem of the query word and the length of the stem of the query word. Additionally the suffix of the query word is stripped from the query word, leaving only the stem. The suffix of the query word alone or in combination with the adjacent portion of the stem is used to determine a class of acceptable suffixes for the stem of the query word. To be explained in more detail, the class of acceptable suffixes will be used to determine whether entry (candidate) words whose beginning characters are acceptable misspellings of the stem of the query word have an acceptable suffix and therefore the entry word is both an acceptable misspelling and an acceptable inflection of the query word. Therefore, after block 3015 of the flow, the system will have determined, for each query word of the query, the following: a query stem 3016, which is the original query word with the suffix removed (i.e., for the word "RATES", the suffix "ES" is stripped leaving the query stem RAT); a stem length indication 3018 which indicates the length of the stem (i.e., for the query word "RATES" the stem length will be 3); and a suffix class indication 3020 indicating the class in which the suffix of the query word is contained.

The textual data base contains entry words. One portion of the textual data base is a dictionary of entry words which are stored and are accessible by the first two letters. All of the words having the same first two letters are stored together. For example, representations of significant words beginning with the letters AA are arranged together, representations of significant words beginning with the letters AB are arranged together, etc. The data base entry words which have the same first two characters are called a family of data base entry words. Such an arrangement of the entry words is a preferred arrangement of the data base but is not essential to the present invention.

The family of entry words corresponding to one of the query words is first processed at block 3024 of the flow by comparing the query stem 3016 with the beginning characters of each of the entry words in the corresponding family of query words, thereby forming a set 3026 of entry words which are acceptable misspellings of the query word stem 3016. Therefore the family of entry words corresponding to the query word is reduced to a set of entry words whose beginnings are acceptable misspellings of the query word stem.

During block 3030 of the flow the entry words in set 3026 whose beginning characters are acceptable misspellings of the query word stem 3016 are then checked to determine if they are acceptable inflections of the original query word. To this end the suffix class indication 3020 for the query word is used to access an acceptable suffix table 3028 from which acceptable suffixes are obtained and compared against the entry words in set 3026 to determine those which have acceptable suffixes and are therefore acceptable inflections. Following block 3030 there is a set 3031 of entry words which are acceptable misspellings and acceptable inflections (i.e., equivalents) of the query word.

During block 3032 of the flow the system forms a package 3038 for the query word which has a packet for each entry word of set 3031. Each packet contains a set of coded information or indications which may be used to locate information about the corresponding entry word in the stored data base. Of interest to the present invention is that each packet has indications which as described below are used to locate each of the documents and/or paragraphs within the document in which the corresponding entry word is contained in the textual data base.

The steps of the method in blocks 3015, 3024, 3030 and 3034 are then repeated for another significant query word to thereby locate those entry words which are both acceptable misspellings and acceptable inflections (of the type discussed above) for the next query word. A package 3038 is formed for the next query word and contains a packet for each of the entry words which is an acceptable misspelling and an acceptable inflection of the corresponding query word. This process is repeated for each of the significant words of the query with a package being formed for each of the query words in the manner discussed above.

Using the packages 3038, one for each of the query words, during block 3036 of the flow, paragraph references are obtained which identify the actual paragraphs (and, if desired, documents) in which each of the equivalent words is contained. The paragraph references for each paragraph in the textual data base are then scored according to how well they match the equivalent words and finally, at block 3044, paragraphs of the data base corresponding to the paragraph references which have been scored will be output for visual display on the CRT of the operator console 1102. The textual data base containing the actual paragraphs of text is generally depicted at 3034 in the flow and is accessed and read out using the paragraph references and employing techniques well known in the data processing art.

3. Programs

FIG. 2 is a schematic and block diagram of the various computer programs arranged with reference to the portion of the digital data processing means of FIGS. 1 and 1A which executes each program. As indicated toward the top of FIG. 2, external microprocessor 1108 and RAM 1104 execute programs referred to as QPCNTL, QDETWD, QSS, QDPCMD, and QFLPKG, these computer programs preferably being in the form of firmware stored in ROM 1106. The QAP control board 1109 executes the computer programs PQAPCNTRL and PSUFIX which are stored in ROM 1122,1124. The microprocessor in the MCS 1114 executes the program MCS. The program MCS is also stored in a ROM (not shown) in FIG 1A. Therefore the various programs being stored in ROMs are firmware. To be explained in more detail, all of the computer programs depicted in FIG. 2 play a part in controlling the sequence of operation and thus the method whereby the digital data processing means of FIG. 1 processes the data.

Considering the various programs and their operation, the user first enters the query using terminal 1102. The external circuits 1104–1108 and in particular microprocessor 1108, using conventional programming (details not disclosed), strip the stop words from the query, leaving the significant query words in RAM 1104 which are to be processed by the system of FIG. 1. Stop words are nonsignificant words or words with little meaning such as "a", "the", "of", etc. Word stripping programs of this type are well known and need not be discussed further herein.

The query is a set of words such as a sentence or other group of words which the user wants to locate in the data base. By way of example, the user may want to locate a query containing such words as "HELP", "INTEREST", "RATES", after stripping of stop words. These query words are used by way of reference in subsequent discussions.

The query process control (QPCNTL) program controls the processing of all queries. The significant query words are first passed to the determine word candidate (QDETWD) program. The QDETWD program is a control program module responsible for controlling the looping through all significant query words to determine the acceptable inflections and misspellings of the words in the data base for each query word. To this end the program QDETWD passes the words of the query, one query word at a time, to the fill word packages program QFLPKG.

The textual data base (entry words) is arranged, stored and accessible in the disk storage device 1107, also called a secondary storage, by the first two letters of the word (i.e., in "families"). By calling a data base services program, the program QFLPKG obtains the family of entry words for each query word from the disk storage device 1107 and stores a representation thereof into an ENTRIES buffer (see FIG. 7) in external RAM 1104 and at the same time stores a packet corresponding to each of the entry words into a PACKETS buffer (see FIG. 4). To be explained, a packet is a unique fixed length representation of a word within the data base, as opposed to the actual variable length character stem. Using the query word "HELPS" as an example, all data base entry words having the first two letters HE are put into the ENTRIES buffer of RAM 1104 for processing against the query word.

The storage and retrieval of entry words in families, i.e., by the first two characters, is done for convenience and is therefore preferred but is not essential to the invention.

Each query word, the family of entry words for the query word, and the corresponding packets are passed to the program PQAPCNTRL located in the ROM 1122,1124 on the QAP control board 1109. The program PQAPCNTRL is responsible for reducing the family of entry words to a set of acceptable misspellings and acceptable inflections of the query word.

To this end the program PQAPCNTRL passes a query word to the suffix stripper program (PSUFIX). The PSUFIX program determines a stem of the query word by stripping off zero or more characters (i.e., a suffix), using certain tables and predetermined rules for acceptable suffixes. To be explained in more detail, the PSUFIX program determines the suffix and the stem portions of the query word and then goes on to form a suffix class indication having a value corresponding to any one of a plurality of different classes in which the identified suffix of the query word may be included. For example the query word "HELPS" would have the suffix "S" stripped therefrom. The program PQAPCNTRL then sends the determined query stem and the family of entry words to the misspelling classification subsystem (MCS) 1114.

The programmable microprocessor in the MCS 1114 using its own firmware computer program determines and returns to the program PQAPCNTRL those entry words (in the family) which have beginning characters that are acceptable misspellings of the stem (previously determined) of the query word. The MCS compares the identified query word stem with beginning characters of the entry words and, for a particular entry word, determines whether it is an acceptable or a nonacceptable match with the query word. The MCS also forms a match class indication which represents any one of a plurality of classes resulting from the comparison between the stems of the query and entry words.

After receiving the entry words which are indicated by match class indications to have beginning characters which are acceptable misspellings of the query word stem, the program PQAPCNTRL determines if such entry words have acceptable suffixes for the given query word. This determination is made using the suffix class indication (previously determined) for the query word to locate acceptable suffixes for the entry words. Those entry words which have acceptable suffixes are acceptable inflections of the query word. All of the family of entry words which are both acceptable misspellings and acceptable inflections of a particular query word are preferably separated from the other entry words in the family by placing into the RESULTS buffer (FIG. 7) in RAM 1104 a packet or representation for each acceptable entry word. The packet or representation consists of pointers or other coded information which are used to locate data concerning each of these entry words in the data base on disk storage device 1107. All packets for one query word are arranged in a package. A different package of packets is formed for each query word. Each word package is returned to the program QDETWD via the program QFLPKG in the external circuits.

After all the query words and the corresponding family of entry words for each query word of a particular query are processed, as discussed above, and a package for each query word is formed and returned to the program QDETWD via QFLPKG, the program QPCNTL passes the packages to the program QDPCMD which determines the set of paragraphs in the data base that contain the words of the packages. These paragraphs are then scored according to the number of packages represented in the paragraphs. Representations of the matching paragraphs are then sent to and visibly displayed to the user on the cathode ray tube (CRT) 1102b in terminal 1102 for use in locating desired data in the textual data base. Preferably the paragraphs are returned to the user and displayed on the CRT 1102b in decreasing value order by score, the paragraph with the highest score being returned first.

Although the details thereof are not disclosed herein, preferably the program QPCNTL calls a program QSS which expands the packages for each query word into synonyms and their acceptable misspellings and inflections using the techniques disclosed herein. The program QSS uses the program QFLPKG to perform the expansion. The program QPCNTL then passes the expanded packages to the program QDPCMD.

II. HARDWARE—QAP CONTROL BOARD AND EXTERNAL CIRCUITS OF FIG. 1

FIG. 1 depicts the overall digital data processing system in which the method and means according to the present invention is embodied. The query assist processor board (QAP control board) 1109 includes a microprocessor 1118 along with associated memory and a microprocessor based misspelling classification system (MCS) 1114 and a first-in first-out (FIFO) memory 1130 which serves as a buffer to pass data between the MCS 1114 and other circuits in the QAP control board 1109. Bus 1110 is provided for communication between the QAP control board 1109 and external circuits depicted to the right of the broken line in FIG. 1, including interface 1103 to operator console 1102, microprocessor 1108, random access memory 1104, read only memory 1106, and disk controller 1105 which in turn interfaces with disk storage device 1107. The QAP control board 1109 is a master on the bus and includes arbitration circuits 1172 which interface the microprocessor 1118 to the bus 1110.

The QAP control board 1109 provides the inflection and misspelling tolerance methods and means employed in connection with textual query functions. The microprocessor 1118 executes computer programs stored in read only memories to determine acceptable inflection forms of data base words for a given query word. The MCS 1114 classifies data base entry words into one of the above mentioned six misspelling classes or categories with respect to any significant query word stem.

Consider the circuits of the QAP control board 1109 in more detail. Clock signals for the microprocessor 1118 are derived from a conventional clock generator and driver 1150. The clock driver 1150 additionally cooperates with wait-state logic or generator 1154 to provide a ready signal to the microprocessor 1118 for slow memory and peripheral access.

The microprocessor 1118 is a conventional programmed microprocessor of the type 8086 manufactured by the Intel Corporation, the details of which are disclosed in the MCS-86 User's Manual published by the Intel Corporation and dated February 1979, the contents of which are incorporated by reference herein. Microprocessor 1118 performs the processing functions and generates the address and control signals required to access read only memories hereinafter referred to as ROM 1122,1124 and random access memories hereinafter referred to as RAM 1126,1128 and its I/O devices including the MCS 1114 and the external circuits.

Status lines S0, S1 and S2 out of microprocessor 1118 are driven by the microprocessor and are connected to a control unit 1176, arbitration circuit 1172 and a control circuit 1156. Address and data bus lines from microprocessor 1118 are coupled by way of address and data bus 1160 to a transceiver 1178, onboard address latch 1182, address latch 1158, and data transceiver 1162. I/O QAP decoder 1180 and RAM/ROM decoder 1186 are connected by control bus 1183 to on/off decoder 1184. The output of on/off decoder 1184 is connected to the input of arbitration circuit 1172. An address bus 1168 couples address lines to the address lines of the interrupt controller 1132, timer 1131, ROM 1122,1124, RAM 1126,1128, I/O QAP decoder 1180, RAM/ROM decoder 1186, and onboard address latch 1182. Data bus 1170 is coupled to the data lines of interrupt controller 1132, timer 1131, FIFO 1130, ROM 1122,1124, RAM 1126,1128, and transceiver 1178. A control bus 1188 is coupled to the control circuits of interrupt controller 1132, timer 1131, FIFO 1130, ROM 1122,1124, RAM 1126,1128, RAM/ROM decoder 1186, I/O QAP decoder 1180, wait-state generator 1154, and controller 1176.

Data bus 1216 couples data between the output portion of FIFO 1130 and the circuits in the MCS 1114. Address bus 1190 couples the output of address latch 1158 to the input of QAP attention circuit 1140 and to bus 1110.

Control unit 1156 is connected to bus 1110 by control bus 1166. Arbitration bus 1192 couples the bus 1110 to arbitration circuit 1172. Data bus 1165 couples the data transceiver 1162 to bus 1110. QAP swap byte logic 1174 has its control inputs connected to the address bus 1190 and an output of control unit 1156 and its output is connected to data transceiver 1162.

Briefly, the QAP control board 1109 operates as follows: The microprocessor has two phases of operation. One is to apply an address on data bus 1160 and the second phase is to either apply or receive data on data bus line 1160. By way of explanation, the data on data bus 1160 is 16 bits in length. The microprocessor 1118 initially puts out an address that is latched by the address latch 1158. At the same time the microprocessor 1118 applies status signals at the S0, S1 and S2 outputs which indicate whether an address is being provided and is a part of a memory cycle or is part of an I/O cycle, or whether there in fact is no memory or I/O cycle but an interrupt acknowledge cycle. The status signals enable the controllers 1176 and 1156 to take control later in the sequence, depending on the type of status signal and the cycle required. The onboard address latch 1182 will enable the address provided by the microprocessor 1118 through to the decoders 1180 and 1186. The decoders 1180 and 1186 will determine if the address is a valid onboard address (i.e., an address to be used within QAP control board 1109) and if so will select the addressed onboard circuit for subsequent transfer. The circuits which are addressed and selected are the following: RAM 1126, ROM 1124, FIFO 1130, timer 1131, and interrupt controller 1132. The decoders 1180 and 1186 also apply signals on control bus 1183 to on/off decoder 1184, enabling it to make a decision as to whether the address is an onboard or an offboard address. If decoder 1184 determines that this is not an onboard address, the address is used for addressing the external circuits bus 1110.

The decoder 1184 applies a signal to the input of arbitration circuit 1172, notifying it that it is responsible for obtaining control of bus 1110. In this regard there are multiple masters on bus 1110 whereas only one master can be putting addresses and data on the bus 1110 at any given time. The arbitration circuit 1172 via arbitration bus 1192 applies a signal on bus 1110 indicating that it is now in control and that none of the other circuits are to use the bus. This signal is sensed by the other circuits which demand access to bus 1110 and accordingly the other circuits do not attempt to apply conflicting signals on the bus.

Once the arbitration circuit 1172 has assumed control over the bus 1110, it passes signals along to control circuit 1156, causing it to apply control signals on the bus 1110 through bus 1116. Arbitration circuit 1172 also applies a signal to address latch 1158 causing it to put the address that was previously latched into the address latch 1158, onto bus 1110.

The control circuit 1156 additionally passes a signal along to data transceiver 1162 and QAP swap byte logic 1174, indicating the type of data transfer now in progress and whether it is data that is moving from address and data bus 1160 to bus 1110 or from bus 1110 to the address and data bus 1160. The controller 1156 in addition passes signals along the circuits 1162 and 1174 indicating whether the data transfer involves 16 bits or 8 bits and, if 8 bits are being transferred, where the 8 bits should be located on the 16 bit bus, i.e., whether it is in the low or high position on the bus.

Any transfer that is either onboard or offboard the QAP control board 1109 must be terminated through the wait state generator 1154. Accordingly the wait state generator receives a signal from bus 1110, causing the wait state generator 1154 in turn to control the clock driver 1150, putting the microprocessor 1118 into a wait state, waiting for data to be transferred.

The wait state generator determines the end of a data transfer when the microprocessor puts an address out to any device whether it is in the external circuits or onboard in the QAP control board 1109. As to data transfers to the ROM 1122,1124 and the RAM 1126,1128, the wait is terminated after a fixed time period. As to transfers over bus 1110, the wait state is terminated by the device with which the communication is taking place. For example if communication is taking place with the external RAM 1104, RAM 1104 generates a signal on bus 1110 indicating that it has put its data on bus 1110 and the wait state may now be terminated. The wait state generator 1154 senses the signal and enables the microprocessor 1118 to continue.

The operation is repeated again by the microprocessor 1118 when it applies an address on the address and data bus 1160.

The QAP attention circuit 1140 may be addressed by any of the circuits connected to bus 1110 by putting a special address on the bus 1110. The QAP attention circuit 1140 merely monitors the bus 1190 for a unique address and for a control signal which are applied thereto through busses 1190 and 1166, and responds to the unique address and the control signal to then apply an interrupt signal (called interrupt-3 signal) on line 1142. The interrupt controller 1132 in turn applies an interrupt to the microprocessor 1118. This then will cause the microprocessor 1118 to interrupt the processing on the QAP control board 1109 so that attention can be given to the requesting device. A program contained in ROM 1122,1124 will then determine the proper course of action to be taken. To this end RAM 1104 has a special buffer storage location similar to a mail box. When an interrupt is applied on the interrupt-3 line 1142, the QAP control board 1109 will interrogate the content of the special buffer storage location to determine the device that is desiring attention and to determine what is to be done. More specifically the microprocessor 1118 goes through a procedure whereby the controller 1132 is caused to pass data on bus 1170 to transceiver 1178 which in turn applies signals to the microprocessor 1118, telling the microprocessor 1118 how to handle the interrupt.

Consider now communication with the MCS 1114. An address, unique to the FIFO 1130, from microprocessor 1118 is placed on bus 1160 to indicate that a transfer is to take place to the FIFO 1130. The microprocessor 1118 must communicate with the MCS through FIFO 1130. The FIFO 1130 has an address just like any other memory (i.e., ROM 1122, 1124, RAM 1126,1128). However it is considered an I/O device rather than a memory device. The microprocessor 1118 forms the address of FIFO 1130 and status signals are formed on lines S0, S1 and S2 indicating that this is to be an I/O write cycle. The address is latched by the onboard address latch 1182 and is applied on address bus 1168. The I/O QAP decoder 1180 decodes the address, determines that it is for FIFO 1130, and signals the FIFO 1130 to receive data. The data is subsequently applied on the address and data bus 1160 and the transceiver 1178 applies the data onto bus 1170 from which the data is stored into the input portion of FIFO 1130.

The data applied into the input portion of FIFO 1130 directs the operation of MCS 1114. The MCS 1114 goes through its operation as described in detail hereinafter and, assuming misspellings are found, the information is stored in the output portion of FIFO 1130. The MCS 1114 then applies an interrupt signal on line 1133 to the interrupt controller 1132 which in turn will interrupt the processing by microprocessor 1118 and provide signals to the microprocessor 1118 which represent that data is available in the output portion of FIFO 1130 from the MCS. The microprocessor 1118 then inspects the data in the output portion of FIFO 1130 and determines what action is required.

The circuits hereinabove described may be any one of a number well known to those in the computer art. Examples of some of these circuits will now be given.

The control unit 1156 may be a bus controller of type 8288 manufactured by the Intel Corporation and disclosed in the above referenced MCS-86 User's Manual. The programmable timer 1131 may be the programmable interval timer type 8253 manufactured by the Intel Corporation and disclosed in the above referenced MCS-86 User's Manual. The interrupt controller 1132 may be the type 8259A manufactured by the Intel Corporation and disclosed in the above referenced MCS-86 User's Manual. RAMs 1126 and 1128 are each preferably composed of static integrated circuit chip circuits well known in the computer art which are accessed via address bus 1168 only by the QAP conrol board 1109 and not by the external circuits. Variables and constants used by the various programs which are executed by the microprocessor 1118 are stored in predetermined locations in RAM 1126,1128 as will be described.

The external circuits include a standard operator terminal 1102 having a keyboard 1102A on which an operator composes textual information including queries. The terminal decodes the keyed textual information and provides machine readable binary coded output signals representing the text. Terminal 1102 also includes a cathode ray tube (CRT) display 1102B on which the results of textual queries are displayed for observation and use by the operator. A conventional interface 1103 connects the terminal 1102 to the bus 1110.

The microprocessor 1108 may be any one of a number of types of computer program controlled microprocessors well known in the computer art and for purposes of illustration is the type 86/12 manufactured by the Intel Corporation and disclosed in the above referenced MCS-86 User's Manual. The computer program for controlling the operation of microprocessor 1108 is stored in external ROM 1106. ROM 1106 is a conventional integrated circuit read only memory well known in the computer art. The random access memory 1104 is the scratch pad memory for the microprocessor 1108. Program variables used by microprocessor 1108 are stored in RAM 1104. Also, the family of entry words from the data base in disk storage device 1107 which correspond to each signficant word of the query are stored in RAM 1104 by microprocessor 1108 before being transferred to QAP control board 1109. After QAP control board 1109 determines acceptable misspellings and acceptable inflections from among the family of entry words, packets are stored in a RESULTS buffer in RAM 1104 which in turn can be used to locate these entry words. Other aspects of the operation of the system will be evident from the above identified referenced manual.

III. HARDWARE—MCS OF FIG. 11

The misspelling classification system (MCS) 1114 embodies means for performing the misspelling classification method according to the present invention. The MCS 1114 receives queries, entries and related parameters through the input portion of first-in first-out buffer (FIFO) 1130. The input portion (I) of FIFO 1130 is the interface of the MCS 1114 with the microprocessor 1118 (FIG. 1). The MCS 1114 performs special misspelling classification methods and returns results to the microprocessor 1118 through the output portion (O) of FIFO 1130 and generates an interrupt signal to notify microprocessor 1118 of completion of its operation.

FIG. 11 is a block diagram of MCS 1114 and also shows the FIFO buffer 1130 and buses 1216 and 1218 (see FIG. 1). Control bus 1218 and data bus 1216 to which the FIFO 1130 is coupled provide the main communication with the rest of the QAP control board 1109 (see FIG. 1). The heart of MCS 1114 is a program control microprocessor 1240. Although the microprocessor 1240 may be any one of a number well known in the computer art, preferably it is the 8×300 Bipolar Microcontroller manufactured by the Signetics Corporation and described in Signetics 8×300 Reference Manual printed in the United States in October 1977 by the Signetics Corporation, the contents of which are incorporated by reference herein.

The microprocessor 1240 is controlled by a computer program in the form of firmware stored in a programmable read only memory (PROM) 1236. In a preferred embodiment, two PROMs are employed. However the number is of no special significance to the present invention. A random access memory (RAM) 1242 is a high speed static RAM used as a scratch pad memory by microprocessor 1240. Again the number of RAMs may vary depending on the particular application.

I/O port 1250 is a conventional input/output port used to provide interrupts back to the microprocessor 1118 to control the operation of the input and output portions of FIFO 1130 and to monitor the status of the input and output portions of FIFO 1130. The output port 1250 generates an interrupt signal on line 1133 which is connected to the interrupt controller 1132 in QAP control board 1109 (FIG. 1) when a result is ready in the output portion of FIFO 1130.

I/O ports 1152 and 1154 are connected between address and data bus 1156 and the input and output portions of FIFO. The I/O port 1252 inputs 16 bits of data from the input portion of FIFO 1130 via data bus 1156 to the microprocessor 1240. The I/O port 1254 forms an output port which outputs 8 bit results from the microprocessor 1240 to the output portion of FIFO 1130. 16 bits at a time are input to FIFO and only 8 bits at a time are output because a greater amount of information is sent to the MCS than is returned. By way of example, not all entries that are sent to the MCS are returned as acceptable misspellings to the microprocessor 1118 in the QAP control board. The details of suitable I/O ports will be evident to those skilled in the art. However for purposes of explanation the I/O ports may be of the type 8T32 manufactured by Signetics Corporation and disclosed in the above referenced Signetics 8×300 Reference Manual.

Address latch 1158 is provided between the address and data bus 1156 and RAM 1242. The address latch 1158 is an output address latch to latch a specific address into RAM 1242 when microprocessor 1240 accesses the random access memory 1242. Although the address latch 1158 may be any one of a number of types known to those skilled in the art, preferably it is of the type 8T31 manufactured by the Signetics Corporation and disclosed in the above referenced Signetics 8×300 Reference Manual.

A typical flow for a query an entry through the QAP control board 1109 will now be described making reference to FIGS. 1 and 14. When the microprocessor 1118 on the QAP control board 1109 has an input for the MCS 1114, it deposits a query, entry, or control sequence into the input portion (I) of FIFO 1130 by doing an I/O output instruction. To the microprocessor 1118 the input portion of FIFO is just another I/O port, by way of example 64×16 bits deep, at the same I/O port address. Each time the microprocessor 1118 does an output instruction to the FIFO, a 16 bit word will ripple into the input portion of FIFO until it becomes full. At this time if the MCS 1114 does not empty the input portion of FIFO and microprocessor 1118 tries to do another output to FIFO, wait generator 1154 (FIG. 1) is activated, generating wait cycles to microprocessor 1118 until the MCS starts removing data from the input portion of FIFO. This situation, however, seldom occurs because the MCS unloads the input portion of FIFO at a much faster rate than microprocessor 1118 writes into the FIFO. The first priority for the MCS is to keep scanning the input portion of FIFO to see if there is any data there to be loaded. To this end the MCS 1114 tries to unload data from the input FIFO into its scratch pad in RAM 1242 as fast as it can until the whole entry, query, or control sequence is loaded. The MCS 1114 then performs the method controlled by the misspelling classification program (MCS) 1234 discussed in connection with FIG. 2. The MCS program as indicated in FIG. 11 is stored in PROM 1236 based on the data in RAM 1242 and sends the results back to the microprocessor 1118 through the output portion of FIFO 1130. When the whole result is deposited into the output portion of FIFO, the MCS will generate an interrupt on line 1133 to notify microprocessor 1118. Subsequently microprocessor 1118 starts unloading the output FIFO by doing an I/O input instruction.

IV. METHOD AND MEANS EMPLOYING QAP CONTROL PROGRAM (PQAPCNTRL)

A. Construction and use of Classify_Table 1200, Suffix_Strip$_{13}$ State$_{13}$ Table 1201, Acceptable_Suffix_Table 1202 and Suffix_Table 1204.

Four tables are used in the process and method for stripping suffixes from query words, for classifying the suffix of the query word, and for determining whether entry words (from a family of entry words) are acceptable inflections of the corresponding query word. These tables are CLASSIFY_TABLE 1200 depicted in FIG. 4A, the SUFFIX_STRIP_STATE_TABLE 1201 depicted in FIG. 4B, the ACCEPTABLE_SUFFIX_TABLE 1202 depicted in FIG. 4, and the SUFFIX_TABLE 1204 depicted in FIG. 5. Each of these tables is stored, is addressable and is accessible by the data processing system in a different prefixed location in the ROM 1122,1124 of the system of FIG. 1. The CLAS- SIFY_TABLE 1200 and the SUFFIX_STRIP_ST-ATE_TABLE 1201 are local variables used by the PSUFIX program (hereinafter described in detail) (see Table 6). The ACCEPTABLE_SUFFIX_TABLE 1202 and the SUFFIX_TABLE 1204 are local variables used by the PQAPCNTRL program (see Table 5).

Before constructing the above tables the designer must create a set of stripping rules and corresponding acceptable suffix lists. These rules and lists are created by observing the particular written language of interest and noting character patterns that appear at the end of related words. By way of example, the following are four groups of words:
Group 1. RAT/E, RAT/ES, RAT/ED, RAT/ING
Group 2. INTEREST, INTEREST/ED
Group 3. HELP, HELP/S, HELP/ED, HELP/ING
Group 4. COMPUT/E, COMPUT/ES, COMPUT/-ING.

Each of the words in each group is considered by the designer as an acceptable inflection of the other words within the same group. Also the designer considers which portion of each word is to be the stem and which is to be the suffix for the word, again in accordance with the language of interest. The above examples are given considering the characters to the left of the slash as the stem, and the characters to the right of the slash as the suffix.

The designer must consider what endings or the lack of an ending (i.e., a null) for a word are acceptable suffixes in forming acceptable inflections. For example the word RAT would not be an acceptable inflection of any of the words in Group 1. Similarly, the word HELPMATE would not be an acceptable inflection for the words in Group 3; the word COMPUTER would not be an acceptable inflection for the words in Group 4.

Accordingly the designer of the tables creates a set of stripping rules and corresponding acceptable suffix lists for use in designing the four tables.

FIG. 12 is one example of such a table including stripping rules, acceptable suffix lists, and examples of words with acceptable suffixes. Certain symbols are used for convenience. For example, the symbol "-" means that any character can be in that position; the symbol "/" means that this is the strip point between the characters of the stem and the suffix; and "null" means a suffix of zero or no characters. Each numbered row corresponds to a different rule. The rules and rows are given the same number for convenience.

Consider by way of example rule 1 in the row No. 1, Table 12. The symbol -/E indicates that the letter E is a suffix when it follows any letter of the stem. To the right in row No. 1, acceptable suffixes for the suffix E are E, ED, ES, and ING, and examples of words employing these acceptable suffixes are RATE and TABLE. In most cases the stem created can have any one of the acceptable suffixes added to the stem to create words that are similar enough to the original entry word to be returned for processing as an acceptable inflection of the original query word. As explained above, if the original word were RATE, then the stem would be RAT and the list of acceptable inflections for that stem would be RATE, RATED, RATES, and RATING.

Referring to rule 2, row No. 2, the symbol -/ES means that the letters ES form an acceptable suffix following any letter in the stem. To the right in row No. 2 it will be noted that acceptable suffixes for the suffix ES include E, ED, ES, and ING. Examples of words employing those suffixes are STATES and COMPUTES. Similar analysis may be used for examining the rules of acceptable suffixes and examples for the rules in rows Nos. 3, 4 and 5. Row No. 6 shows as a rule -/null. This means that any character, or combination of characters, not included by the rules in rows Nos. 1 through 5 is considered as a default or nonstrippable ending and therefore not a suffix. To the right in row No. 6 where there is no suffix on a word, acceptable suffixes would be null, S, ES, ED, and ING. Examples of such words which do not have a strippable suffix are HEBREW, CREDIT, and INTEREST.

When creating the stripping rules and acceptable suffixes, certain exceptions may be determined for simplicity and ease of implementation. Examples of such exceptions for Table 12 are noted toward the bottom of the table. For example if the stem length is less than two characters long, or there are no vowels in the stem and the suffix is not an "S", then no characters will be stripped and the default nonstrip rule indicated at row 6 of Table 12 is used in determining the acceptable suffixes. A further exception occurs if the stem is all numerals. If the stem is all numerals then the acceptable suffixes are only null and "S".

Considering the design of Table 12 in more detail, each rule (i.e., each row) is formed recognizing one particular character pattern class at the end of a word and is intended to be used to strip off zero or more characters. Additionally a suffix classification value (herein sometimes called a suffix classification indication) is assigned to the character pattern class which has associated with it a set of acceptable suffixes. The set of acceptable suffixes for each different valued suffix classification indication when added to the stem created from the query word, will produce words considered similar enough to the original query word to be acceptable inflections of the query word. To be explained in more detail, a suffix classification indication is formed for each query word and is later used to determine whether entry words (whose beginning characters have been determined to be acceptable misspellings of the query word) are proper inflections of the query word. This is done by comparing the suffix of the entry word with the acceptable suffixes in the class designated by the suffix classification indication.

Once a set of rules is created, such as in Table 12, it is important to remove any ambiguity within them so that no word can be stripped in more than one way. The rules should be placed in the table in the order in which they are to be applied in stripping suffixes from the query word. Note that in Table 12, rules 2 and 5 are not ambiguous. The reason is that rule 2 is applied first and if it fails then rule 5 is applied.

Once the rules have been created, an inventory is made of all possible characters that must be recognized in the rules. This inventory of characters is then used in creating the CLASSIFY$_{13}$ TABLE (FIG. 4A). The CLASSIFY$_{13}$ TABLE maps all possible characters to be encountered in the data base into classes of characters that can be treated as equivalents. With reference to Table 12, there are seven character classes, as follows: D, E, G, I, N, S, and all other characters. Each class of characters is then assigned a value called a character type. The characters of the query are represented in ASCII coded characters. The CLASSIFY$_{13}$ TABLE is used to convert each ASCII coded character to its character type. In the example, seven different character classes and hence character types are employed. Table 8 is included as one example of the values of the character types assigned to the letters of the English alphabet. By way of example the seven character classes are assigned decimal character types 0 to 6. As generally illustrated in Table 8 and in FIG. 4A, the character types are stored in sequential addressable memory locations of the CLASSIFY_TABLE 1200 and are accessible using the ASCII coded characters as addresses. In this manner an ASCII coded character for a particular character of the query word can be used to address the CLASSIFY$_{13}$ TABLE 1200 and read out the corresponding character type from the corresponding location of the table. By way of example the character types for the ASCII coded characters A, B, D, and Z are 0, 0, 1 and 0, and are stored at locations 1200a, 1200b, and 1200c of the CLASSIFY_TABLE 1200 in FIG. 4A.

Once the CLASSIFY$_{13}$ TABLE 1200 is constructed, the SUFFIX_STRIP$_{13}$ STATE_TABLE 1201 depicted in FIG. 4B is constructed. By way of example the SUFFIX_STRIP_STATE_TABLE 1201 is shown arranged into rows and columns with a node at the intersection of each row and column. Each column of the table is assigned a value corresponding to a different one of the character types contained in the CLASSIFY_TABLE 1200. By way of example, the columns of the table are numbered from left to right, 0 through 6 (FIG. 4B) corresponding to the different possible character types. The table further has rows corresponding to states. Each row or state of the table represents a step in the process of examining characters at the ends of the query words. Each state represents a particular character context present at the end of a query word at a point in processing. Thus each row or state of the table has as many nodes as there are character types.

Stored at each node are two values, an "ACTION CODE" value (hereinafter sometimes referred to as ACTION or A), and a "NEXT state/selection code" (hereinafter sometimes referred to as NEXT or N). ACTION (A) and NEXT (N) for node 1201A are depicted by the symbols A/N in FIG. 4B by way of example. It will be understood that values for ACTION (A) and NEXT (N) are also contained in other nodes scattered throughout the table of FIG. 4B as required for the particular language and acceptable suffixes to be stripped.

The value of ACTION at each node represents the performance of specific actions that will occur. The value of NEXT at each node is either the next state (or row) of the SUFFIX_STRIP_STATE_TABLE 1201 which the machine will access, or else it will be a selection code (or suffix classification indication) representing a list of acceptable suffixes (and implying that no further state table processing is to be performed).

Table 9 gives an example of the SUFFIX_STRIP_STATE$_{13}$ TABLE for rules and acceptable suffixes depicted in Table 12. The right side of Table 9 provides a state description for ease of understanding. The action to be taken for each ACTION (A) value in the suffix table is indicated at the bottom of the table. Some of the values corresponding to NEXT (N) have an "S" preceding the value. This means that it is a state value and is to be used to select a row of the SUFFIX_STRIP_STATE_TABLE. A value for NEXT (N) without an S means a selection code and is to be used as a suffix class indication. By way of example, NEXT (N) value S4 means state 4 corresponding to row 4 of the SUFFIX_STRIP_STATE_TABLE whereas the NEXT (N) value 4 alone means a selection code or suffix class indication of 4.

The SUFFIX_TABLE 1204 (FIG. 5) is constructed by creating a unique list of all possible suffixes from all the acceptable suffix lists in Table 12. This list is then ordered and structured in the most convenient manner for accessing. Preferably this is in order by length of the suffixes. Referring to FIG. 5, the table is arranged into rows and columns with a node at the intersection of each row and column. The node in the first column 1210 of each row is a character count which specifies the number of characters in the suffix represented to the right. The nodes in the columns 1212 to the right of the first column 1210 are numbered consecutively starting with 0. Each node is a position for storing an ASCII coded character representing a character of the suffix. Thus each row contains one or more characters making up the character or string of characters of a different acceptable suffix contained in the list of acceptable suffixes in Table 12. The rows in the SUFFIX_TABLE 1204 are numbered consecutively beginning with 0. To be explained in more detail, the number for each row is called a suffix index. Suffix indications are stored in the ACCEPTABLE_SUFFIX_TABLE 1202 and are used for addressing the corresponding numbered rows of the SUFFIX_TABLE 1204 to thereby read out therefrom the character or string of characters for an acceptable suffix.

The ACCEPTABLE_SUFFIX_TABLE 1202 (FIG. 4) is used to locate a list of all of the acceptable suffixes for a particular suffix class indication (WDSELECT) or class of suffixes. To this end the designer creates a list of all of the unique acceptable suffixes for each different suffix class indication (WDSELECT) and in place of the actual suffixes, places the corresponding suffix indication. All of the resultant suffix indications for each suffix class indication in the list then become pointers to the rows of the SUFFIX_TABLE 1204 where the actual suffixes can be located and read out.

The ACCEPTABLE_SUFFIX_TABLE 1202 (FIG. 4) is then constructed, by way of example, in rows and columns with a node at their intersections. The rows are numbered consecutively starting with 0 corresponding to the suffix class indications (WDSELECT). Therefore the rows in the tables are addressable using the suffix class indications. All of the suffix indications for a particular suffix classification indication are stored in the corresponding rows at the nodes in columns 1208 of Table 4. The nodes in each row in columns 1206 (which is to the left of columns 1208) store a count value which gives the number of suffix indices in the corresponding row.

Tables 11 and 10 depict examples of the content of the SUFFIX_TABLE 1204 and the ACCEPTABLE_SUFFIX_TABLE 1202 for the rules and acceptable suffixes depicted in Table 12. Each row of the ACCEPTABLE_SUFFIX_TABLE 1202 corresponds to a different valued acceptable suffix indication. By way of example, the acceptable suffix indication 0 corresponds to row 0 of Table 10 (and hence row 0 of FIG. 4) and the acceptable suffix indices are 0 and 2. With reference to Table 11, an acceptable suffix index of 0 has zero or no acceptable suffixes. An acceptable suffix index of 2 contains one acceptable suffix character, namely, an S.

Refer now to Tables 9 through 12 and consider how they implement the rules and acceptable suffixes represented in the design Table 12. Consider by way of example the query word RATE and the entry word RATES, RATED, RAT, and RAPTING. The stem of the query word is RAT. The beginning letters of the entry word are all acceptable misspellings (where that term includes an exact match) of the stem RAT. This includes the word RAPTING which has a single character insertion error and is therefore also an acceptable misspelling. Consider how the digital data processing system will use the tables to first strip the suffix from the query word RATE, derive a suffix class indication and later select the acceptable suffixes corresponding to the suffix class indication, and compare them with the suffixes of the entry words to determine those entry words which are acceptable inflections of the query word.

The data processing system first strips the suffix from the query word RATE leaving the suffix "E". To this end the ASCII coded representation of the character E (in the query word RATE) is used to address the CLASSIFY_TABLE 1200 (Table 8, FIG. 4A) and to read out from the corresponding location the character type value 2. The SUFFIX_STRIP_STATE_TABLE 1201 (Table 9, FIG. 4B) is then accessed. The node at the intersection of row 0 column 2 corresponding to an initial state of 0 and character type 2 is addressed (using the values 0 and 2) and the following is read out:

ACTION(A)=1, NEXT(N)=3.

The ACTION (A) value 1 causes the SIZE value for the query word to be decremented by 1 thereby going from 4 to 3 characters in length, stripping off the character E, leaving the stem RAT. Since NEXT (N) does not include an "S", the suffix has been completely stripped and the value in NEXT (N) is a suffix classification indication, and no further states or operations using Table 1202 are required. The suffix classification indication 3 is then stored as a variable called WDSELECT. The system then compares the stem RAT with the beginning characters of the entry words RATES, RATED, RAT and RAETING and determines that all of the entry words are acceptable misspellings of the stem and therefore returns them as acceptable misspellings. To be explained in another section, a misspelling class indication is also formed indicating the class of misspelling of each entry word which is returned. This indication is used to determine the positions of the suffices in the entry words.

The returned entry words are now checked for acceptable inflections of the query word. Specifically the suffix classification indication (WDSELECT=3) is used to form an address into the ACCEPTABLE_SUFFIX_TABLE 1202 (FIG. 4, Table 10) and accordingly the suffix indices 1, 3, 4 and 5 are read out. These suffix indices form the variable SUFF_IX which is used to form and address the correspondingly numbered rows of the SUFFIX_TABLE 1204. The correspondingly numbered rows 1, 3, 4 and 5 are read out causing the following list of acceptable suffixes (in ASCII code) to be formed: E, ED, ES, and ING. The position of the suffixes in each of the returned entry words is determined using the size value (SIZE) for the stem of the query word and the misspelling class indication. The list of acceptable suffixes is then compared with the suffixes determined in each of the returned entry words and equality is detected between the suffix list and the suffixes in the entry words RATES, RATED and RAPTING. Therefore these words are determined to be acceptable inflections as well as acceptable misspellings of the query word. Lack of equality is detected with the null suffix in the word RAT and therefore the word RAT is rejected as a nonacceptable inflection. Thus rule 1 (row 1) of Table 12 is implemented or defined in the four tables.

Rule 5 in Table 12 is -/S. Although this rule appears similar to rule 1, i.e., -/E, it cannot be handled in the initial state as was the case with rule 1. This is because rule 2, which is -/ES, also has an S at the end following the letter E. This means that, during stripping of the suffix from the query word, rule 2 must be checked first, using Table 1201. If rule 2 is not satisfied upon examining the character preceding the letter S in the query word, then rule 5 will be in effect. This process is implemented in Table 1201 of Table 9 in the column corresponding to character type 6 for an S in row 0. At the intersection of these two columns the ACTION (A) is 0 and the NEXT (N) value is S3. The ACTION (A) value means that no action is to be performed and the value S3 means that the value 3 is to be used as the NEXT value for addressing and accessing the correspondingly numbered row of the SUFFIX_STRIP_STATE_TABLE. In the state row corresponding to the NEXT value 3, each of the nodes is the same except for that under character type 2 for an E. When the ACTION (A) and NEXT (N) values are read out from the table at this node, the ACTION (A) value 2 causes the stem length value to be decremented by 2, thereby stripping off the letters ES and the NEXT (N) value 3 (not having an S preceding it) is a selection code or suffix classification indication. The NEXT (N) value 3 will subsequently be used for accessing row 3 of the ACCEPTABLE_SUFFIX_TABLE 1202 (Table 10) for reading out the corresponding acceptable suffix indices which in turn will be used for accessing the SUFFIX_TABLE 1204 (Table 11) to derive the list of acceptable suffixes. Referring back to Table 9 it will be noted that the rest of state row 3, other than that under character type 2 for an E, has an ACTION (A) value of 1 and therefore will only cause the stem length value to be decremented by 1, thereby stripping only the S at the end of the word and hence satisfying rule 5 (Table 12).

Rule 4 of Table 12 is -/ING and is handled in Table 1201 (Table 9) by three states, namely, 0, 2 and 4. The character G encountered in initial state 0 causes no stripping, and processing continues at state 2. If an N is encountered in the query word during state 2, the G is stripped by decrementing the stem length by 1, and state 4 is next entered. If in state 4 the letter I is encountered, then using the character type 4 and the state row value 4, the corresponding node is read out causing an ACTION (A) value 2 and a NEXT (N) value 4 to be read out. The ACTION (A) value 2 will cause the stem length to be decremented by 2, thereby stripping the N and I from the query word, and the value 3 is used as a suffix classification indication for accessing the ACCEPTABLE_SUFFIX_TABLE 1202 and subsequently the SUFFIX_TABLE 1204 (Tables 10 and 11). Returning to Table 9, if in state 2 anything other than the character N is encountered in the query word, then ACTION (A) value 0 and NEXT (N) value 1 are read out causing a DO NOTHING condition (as far as stripping is concerned) and an acceptable suffix indication of 1, which with reference to Tables 10 and 11 will cause the acceptable suffixes for rule 6 to be obtained from Table 11. If in state 4 anything other than an I is encountered then, with reference to Table 9, ACTION (A) value 3 and NEXT (N) value 1 are read, causing the stem length to be increased by 1, adding back on the stem that was stripped during the preceding state. Again the NEXT (N) value 1 then forms an acceptable suffix indication corresponding to row 1 of Table 1202 (Table 10) which in turn causes the acceptable suffixes at row 6 of Table 1204 (Table 11)to be read out. This then effectively carries out rule 6.

Different methods may be used for implementing the rules of Table 12 and creating the acceptable suffixes. For example by creating more ACTION logic for state 0,column 3, the digital data processing system may automatically determine if the letters "IN" precede the current character G. If so the value NEXT could automatically be set to 4 and the stem length decremented by 3. If the letters "IN" do not precede the current character G, then the data processing system could be arranged for automatically setting the NEXT value to the default selection code (i.e., the suffix classification indication) of 1 which in turn would cause the acceptable suffixes indicated at rule 6 to be read out. For example with the rules of Table 12, the following states are required:

1. Always have an initial state.
2. Rule 1 is satisfied within initial state.
3. Rules 2 and 5 are satisfied with one extra "S" state.
4. Rule 3 is satisfied by one extra "D" state.
5. Rule 4 is satisfied by "G" state and "NG" state.
6. Rule 6 is satisfied by all default nodes of above states.

ACTION codes are created as needed. ACTION codes 0, 1, 2, are more common. ACTION code 3 is required for Rule 4 to counteract unnecessary stripping of "G".

Which implementation is better is sometimes a matter of choice and can effect the simplicity or complexity of the implementation. For example a trade-off is found between the number of ACTION code types and the number of states. For complex sets of rules, more ACTION code types may be a necessity because state proliferation can cause code space problems especially for rule sets that require a large number of character classes.

When a new rule is created in Table 12 there are several ways to integrate or implement the rule in the existing tables. If the rule deals with a new character not dealt with before, it can require the creation of another character type and hence another column in the SUFFIX_STRIP_STATE_TABLE 1201 (Table 9). If there are new suffixes in the acceptable suffix list, then there must be insertions where appropriate within the SUFFIX_TABLE 1204 and the ACCEPTABLE_SUFFIX_TABLE 1202 needs to be modified where insertions cause index vales to change for old suffixes. An example is now given of how the designer would go about adding a rule to the Tables 8-12. Tables 8A, 9A, 10A, 11A and 12A show the changes to Tables 8-12 for adding the following:

| Rule | Acceptable Suffix List | Example |
|------|------------------------|---------|
| -L/Y | E, Y, IES | ASSEMBLY, PROBABLY |

Adding this rule to Table 12 as depicted in Table 12D would require the following:

1. Creating two new character types 7 and 8, respectively, for L and Y in CLASSIFY_TABLE 1200 (see Table 8A).
2. Adding two new columns (7,8) to the SUFFIX_STATE_TABLE 1201 for each of the new character types as well as a new "Y" state row (5) to implement the rule (see Table 9A).

The node in state 0 for the character type 8

$$0 \atop (S5)$$

would be accessed if a query word ended in Y. The new rule only applies if the Y is preceded by an L. For this reason, another state (row 5) must be added. The node of $$0 \atop (S5)$$

specifies: "Do nothing and go to state 5 to examine the next S5 character in from the end". Since the only interest is in stripping a Y if preceded by an L, only the 7th column of state 5 has an ACTION/NEXT node other than default values. Its value pair of $$1 \atop (5)$$

specifies: "Strip a character (Y) off the end of the word and stop with an acceptable suffix list to be found in row 5 of the ACCEPTABLE_SUFFIX_TABLE 1202" (see Table 10A and 4B below).

All other nodes added by the new row and two new columns are default values to implement the other rules of Table 12.

3. Since the acceptable suffixes Y and IES are new suffixes, both must be inserted at the appropriate locations within the SUFFIX_TABLE 1204 to ensure ordering by size and alphabetical order within suffixes of the same size (see Table 11A).

4. As a result of the new rule, the ACCEPTABLE_SUFFIX_TABLE 1202 requires two types of changes:
   A. All suffix string indices that were changed by the insertion of the new acceptable suffixes into the SUFFIX_TABLE; for example, ED changed from 3 to 4, ES from 4 to 5, ING from 5 to 7.
   B. A sixth row (index of 5) must be added to the table to represent this new unique acceptable suffix list of E, Y, IES.

It should be noted that this rule is an example of a situation where the end of the stem as well as the suffix of a query word contributes to the determination of a suffix class indication.

Consider how the suffix classification is determined and how the suffix is stripped for the query word "ASSEMBLY". The character Y causes row 0 column 8 of the SUFFIX_STRIP_STATE_TABLE 1201 (Table 9A) to be accessed, reading out ACTION(A)=0 NEXT(N)=S5. NEXT(N)=S5 is a state code and causes row (or state) 5 of the same table to be accessed. ACTION(A)=0 means that nothing is done to decrease the SIZE value for the query word and therefore no characters are as yet to be stripped.

The next character of the query is L corresponding to a character type of 7. Therefore the node at row 5 column 7 corresponding to NEXT(N) state code of 5 and character type 7 is read out resulting in ACTION(A)=1 NEXT(N)=5. ACTION (A)=1 causes the SIZE value to be decreased by one thereby stripping off the Y from ASSEMBLY. The NEXT(N) value of 5 is a selection code and therefore becomes the suffix classification indication WDSELECT for subsequent use in reading out the acceptable suffix list from row 5 of the ACCEPTABLE_SUFFIX_TABLE 1202 (Table 10A).

Assume instead that the query word were CRAFTY. Row 0 column 8 of the SUFFIX_STRIP_STATE_TABLE 1201 (Table 9A) would have been accessed for the character type 8 for the character Y, resulting in ACTION(A)=0 and NEXT(N)=S5. However, the next character is a T which is a character type of 0. Therefore the system would have accessed row (state) 5 column 0 of the SUFFIX_STRIP_STATE_TABLE 1201 resulting in ACTION(A)=0 and NEXT(N)=1. ACTION(A)=0 is the "do nothing" condition meaning that no characters are stripped. As a result the SIZE value for CRAFTY would remain at 7 and no characters would be stripped. The NEXT(N) value 1 is a selection code and is therefore a suffix classification corresponding to the default, non strip or -/null rule in the ACCEPTABLE_SUFFIX_TABLE 1202 (Table 10A).

B. Operation

Consider briefly the various data structures used by the programs. The data structures are the QRIO structure (Table 3), PARM structure (Table 4), the QA structure (Table 6), and the ENTIN structure (Table 7). Each of these structures is a block of consecutive memory locations. The structures are at fixed locations and each item in the structure is at a prefixed offset in the corresponding block. All of the structures are in internal RAM 1126,1128 except for the QRIO structure which is stored in external RAM 1104.

A shorthand notation sometimes used to refer to the individual items in each structure is by the name of the structure followed by the name of the individual item. For example for the QRIO structure: QRIO.ENTRIES, QRIO.NUMENT, QRIO.PACKETS, etc.; for the PARM structure: PARM.ENTRIES, PARM.NUMENT, PARM PACKETS, etc.; for the QS structure: QS.SIZE and QS.STEM(58). The computer program PQAPCNTRL is executed by the system of FIG. 1 in the QAP control board 1109 and provides the sequencing of operations to determine the acceptable misspellings and inflections of a significant query word from among the family of significant entry words of the data base which begin with the same first two letters as the query word. It is to be noted that the invention is not limited to requirements for a match on the first two characters. For example a match might be required on only the first character or more than two characters. The PQAPCNTRL program is stored in ROM 1122,1124 and is executed out of these memories by the microprocessor 1118.

FIG. 3, composed of FIGS. 3A to 3H, forms a flow diagram illustrating the computer program PQAPCNTRL as well as the resultant method and sequence of operation of the digital data processing means of FIG. 1. FIGS. 3A through 3H use symbolic notations and symbols illustrating the sequence of operation, the meaning of which will become evident from the following discussion. The PQAPCNTRL flow diagrams of FIGS. 3A through 3H are arranged into blocks and are numbered 1-82 for convenience.

Referring to FIGS. 1 and 3, during block 1 of the flow power is turned on in the system of FIG. 1. During block 2 the QAP control board 1109 resets the MCS 1114 to an initial condition, clearing the first-in first-out (FIFO) buffer 1130 to zeros. Additionally, buffers including a variable M8612 (to be explained hereinafter) in RAM 1126,1128 are reset to zero. The variable M8612 is an interrupt flag (see Table 5) and is set to zero in preparation for entering the wait loop in block 3.

All communications between the QAP control board 1109 and the microprocessor 1108 are through a buffer at a predefined location depicted at 1137 in external RAM 1104 (FIG. 1). All information (query word information and entry word information) and status information are passed through buffer 1137. All communications between MCS 1114 and the rest of the QAP control board 1109 are through FIFO 1130. Inputs to the MCS are through the input section of the FIFO whereas outputs from the MCS to the rest of the QAP control board 1109 are through the output section of FIFO 1130.

Table 1 depicts the format of various word and synchronization signals. Five different items are depicted and for brevity are referred to by the table number followed by the number of the item, i.e., item 1 is Table 1-1, item 2 is Table 1-2, etc.

Referring to Table 1-1, following the resets, a 2 byte synchronization pattern consisting of the four hexadecimal digits "AAAA" (AAAAH) is sent by the microprocessor 1118 in the QAP control board 1109 to the input (I) portion of the FIFO 1130 from which it is read by the MCS 1114 to establish communication with the rest of the QAP control board 1109. "H" following a series of characters is used herein to denote a hexadecimal number. The MCS 1114 responds to the synchronization pattern by sending the same 2 byte synchronization pattern AAAAH back to the output (O) portion of FIFO 1130 and by forming an interrupt signal on line 1133 to interrupt controller 1132 which in turn applies an interrupt signal on line 1134. This interrupt causes the computer program PQAPCNTRL to cause the 2 byte synchronization pattern to be removed from the output portion of FIFO 1130.

Block 3 of the flow is a condition where the QAP control board 1109 goes into a command wait loop, waiting for an interrupt from the external microprocessor 1108, which signifies a request for service.

Deviating from the flow for a moment, the QAP control board 1109 communicates with the external microprocessor 1108 through communication buffer 137 in the external RAM 1104 in FIG. 1. A special QAP driver program (not shown) located in ROM 1106 causes command and parameters to be set into the communication buffer in the external RAM 1104, moving them from a buffer where information was set by the program QFLPKG. When the QAP control board 1109 detects an input because of an interrupt from the external microprocessor 1108, it moves pertinent parameters from a QRIO structure of data shown in Table 3 in the communication buffer to a PARM structure, shown in Table 4, located in a predetermined buffer 1125 in internal RAM 1126,1128. When the QAP control board 1109 finishes at the predefined buffer in external RAM 1104 with the results of the request and issues an input/output command which in turn causes an interrupt to the external processor 1108 causing it to process the result.

The QRIO structure (Table 3) includes a command byte. The only commands of interest are a command byte of 0, indicating an initiate query, and a command byte of 1 indicating a continue query. The operations responsive to these commands are discussed hereinafter.

The structure also includes a value called ENTRIES which is a pointer to the location in external RAM 1104 where the family of entry words, beginning with the same two letters as the query word, is located. NUMENT is a word value giving the number of entry words in the RAM buffer pointed to by ENTRIES. The value PACKETS in the QRIO structure is a pointer to the beginning of a buffer of packets located in RAM 1104. A PACKET is a fixed length entry which is a complete representation of an entry word in the data base. The packets within this buffer correspond in a one-to-one fashion with the entry words within the buffer pointed to by ENTRIES (i.e., the first packet corresponds to the first entry word). RESULTS is a value in the QRIO structure which is a pointer to the beginning of a buffer in external RAM 1104 to receive those packets corresponding to entry words which are determined to be acceptable misspellings and inflections by the PQAPCNTRL program. NUMAVAIL is a word in the QRIO structure which identifies the maximum number of PACKETS which the RESULTS buffer will hold. A more complete discussion of these items and their use will be given in connection with block 28 of the flow of FIG. 3. QCHARS is a byte which identifies the total number of characters in the query word. QUERY(58) is an array of representations of the actual characters of the query character string which are being processed. The symbol (58) is used herein to indicate that the corresponding field of characters may be up to 58 characters or bytes long. However the invention is not limited to any particular length. A byte of information has 8 bits of information. A character is a byte of information.

Returning to block 3 of the flow, assume that the microprocessor 1108 generates an interrupt to the QAP, signifying a request. The interrupt causes an interrupt handling routine (not shown) on ROM 1122,1124 to store a nonzero value in RAM 1126,1128 in variable M8612 (Table 5). This causes the PQAPCNTRL program during block 4 to clear M8612 to zero and enter blocks 6 through 8. Here PQAPCNTRL causes the command byte in the QRIO structure located in external RAM to be checked. Assume now that during block 8, either an initiate command (0) or a continue command (2) is detected in the QRIO structure in external RAM 1104. This causes the operation of the QAP control board under control of the PQAPCNTRL program to branch through bullet B1 of the flow to block 15A of the flow.

If block 15A of the flow is reached it is because the QAP control board 1109 has received a request from microprocessor 1108 to initiate or continue a query. During block 15A a copy of the QRIO structure in external RAM 1104 (Table 3) is transferred to an identical PARM structure (Table 4) at a fixed location in the buffer in internal RAM 1126,1128. Block 16 of the flow is then entered. Certain initializing steps are now taken (see details in block 16 and Table 5). Representations of all of the items listed in Table 5, with the exception of the ACCEPTABLE_SUFFIX TABLE and SUFFIX_TABLE, are stored or declared to be in fixed locations of RAM 1126,1128. Representations of the ACCEPTABLE_SUFFIX_TABLE and SUFFIX_TABLE are stored in ROM 1122,1124. Block 17 is then entered.

During block 17 the PARM values QCHARS and NUMENT stored in internal RAM 1126,1128 are checked to determine whether they are valid. If QCHARS is greater than or equal to 2, then the query word contains at least two characters and is acceptable. If NUMENT is greater than zero, it means that there are some entry words to compare to the query stem and NUMENT is acceptable. Block 18 is entered and if either of these PARM values is unacceptable, the NO route out of block 18 is followed and block 23 will be entered where a parameter error is logged and the system exits through bullet H2, returning eventually back to block 3 of the flow. Assuming the parameters are acceptable (OK), the YES route out of block 18 is followed to block 19 where a check is made to see whether the command provided in the PARM structure is an initiate command. If the command is an initiate command, then block 24 of the flow is entered where a check is made to see whether a query is already in progress.

The variables depicted in Table 5 include a QUERY_IN_PROGRESS flag. This flag is set true on the first call to the PSUFIX routine which will occur during the subsequent block 26. During block 24 the QUERY_IN_PROGRESS flag is checked to see whether it is already true. Assuming this is the first call on the PSUFIX program, the flag will be false and block 26 will be entered. If for some reason the flag is true during block 24, then block 25 is entered where the MCS 1114 and the QAP control board 1109 are reset and a QAP control board error is logged and then the operation returns through bullet H2 eventually back to block 3 where the PQAPCNTRL enters its wait loop.

Assuming no error and block 26 is entered, the PSUFIX program (FIG. 10) which is stored in internal ROM 1122,1124 is now called and executed by the microprocessor 1118. The details of the operation while executing the PSUFIX will be discussed in detail in connection with FIG. 10. However a brief summary will be given at this point.

When PSUFIX is activated the system takes the PARM structure items (Table 4) QCHARS and QUERY(58) and, using the CLASSIFY_TABLE (Table 8) and the SUFFIX_STRIP_STATE TABLE (Table 9) stored in internal ROM 1122,1124, locates the stem and suffix portions of the query word represented by QCHARS and QUERY(58) and forms a suffix class indication (WDSELECT) in the query (QS) structure indicating the one of a plurality of classes in which the identified suffix of the query is included Table 6 depicts the QS structure which is the structure of information obtained by the call to the PSUFIX program. Referring to Table 6, the system under control of the PSUFIX program returns the values FFH representing a query command, a value SIZE which designates the number of characters in the query word stem, and a string of characters in STEM which are the actual characters in the stem of the query word. In addition a QTYPE value is returned which indicates whether the query is an alphanumeric word (0) or is an all numeric word (1) and the value WDSELECT is returned. WDSELECT is an index into a row of the ACCEPTABLE_SUFFIX_TABLE and is an indication of a class of suffixes on entry words that are acceptable, given the suffix stripped from the given query word.

Additionally during block 26 the QUERY_IN_PROGRESS flag (Table 4) is set true as discussed above.

Return now to the flow of FIG. 3. During block 27 the QUERY command portion of the QS structure of Table 6 is transferred through the input portion (I) of the FIFO 1130 to the MCS 1114. The query command flag (FFH) indicates to MCS 1114 that what follows is a query stem and MCS 1114 saves the SIZE and STEM characters in its internal RAM (FIG. 11).

During block 20 of the flow the command in the PARM structure (Table 4) is checked and if the command under execution is not a CONTINUE command, the program continues through bullet Cl to block 28. If on the other hand the command under execution is a CONTINUE command, then block 21 is entered in order to check to see whether a query stem word had been sent to the MCS 1114.

A CONTINUE command is one which indicates that the operation is to continue using a QUERY command previously provided to the MCS 1114. This situation occurs when the number of entry words in the family to be compared to the query word is too large to fit in the buffer in external RAM 1104 provided by the program QFLPKG. An initiate request and possibly one or more CONTINUE requests are then sent to QAP control board 1109 until either all entry words are sent or the result buffer space in external RAM 1104 allotted for misspellings and inflections of the original query word is filled with PACKETS. If a query had not been sent, then block 22 is entered where a continue error is logged and the operation returns via bullet H2 eventually back to block 3 where the system under control of PQAPCNTRL enters its command wait loop.

Assuming that a query word has already been sent to the MCS, block 28 is entered following block 21 or block 20. At this point a program loop is entered to process all of the entry words pointed to by the values ENTRIES and NUMENT in the PARM structure (Table 4). In block 28 an entry word in external RAM 1114 is transferred under control of PQAPCNTRL to the MCS 1114 through the input section of FIFO 1130.

The MCS 1114 in an asynchronous operation compares each of the received entry words against the query stem (STEM, Table 6) returned by a call on the PSUFIX program. Each of the entry words as sent to MCS 1114 has a format of the type depicted in Table 1-4. The parts of the entry word format are as follows: First is an unused byte. The first bit of the unused byte is strapped or set to zero under software control to avoid conflict with other control bytes in the MCS program such as AAH and FFH. Second is a packet index value which is the index of the packet in the PACKET buffer residing in the external RAM 1104 that corresponds to an entry word. Third is a SIZE byte which designates the number of bytes (i.e., characters) in the entry string. ENTRY(58) is the actual characters of the entry, the actual number of which is designated by SIZE. The actual number of entry characters sent is always an even number. For example, if SIZE=8, then 8 characters are sent. If SIZE=9 then 10 characters are sent. The MCS 1114 disregards the added (e.g., 10th) character. This is necessitated by the fact that the input portion of FIFO is 16 bits wide (2 bytes or characters).

Assume that MCS 1114 now has a query stem word and an entry word (see Table 7). The MCS then goes about the operation of comparing the query stem with the characters at the left end of the entry word. The MCS 1114 will only return those entry words which have acceptable misspellings (as defined above) with respect to the query word. It should be noted that the comparison made is only up to the length of the query stem, indicated by the SIZE byte in the query structure QS (Table 6), so that an exact match for instance is returned for a query stem of CAT and an entry word of CATATONIC. In the example for the entry word CATATONIC, ATONIC is considered to be the suffix in later processing.

As indicated in Table 1-5, the format of the entry word returned by the MCS 1114 is essentially the same as the format of the entry word (Table 1-4) which was provided to the MCS except that an MTYPE value is added at the beginning, indicating the type of misspelling classification between the query stem and entry word. Table 2-6 contains a listing of the different misspelling classifications which may be designated by the MTYPE value of the entry word. Although mismatch and substitution are included, they actually are not returned by the MCS to the external microprocessor. It should be understood that the invention is not limited to this arrangement. For example, all of the words could be returned with the MTYPE value indicating the type of error and subsequent processing could be used to eliminate the nonacceptable misspelling classifications.

With reference to Table 5, a variable MCS will be noted. The variable MCS is a location in the buffer in internal RAM 1126,1128 used to store a value which indicates the number of acceptable entries in the output portion of FIFO 1130. When the MCS1114 finds an acceptable entry it forms an interrupt signal on line 1133 which in turn causes interrupt controller 1132 to provide an interrupt on line 1134 and the microprocessor 1118 in turn increments the variable MCS so that the value of the variable MCS will reflect that another entry has been placed in FIFO. To be explained in connection with block 32, the MCS variable is decremented by 1 when an entry is read out of the output portion of FIFO.

The operation during block 28 will become more clear during the following discussion with reference to the example of FIGS. 7, 8 and 9. FIG. 7 depicts a buffer located in external RAM 1104 containing the following entry words: HEBREW, HELP, HELPS, and HEPLS which are to be compared against the query word HELPS. It will be understood that the query word HELPS has been processed, stripping the suffix S, leaving the stem HELP and the stem HELP is to be compared against the entry words in buffer 1402. In the actual operation the stem word has already been sent to MCS 1114 at this point in the operation.

Consider the format of the entry in buffer 1402 in more detail. Each of the entry words is preceded by a length value which gives the number of characters in the corresponding entry word. For example, the first value of 6 indicates a length in characters of the word HEBREW. The buffer 1402 contains all of the family of entry words for the query word HELP (by way of example, HEBREW, HELP, HELPS, and HEPLS), that is, all words beginning with the same first two letters as the query word HELP. It should also be noted that the number of entries in buffer 1402 is indicated by the value NUMENT contained in the PARM structure in internal RAM 1126,1128 (see Table 4).

At the lower part of FIG. 7 buffer areas 1404 and 1406 are shown. Buffer area 1404 is depicted having the same number of entities as there are word entries in buffer 1402. Each entity in buffer 1404 is a PACKET. The PACKET is a fixed length entry which is the complete representation of a word in the data base. By way of example, entry 0 is a PACKET which is a pointer or some other type of indication that allows the word HEBREW (first word in buffer 1402) and/or information pertaining to HEBREW to be located and accessed in the data base located in the disk storage device 1107. Similarly, entries 1, 2, and 3 contain PACKETS for the second, third and fourth words HELP, HELPS, and HEPLS in buffer 1402 which are pointers to the same words or information about these words stored in the disk storage device 1107.

Buffer area 1406 is the results field where results from the processing by PQAPCNTRL control are stored. More specifically, the PACKET for each entry word which is both an acceptable misspelling and an acceptable suffix will be transferred by microprocessor 1118 from buffer 1404 to buffer 1406. By way of example, the words HELP, HELPS, and HEPLS are acceptable misspellings and have acceptable suffixes for the query word HELP and their PACKETS will be transferred to the first three locations within the RESULT buffer 1406. The entry word HEBREW is not an acceptable misspelling and therefore its PACKET is not transferred from buffer 1404 to buffer 1406. The PARM values PACKETS and RESULTS (see Table 4) point to the beginning of buffers 1404 and 1406.

Return now to the flow of FIG. 3 and consider the operation during block 28. Microprocessor 1118 utilizes the entries in a buffer such as buffer 1402 and other variables to store in the input portion of FIFO 1130 a word having the format depicted in Table 1-4. Initially during block 28 microprocessor 1118 forms the unused byte in the output portion of FIFO 1130. Next, microprocessor 1118 takes the content of the variable PACKET_IX from internal RAM 1126,1128 (Table 5) and places it in FIFO 1130. At this point in the example depicted in FIG. 7, the value of the variable PACKET_IX is zero. FIG. 8 gives an example of the entry command string formed in the input portion of FIFO 1130 for the entries depicted, by way of example, in buffer 1402 in FIG. 7. With reference to FIG. 8, a PACKET_IX of zero corresponds to entry 0 for the entry word HEBREW. The purpose of placing the value PACKET_IX in the entry word format is so that if the entry word is found to be an acceptable misspelling and to also have an acceptable suffix, the correct PACKET may be accessed in PACKET buffer 1404 and transferred over to the RESULT buffer 1406.

Next the microprocessor 1118 reads the length value for the entry. Assuming for example that the first entry in buffer 1402 is being transferred, the length value 6 is stored into FIFO, creating the entry SIZE value indicated in the first row of FIG. 8.

Subsequently the microprocessor transfers the actual representations of the entry word ENTRY(58) to FIFO. For example each of the six characters of the word HEBREW are sequentially transferred from buffer 1402 into FIFO, therefore transmitting the complete entry word depicted in the first row of FIG. 8.

Microprocessor 1118 sets an entry word pointer (not shown) to the next word in the entry buffer 1402. In the example it would then point to the length value 4 for the word HELP. Additionally the variable PACKET_IX (in internal RAM 1124,1126) is incremented by 1. In the example PACKET_IX now points to entry 1 corresponding to the PACKET for the word HELP in the PACKET buffer 1404.

In addition during block 28 microprocessor 1118 decrements the PARM value NUMENT (Table 4) by 1 so that it now indicates the remaining number of entries in buffer 1402 to be sent.

Similar operations take place for the remaining entries in buffer 1402 causing the remaining entry word formats indicated at rows 2, 3 and 4 of FIG. 8 to be formed and stored in the input portion of FIFO 1130. After the MCS 1114 processes the entry words depicted in FIG. 8 it will determine that only the entry words HELP, HELPS, and HEPLS have stems which are acceptable misspellings of the query stem HELP. The MCS returns the three acceptable entries in the output portion of FIFO in the ENTIN format indicated in FIG. 9. Each entry word includes the MTYPE, the unused byte, the corresponding PKINDEX, the SIZE value and the entry character string (see ENTIN structure, Table 7). During blocks 66–73 of the flow, microprocessor 1118, after determining which of the entries have acceptable suffixes, will utilize the PKINDEX value in each entry in order to access the PACKET buffer 1404 and transfer the corresponding PACKET over to the results buffer 1406.

Block 29 of the flow (FIG. 3) is entered following block 28. Assuming no interrupt is received from the external microprocessor 1108, the operation passes through block 29 to block 30. By way of background, block 30 is only of interest after the last entry has been sent to the MCS 1114 and, as indicated in blocks 70, 71, at which time a place mark pattern (see Table 1-2) is sent by the microprocessor 1118 to the MCS and timer 1131 is set to time the MCS until it returns the place mark pattern. If the MCS does not return the place mark pattern within the preprogrammed time set in programmable timer 1131, timer 1131 will provide an interrupt signal to the controller 1132 which in turn causes microprocessor 1118 to set global variable TIMER (in local RAM 1126,1128) nonzero, causing processing to be interrupted and a MCS timeout error to be logged, and control returns to block 3 eventually via bullet HI. Assuming that no MCS timeout occurs, block 31 is entered.

The MCS 1114 sends an interrupt to the microprocessor 1118 whenever it puts an entry word that is an acceptable misspelling into the output portion of FIFO 1130. The interrupt handling routine under control of the microprocessor 1118 is activated upon receipt of this interrupt and increments the variable MCS located in internal RAM 1126,1128 (see Table 5) by 1.

During block 31 (FIG. 3) a check is made to see if the MCS has put anything in the output portion of FIFO 1130. To this end if the variable MCS (Table 5) is now nonzero, indicating that there are acceptable entries in the output portion of FIFO 1130 for processing, the acceptable entries are processed by entering blocks 32 et seq. If on the other hand the MCS variable is zero, then bullet G3 is followed to block 67 of the flow (FIG. 3G), thereby skipping the intermediate processing steps for acceptable entry words.

During block 32 (FIG. 3) the first byte removed from the output section of FIFO 1130 is checked. This may be an MTYPE byte of an entry word (Table 7), the first byte of a PLACE MARK (see MCS 1114 response, Table 1-2) or the first byte of an error sequence which is of no interest here. The PLACE MARK value FF00H (sent under control of PQAPCNTRL by the microprocessor 1118) is returned by the MCS 1114 to the output section of FIFO 1130 after the last entry word in order to notify the system that the last entry has been processed. An error sequence may be returned if the MCS detects any inconsistencies with an entry sent or the MCS detects an internal error within itself. In addition during block 32 PQAPCNTRL causes the MCS variable (Table 5) to be decremented by 1 to reflect that it is removing something from the output portion of FIFO 1130 for further processing.

Going on to block 38 (FIG. 3), if the first byte in the FIFO is MTYPE (see Table 1-5) i.e., not a special input, FFH, then blocks 39 et seq. are entered where the entry word in the FIFO is processed. Assume instead that the byte indicates a special input and that the second byte indicates a PLACE MARK PATTERN (FFOOH) i.e., no error condition exists, then blocks 46 and 47 are entered where appropriate housekeeping steps are taken to indicate that processing has been completed. If an error flag of some type or an illegal value is detected in the second byte, then blocks 45 or 48 may be entered where failures are logged. However these steps are of no specific interest to the present invention.

Assuming that during block 38 (FIG. 3) the first byte is indeed an MTYPE byte as depicted in Table 7, block 39 is entered where processing of the corresponding entry word is commenced. It should be noted that the acceptable entry word in FIFO 1130 which was returned from the MCS is one which has a beginning that is an acceptable misspelling of the query word stem. The processing during blocks 39 et seq. are used to determine if the entry word is also an acceptable inflection of the query word, that is, has a suffix that is in the acceptable class of suffixes determined by PSUFIX.

During blocks 39-72 of the flow (FIG. 3) PQAPCNTRL causes the comparison of the suffix of an entry word with acceptable suffixes. The acceptable suffixes are those indicated by the suffix classification indication value WDSELECT in the query structure QS (Table 6) which was returned under control of the PSUFIX program. The suffix classification value WDSELECT in the QS query stem structure (Table 6) is used to select one of the rows in the ACCEPTA-BlE_SUFFIX_TABLE 1202 (FIG. 4, Table 10). Thus the WDSELECT value in the QS structure (Table 6) is used to select one of the rows in the table of FIG. 4 and one of the suffix indication values in one of the columns 1208 of the selected row is read out and is used as a SUFF_IX value or address pointer to select one of the rows in the SUFFIX_TABLE 1204 (FIG. 5). The suffix indication read out of the ACCEPTA-BLE_SUFFIX_TABLE is put into a local variable SUFF_IX (Table 5) in local RAM 1126,1128 which is an index representing a row of the SUFFIX_TABLE. Local variable I located in RAM 1126,1128 (see Table 5) indicates the particular column in that row of the ACCEPTABLE_SUFFIX_TABLE from which a suffix indication is to be read out.

A J variable (FIG. 5, and Table 5) is used to select the columns and hence the representations of the character string in a selected row of the SUFFIX_TABLE 1204 (FIG. 5, Table 11).

C. Alternate Embodiment of FIG. 6

FIG. 6 is a schematic block diagram depicting an alternate embodiment of digital data processing means for carrying out the method depicted in blocks 40-64 of the flow of FIG. 3 and embodying the present invention. The method of operation of the alternate embodiment of FIG. 6 closely parallels a portion of the operation of the embodiment of FIGS. 1, 2 and 3. Therefore for simplicity in describing the operation of the two embodiments, certain portions of the FIG. 6 embodiment will first be discussed followed by a discussion of the operation of the FIGS. 1, 2 and 3 embodiment and the corresponding operation of the FIG. 6 embodiment.

Consider now the elements of FIG. 6. A control counter or control unit 1301 is depicted having outputs 40 through 64 corresponding to blocks 40-64 of the flow of FIG. 3 at which control signals are formed corresponding to states 40-64 respectively of the control unit 1301. A memory or store 1300 stores the ACCEPTABLE_SUFFIX_TABLE 1202. The suffix indices in columns 208 of the ACCEPTABLE_SUFFIX_TABLE are indicated by the symbols S.I. The suffix count in column 1206 of the ACCEPTA-BLE_SUFFIX_TABLE is indicated by the symbol C.

The SUFFIX_TABLE 1204 is stored in a memory or store 1304. The actual characters of the character strings in columns 1212 are indicated by the symbol S whereas the character count, which may be also called a length value in column 1210 of the SUFFIX$_{13}$ TABLE, is indicated by the symbol L. The columns of the ACCEPTABLE_SUFFIX_TABLE 1202 in store 1300 are addressed by register 1308 which stores the fixed value SUFFIX_COUNT pointing to the first column 1206 of the table, and by a counter 1310 which stores a count I pointing to one of columns 1208. The rows of ACCEPTABLE_SUFFIX_TABLE 1202 are addressed by register 1306 which stores the suffix class indication WDSELECT from the query structure QS. The columns of the SUFFIX TABLE 1204 in store 1304 are addressed by a register 1316 which stores a length value pointing to the character count or length value in column 1210 of the table, and a counter 1318 which stores the J count which selects one of the columns 1212 of the table.

The following will discuss the sequence of operation during blocks 39-63 of the flow making reference both to the method applicable to the system, of FIGS. 1 and 2 created under control of the computer program depicted in FIG. 3 and to the parallel operations in the alternate embodiment of FIG. 6.

FIGS. 1, 2 and 3—During the operation at flow block 39 (FIG. 3), the following variables have been set in RAM 1126,1128 by the data processing means of FIGS. 1 and 2: MTYPE contains the permissible match class indication for the particular entry word (MTYPE, Table 7); SIZE in the query QS structure contains the size of the query stem in bytes which was obtained during a call to the PSUFIX subroutine (SIZE, Table 6); WDSELECT in the query structure QS is set to a value corresponding to a row index of the ACCEPTA-BLE_SUFFIX_TABLE from the call to the PSUFIX routine (Table 6); QTYPE in the query structure QS contains either a 0 (alphanumeric query stem) or 1 (numeric query stem) to force further limits on the type of results returned from MCS that are acceptable (i.e., numeric query stem will cause PQAPCNTRL to only look at entry words returned from MCS that are exact match types, see block 53A); and the rest of the ENTIN structure (see Table 7) beyond MTYPE is set to the entry items that are removed from the output portion of FIFO 1130.

FIG. 6—The corresponding operation in the embodiment of FIG. 6 is as follows: register 1308 is set to the value SUFFIX_COUNT in the first column 1206 of the ACCEPTABLE_SUFFIX_TABLE row indicated by value WDSELECT stored in register 1306, I counter 1310 is set to 0 pointing to column 0 of columns 208 of the ACCEPTABLE_SUFFIX_TABLE, length register 1316 is set to 0 pointing to column 1210 containing the length or character count values of the SUFFIX TABLE, the J counter 1318 is set to 0 pointing at column 0 of columns 1212 containing the individual characters of the character strings in the SUFFIX TABLE, the register ENTIN_SIZE 1322 is set to the total length of the entry word which is the value SIZE in the entry word format (Table 7), register QS_SIZE 1320 is set to the stem length or SIZE value for the query word (Table 6), the actual characters of the entry word in ENTRY (58) (Table 7) are stored in the EN-TIN_ENTRY register 1328, and register QTYPE 1365 is set to the value QTYPE (Table 6) which describes the query stem as being an alphanumeric string (0) or a numeric string (1).

FIGS. 1, 2 and 3—The characters of the suffix portion of the entry word must be located within the entry word. This is done using the size of the query stem specified by SIZE (Table 6) and the MTYPE for the entry word now being processed. More specifically, the positions of the characters of the entry word are assigned increasing numbered values starting with 0. A SIZE value indicating the number of characters in the stem would therefore point to the first character of the suffix. The size of the query stem, SIZE (Table 6), is adjusted to account for deletions or insertions, if necessary, and the adjusted SIZE value in the query structure QS then becomes the actual size of the stem in the entry word. The adjusted size in effect forms a pointer to identify the suffix of the entry and distinguish it from the stem or the rest of the entry word. To this end, block 40 of the flow is now entered where the first byte of the suffix of the entry word is computed. To be explained in more detail, the actual computations are done during blocks 41-52 et seq. The particular one of blocks 41-52 which is entered depends on the permissible match class indication stored in the ENTIN variable MTYPE (Table 5). The particular one of blocks 41-52 which is entered determines the adjusted size value which is stored into the variable ENTRY_INDEX (Table 5). The variable ENTRY_INDEX is then used to select or determine the first character of the suffix in the entry word.

If MTYPE is a zero (Table 2), indicating multiple errors, this entry is not to be processed and accordingly the variable ENTRY_INDEX is set to zero (block 41). If MTYPE is a 1, indicating an exact match, the length of the entry stem is exactly the same as the length of the query stem and therefore the length of the query stem, QS.SIZE (Table 6), is stored into the variable ENTRY_INDEX (block 42). If MTYPE is a 2, indicating a single transposition error, then the lengths of the entry and the query stems are the same and the QS.SIZE is stored into the variable ENTRY_INDEX (block 49). If the MTYPE is a 3, indicating a single character deletion error (in the query with respect to the entry), then the entry stem is one character longer than the query stem and accordingly the query stem length plus one (QS.SIZE+1) is stored into the ENTRY$_{13}$ INDEX variable (block 50). If MTYPE is a 4, indicating a single insertion error (in the query with respect to the entry), then the entry stem is one character shorter than the query stem and the query stem length minus 1(QS.SIZE-1) is stored into the ENTRY_INDEX variable (block 51). If MTYPE is a 5, indicating a single substitution error, then the ENTRY_INDEX variable is set to 0 (block 52). MTYPES 0 and 5 are looked for at this point just for the sake of completeness and are not possible values that can be returned in the current implementation.

FIG. 6—Consider the corresponding operation of the schematic block diagram of FIG. 6. The control unit 1301 branches from state 40 to one of states 41-52 where a control signal is formed at the corresponding output 41-52 of the control unit. For example, if an MTYPE of 0 is stored in register 1360, control unit 1301 branches to state 41 where the control signal at output 41 sets ENTRY_INDEX 1324 to 0. If the MTYPE value in register 1360 is 1, then state 42 is entered where the query size value in the QS_SIZE register 1320 is stored directly through transfer circuit 1362 into the ENTRY_INDEX register 1324. If the MTYPE value in register 1366 is 2, then state 49 of the control unit is entered where transfer circuit 1362 transfers the size value in register 1320 directly to the ENTRY_INDEX register 1324. If the MTYPE value in register 1360 is a 3, control unit 1301 branches to state 50 where arithmetic circuit 1364 adds 1 to the value in the QS_SIZE register 1320 and stores the incremented value into the ENTRY_INDEX register 1324. If the MTYPE value in register 1360 is a 4, control unit 1301 enters state 51 where arithmetic circuit 1365 subtracts 1 from the value in the QS_SIZE register 1320 and stores the result into the ENTRY_INDEX register 1324. If the MTYPE value in register 1360 is a 5, control unit 1301 branches to state 52 where a 0 is stored into the ENTRY_IN-DEX register 1324. Following any one of states 41-52, the control unit 1301 goes to state 53. Also, in the flow of FIG. 3, following block 52, block 53 of the flow is entered.

FIGS. 1, 2 and 3—In summary at this point, the adjusted value of the variable SIZE in the query structure QS (the number of characters in the query stem) has been adjusted depending on the permissible match class indication (MTYPE) so that it now accurately gives the length of the stem for the entry and the resultant value is now contained in the variable ENTRY_INDEX in RAM 1126,1128 (Table 5) and in register 1320 in the embodiment of FIG. 6.

Return now to the flow diagram of FIG. 3. During block 53 the Boolean SUFFIX_OK variable in the internal RAM 1126,1128 (Table 5) is set false, thereby indicating that a match between the suffix of the entry word and an acceptable suffix has not yet been found. To be explained in connection with block 62, the SUFFIX_OK value is set true when a match between the suffix of the entry and an acceptable suffix has been found.

FIG. 6—The setting of the SUFFIX_OK value to a false condition is depicted in the embodiment of FIG. 6 by a register 1330 which has two conditions. The control unit 1301 during state 53 causes SUFFIX_OK register 1330 to be set to a false condition.

FIGS. 1, 2 and 3—At block 53A (FIG. 3) a check is made to further restrict the types of entry words that can qualify as acceptable misspellings. If the query stem is numeric (QS.QTYPE=1), then only those entry words returned by the MCS which have a misspelling classification type of exact match (1) are allowed to be checked further for acceptable suffixes (flow allowed to proceed to block 54), otherwise processing continues at block 66. If the query stem is alphanumeric, then flow is allowed to proceed to block 54 always.

FIG. 6—The corresponding operations in FIG. 6 are as follows. When control unit 1301 goes to state 53A, comparator 1366 performs the equivalent check using values in registers 1360 and 1365, transferring control to either state 54 or 66. Specifically, comparator 1366 compares the MTYPE and QTYPE values and if QTYPE = 0 or (QTYPE = 1 and MTYPE = 1), then the comparator causes control unit 1301 to enter state 54. If QTYPE = 1 and MTYPE is not 1, then comparator 1366 causes state 66 of the control unit 1301 to be entered.

FIGS. 1, 2 and 3—During block 54 of the flow (FIG. 3), local variable I in the internal RAM 1126,1128 is set to a 0 condition. The variable I serves as the index to the columns containing the suffix indices (S.I.) of the ACCEPTABLE_SUFFIX_TABLE. The variable I is subsequently incremented as the suffix indices, in a particular row, are read out.

FIG. 6—Control unit 1301 goes to state 54 and the control signal at output 54 sets I counter 1310 to 0.

FIGS. 1, 2 and 3—During block 55 of the flow, the suffix indice is indexed by 1 in the row of the ACCEPTABLE_SUFFIX_TABLE selected by the variable WDSELECT of the query structure QS is read out and stored in the storage location in the internal RAM 1126,1128 known as SUFF_IX. To this end the WDSELECT variable and the I variable are used for addressing a particular row and column in the ACCEPTABLE_SUFFIX_TABLE, causing a suffix indice to be read out and stored in SUFF_IX to access a row of the SUFFIX_TABLE.

FIG. 6—This same action is depicted in FIG. 6 during state 55 of the control unit 1301 by selection circuit 1303 which reads out the indice from the column identified by the value in I counter 1310, and the row identified by the value in the WD_SELECT register 1306, and provides the value to the SUFF_IX register 1312 where it is stored under control of the control signal at output 55 of the control unit 1301.

FIGS. 1, 2 and 3—During block 56 of the flow a compare is made to determine whether the number of characters in the suffix in the row identified by the variable SUFF_IX is equal to the length of the suffix in the entry word. If they are not equal then it is known in advance that there will not be a match and accordingly the program will branch from block 56 to block 63 via bullet G1, bypassing the process in the intermediate blocks of comparing the individual characters. If they are equal, the suffixes may match, and blocks 57 et seq of the flow are entered where the process of comparing is done.

To this end, during block 56 the ENTRY_INDEX value (Table 6), which is the number of characters in the stem of the entry, is subtracted from ENTIN variable SIZE (Table 6), which identifies the total length or number of characters in the entry word. The difference is a value representing the number of characters in the suffix of the entry word string. Additionally the character count or the length value L in the row of the suffix table identified by the value SUFF_IX is read out from the suffix table and is compared with the preceding difference value. If they are not equal, then the previously described branch to block 63 via bullet G1 is taken. If the values are equal, then block 57 is entered following block 56.

FIG. 6—Correspondingly, FIG. 6 operates as follows. State 56 of the control unit 1301 is entered, creating a control signal at output 56. This causes subtraction circuit 1334 to subtract the entry suffix size value in the ENTRY_INDEX register 1324 from the value representing the total length of the entry in the ENTIN_ SIZE register 1322 and the result is applied to a comparator 1336; a selection circuit 1338 to read out the length value L from the column of the suffix table specified by the LENGTH value in register 1316 and in the row specified by the value in the SUFF_IX register 1312 and provide the length value to the other side of comparator 1336. If there is a lack of equality, a NO control signal is formed by comparator 1336. If equality is found, a YES control signal is formed by comparator 1336. A NO control signal causes control unit 1301 to branch from state 56 to state 63. A YES control signal causes a branch to state 57.

FIGS. 1, 2 and 3—Returning to the flow (FIG. 3), assume that there is an inequality encountered during block 56, causing block 63 of the flow to be entered through bullet G1. The I variable in the internal RAM (Table 5) is now incremented by 1 so that it now points to the next column containing a suffix indice in the ACCEPTABLE_SUFFIX_TABLE. This action is indicated in the embodiment of FIG. 6 in that state 63 of control unit 1301 is entered and the control signal 63 causes the I counter 1310 to be incremented by 1.

Following block 63, block 64 of the flow is entered where the variable I in RAM 1126,1128 is compared with the count value contained in the row of the ACCEPTABLE_SUFFIX_TABLE specified by the variable WDSELECT in the QS structure in RAM 1126,1128 (Table 6). If the variable I is equal to the count value, then the YES route is taken and block 66 is entered. If the variable I is smaller, then the NO route is followed and block 55 is reentered via bullet E3. The variable I will be equal to the count value when all of the suffix indices in the row have been accessed. The I value will be smaller when additional suffix indices remain in the row to be accessed.

FIG. 6—The corresponding operation in FIG. 6 follows. State 64 of the control unit 1301 is entered. The control signal at the 64 output of the control unit 1301 causes the selection circuit 1303 to read out the count, as selected by the value in the SUFFIX_COUNT register 1308 in the row specified by the value in the WDSELECT register 1306. The count value read out by selection circuit 1303 is provided to comparator 1342 which compares the count with the incremented value in the I counter 1310. If the count in the I counter 1310 is smaller, then comparator 1342 forms a control signal at the NO output, whereas if it is equal or larger, a control signal is formed at the YES output. A control signal at the NO output causes the control unit 1301 to branch from state 64 back to state 55, whereas a YES control signal causes control unit 1301 to change from state 64 to state 66.

FIGS. 1, 2 and 3—Return to flow block 56 and assume that an equality is found between the number of characters in the suffix of the entry word and the number of characters in the row SUFF_IX of the SUFFIX_TABLE. Block 57 of the flow is entered. Block 57 is provided for determining if the character count or length of the suffix in the SUFFIX_TABLE row presently pointed to by the variable SUFF_IX is 0. If it is 0 there is no need to go through the subsequent steps of comparison of the suffix of the entry ENTRY (58) (Table 7) and accordingly a branch is taken through bullet F3 to block 62 where the intermediate comparison steps are skipped. This determination is made by reading out the length value from the row of the SUFFIX_TABLE pointed to by the variable SUFF_IX and by checking to see whether the length value is 0. If it is 0, then the YES branch is made through bullet F3 to block 62. If it is not 0 then the NO branch is taken causing block 58 to be entered.

FIG. 6—The embodiment of FIG. 6 accomplishes this operation as follows: if during state 56 of the control unit 1361, comparator 1336 detects an equality, control unit 1301 goes to state 57 and forms a control signal at its output 57. This causes the length value specified by the value in the SUFF_IX register 1312 and the LENGTH register 1316 to be read out and applied by selection circuit 1338 to a comparison circuit 1350 which generates a YES signal if the length value is 0 and a NO signal if it is not 0. Control unit 1301 branches from state 57 to state 62 in response to a YES signal and from state 57 to state 58 in response to a NO signal from circuit 1350.

FIGS. 1, 2 and 3—Assume now that block 58 of the flow is entered. Blocks 59-61 are the blocks during which the actual characters of the suffix of the entry word are compared with the representations of the characters of the suffix read out from the SUFFIX_TABLE.

During block 58 the variable ENTRY_INDEX in the internal RAM 1126,1128 (Table 5) is transferred to a variable used as a counter called the K variable, in the same RAM. Thus the K variable now contains the address of the first character of the suffix in the entry word string ENTRY(58) (Table 6). The J variable in RAM 1126,1128 is the one which points to the characters of the suffix string in the row selected by the variable SUFF_IX in the SUFFIX_TABLE. Also during block 58 the J variable is set to 0 so that it now points to the first character of the suffix string in the SUFFIX_TABLE.

FIG. 6—The embodiment of FIG. 6 accomplishes the foregoing operation as follows: the control unit goes to state 58 in the event comparator 1350 senses other than 0. During state 58 of the control unit 1301 a transfer circuit 1353 copies the value in the ENTRY_INDEX register 1324 into the K counter 1352, thereby selecting the first character of the suffix in register ENTIN_ENTRY and the control signal at the 58 output of the control unit causes the J counter 1318 to be set to 0.

FIGS. 1, 2 and 3—Returning to the flow, block 59 is entered. The character in the suffix of the entry is selected from the ENTRY array ENTRY(58) in the ENTIN structure (Table 9) in RAM 1126,1128 using the value of the K variable. The character of the suffix string pointed to by the variable J located in the row of the SUFFIX_TABLE pointed to by the variable SUFF_IX is selected. During the first entry to block 59 the K variable points to the first character of the suffix in ENTRY(58), whereas the J variable points to the first character of the suffix string from the row of the SUFFIX TABLE pointed to by the variable SUFF_IX. Also during block 59 the selected entry and suffix string characters are compared to determine if they are equal. If they are not equal, a branch is taken through bullet G1 to blocks 63 and 64 where, as discussed above, the I variable is incremented and a check is made to determine if another acceptable suffix is to be compared with the entry suffix. If the comparison results in an equality, meaning that the two characters are the same, then block 60 is entered following block 59.

FIG. 6—The embodiment of FIG. 6 accomplishes the foregoing operation in that counter 1352 containing the K variable and the control signal at output 59 of control counter 1301 causes selection circuit 1354 to select the suffix character in ENTIN_ENTRY register 1328, which is pointed to by the value in the K counter 1352 and provides the selected suffix character to a comparator 1356. In addition the selection circuit 1338 reads out the character of the suffix string in SUFFIX_TABLE pointed to by the value in the SUFF_IX register 1312 and the J counter 1318. The read out suffix character is applied to the comparator 1356 which forms a signal at the YES output if the comparison is equal, and a signal at the NO output if the comparison is not equal. The control unit 1301 is responsive to the control signals at the output of the comparator 1356 to branch to state 63 responsive to a control signal at the NO output, and to state 60 for a control signal at the YES output of comparator 1356.

FIGS. 1, 2 and 3—During block 60 of the flow the J and K variables in RAM 1126,1128 are incremented by 1 so that they now point to the next characters of the suffix in the entry word and the suffix string of the SUFFIX_TABLE.

FIG. 6—This operation is accomplished in FIG. 6 as follows: the control signal at the output 60 of the control unit 1301 causes the K counter 1352 to be incremented by 1 and the content of the J counter 1318 to be incremented by 1.

FIGS. 1, 2 and 3—Block 61 of the flow is now entered where a check is made to see if the last character of the row in the SUFFIX_TABLE has been compared. To this end the present value in the variable J is compared with the length value in the same row, the row of course being selected by the variable SUFF_IX. If an equality is not detected, then all of the characters of the suffix string pointed to by the variable SUFF_IX have not been compared with the characters of the entry string and a branch is made via bullet F2 back to block 59 where the incremented values in the J and K variables are used for comparing the next characters of the suffixes in the entry word and in the suffix string of the SUFFIX_TABLE. If an equality is detected (the J variable is now equal to the length value), then block 62 of the flow is entered followed by block 66.

FIG. 6—The embodiment of FIG. 6 accomplishes the operation of block 61 in that the control signal at the 61 output of the control unit 1301 causes selection circuit 1338 to read out the length value selected by the values in the SUFF_IX register 1312 and the LENGTH register 1316. The length value so selected is applied to the input of a comparator 1357 which compares the length value with the value in the J counter 1318. If an inequality is detected then the control signal is formed at the NO output, whereas if an equality is detected, a control signal is formed at the YES output. The control signal at the NO output of comparator 1357 causes control unit 1301 to go from state 61 to state 59 and a control signal at the YES output causes control unit 1301 to go from state 61 to state 62.

FIGS. 1, 2 and 3—Assume now that block 62 of the flow is entered. As discussed above, if block 62 is entered following block 61, the last character of the suffix string pointed to by the variable SUFF_IX has been compared. If block 62 is entered following block 57, there are no characters in the suffix string of the SUFFIX_TABLE pointed to by the variable SUFF_IX. Accordingly during block 62 the Boolean value SUFFIX_OK in the internal RAM 1126,1128 is set to a true state indicating that a suffix match has been detected.

FIG. 6—This is accomplished in the flow diagram of FIG. 6 in that the control signal at the 62 output of the control unit 1301 sets the SUFFIX OK store 1330 to a true state.

FIGS. 1, 2 and 3—Assume now that block 66 has been reached. This would occur, for example, after all of the suffixes identified by the suffix indices in the row of the ACCEPTABLE_SUFFIX_TABLE indicated by WDSELECT of the QS structure have been considered as possible suffixes of the entry word. During block 66 the Boolean value SUFFIX_OK is checked to see if it is true, indicating that a match or an equality has been found between a suffix identified by a row in the SUFFIX_TABLE and the suffix of the entry word. If the Boolean value is true then block 72 is entered where a check is made to see if there is available room in the result buffer in external RAM 1104 to put the corresponding PACKET in the PACKETS buffer for the entry now being processed. This is done by checking the variable RESULT_IX (Table 5) against NUMAVAIL (Table 4). If room is available (i.e., RESULT_IX less than NUMAVAIL), then block 73 is entered where the corresponding PACKET in the PACKETS buffer for entry word indexed by PKINDEX is moved into the PACKET location in the result buffer in the external RAM 1104 indexed by the variable RESULT_IX (Table 5), and the variable RESULT_IX is incremented by 1 to index the next available PACKET location in the result buffer in external RAM 1104.

Block 67 of the flow is entered following box 66 or block 31. Here the MCS variable (Table 5) stored in internal RAM 1126,1128 is checked to see if it is greater than 0, meaning there are more entry word results in the output portion of FIFO 1130 to be processed. If the variable MCS is greater than 0, then a branch is taken back to block 31 et seq. where the remaining results in FIFO 1130 are processed as discussed above. If variable MCS is not greater than 0, there are no more results and block 68 of the flow is entered.

At block 68, a check is made using the item TASK_COMPLETE (Table 5) to see if a place mark has been removed from the output portion of FIFO 1130. If TASK_COMPLETE is true a place mark (Table 1-2) has been returned and processing continues at block 75 where exit processing is performed. A place mark pattern is always sent to the MCS after the last entry word is sent to MCS so that PQAPCNTRL knows when all entry words have been processed by the MCS. This is necessary because the MCS 1114 only returns entry words which meets its misspelling criteria and therefore PQAPCNTRL needs some way of knowing that all entry words have been processed. This fact is known when the place mark is pulled from the output portion of FIFO 1130. If TASK_COMPLETE is false at block 68, then processing continues at block 69.

At block 69 a check for the place mark pattern having been sent to the MCS is made. If it has, then processing continues at block 29 which eventually takes processing to block 31 (in the normal case) where a check is made for results from MCS 1114. If a place mark pattern has not been sent to block 69, then processing proceeds to block 70.

At block 70, a check is made to determine if more word entries have yet to be sent to MCS 1114. If yes, then processing continues at block 28 through bullet C1 where the next entry is sent to the MCS 1114. If no more entries are to be sent, then the PARM value NUMENT (Table 4) will be 0 and block 71 is entered.

At block 71, PQAPCNTRL causes a place mark pattern FF00H to be sent to MCS 1114 through the input portion of FIFO 1130, and the Boolean value PLACE_MARK_SENT (Table 5) is set to true. Processing then continues at block 39 through bullet C2 which normally will drop down to MCS timeout checks (block 30) and MCS results checks (block 31).

Block 75 is entered via bullet H1 whenever an error has been detected and logged under control of PQAPCNTRL, when all word entries have been processed, or when the result buffer is detected to be full. At this point, a check is made to see if the reason this point was reached was due to a MCS timeout. If yes and a retry has not occurred yet, then the MCS is reset, item M8612 (Table 5) in RAM 1126,1128 is set to 1 in order to simulate an interrupt having been received by microprocessor 1108, and processing begins again at bullet A1 where another attempt at the query is made. If a retry has already occurred, then reset MCS, log an MCS timeout error, and continue processing at block 76.

When block 76 is reached, either an error has been logged under control of PQAPCNTRL, or processing is completed because all entries were processed or the result buffer (1406 FIG. 7) is filled. If an error was detected, block 79 is entered, the error log is stored in the prefixed communication buffer located in external RAM 1104 (same buffer that QRIO structure of Table 3 is located in), and processing continues at block 78. If an error was not logged, block 77 is entered, a normal status and the number of result packets stored in the result buffer are stored in the prefixed communication buffer located in external RAM 1104. Processing then continues at block 78.

At block 78, an interrupt to the microprocessor 1108 is generated under control of PQAPCNTRL to notify it of the completion (successful or not) of the request that was made. An interrupt handler program running in microprocessor 1108 will then be activated in response to the interrupt, and other programs running under microprocessor 1108 will access the result information in the prefixed communication buffer, transferring the data to the QFLPKG program. QFLPKG will then process the results returned by PQAPCNTRL. After the interrupt is generated, PQAPCNTRL then continues processing at wait loop at bullet A1, waiting for the next request from microprocessor 1118.

D. Method and Means Employing Suffix Stripper Program (PSUFIX)

The suffix stripper program (PSUFIX) stored in ROM 1122,1124 is called by the PQAPCNTRL program during block 26 of the flow of FIG. 3. The PSUFIX program controls the digital data processing means of FIG. 1 to thereby determine the stem portion of the query word, to form an acceptable suffix class indication for the query word and to determine whether the query word stem is numeric or alphanumeric. The query word stem determined under control of the PSUFIX program is compared against the stem portions of entry words for acceptable misspellings in the entry words. Subsequent to PSUFIX processing, the PQAPCNTRL, as described above, causes those entry words having stem portions which are acceptable misspellings to be checked against suffixes falling in the class of acceptable suffixes indicated by the suffix class indication to determine which entry words are also acceptable inflections of the query word.

The actual output from the operation controlled by the PSUFIX program is as generally depicted in Table 6 including a QFLAG byte specifying a query command, a SIZE byte specifying the size of the query in bytes (or characters), a STEM(58) string which is the actual query stem character string, a QTYPE byte specifying whether the STEM(58) are alphanumeric characters or all numeric characters, and a WDSELECT word which is the suffix classification indication for the query word, (a row index into the ACCEPTABLE_SUFFIX_TABLE). The foregoing information is computed using the interface information described in the following section.

The communication interface with the PSUFIX program is via two global structures stored in predetermined locations in the internal RAM 1126,1128 of the QAP control board 1109. The first global structure is the PARM structure depicted in Table 4. Of specific use in the PSUFIX control program are QCHARS, specifying the total number of characters in the query character string, and QUERY(58) which is the actual query character string. Table 6 depicts the variables used by the PSUFIX program and which are also located in prefixed locations in internal RAM 1126,1128.

ROM 1122,1124 has two tables stored in prefixed locations. These tables are the CLASSIFY_TABLE 1200 (FIG. 4A, Table 8) and the SUFFIX_STRIP_STATE_TABLE 1201 (FIG. 4B, Table 9).

Consider now the actual method of operation of the system of FIGS. 1 and 2 controlled by the PSUFIX program, making reference to the flow diagram of FIG. 10 and Tables 8 and 9. The various blocks of the PSUFIX flow of FIG. 10 are numbered 1 through 28 for ease of reference. Symbolic notation is used to illustrate the sequence of operation and will become evident to those skilled in the art during the following discussion. The PSUFIX program is stored in ROM 1122,1124 and is executed by the microprocessor 1118 in the QAP control board 1109 using RAM 1126,1128.

For ease of explanation it is assumed that a suffix is to be stripped from the query word HELPS. With reference to the stripping rules, Table 12, it will be seen that the only application rule is -/S which means that any character preceding the letter S will cause the letter S to be stripped.

The operation begins in block 1 of the flow (FIG. 10). During block 2 the SIZE variable in the QS structure (QS.SIZE) located in RAM 1126,1128 (Table 6) is set to the total number of characters in the query word specified in the PARM structure by QCHARS, also located in internal RAM 1126,1128 (see Table 4).

Also during block 2, QUERY(58), the query character string, is moved from the PARM structure in internal RAM 1126,1128 (Table 4) to the STEM(58) field of the QS structure, also in internal RAM 1126,1128 (see Table 6).

In addition, the variable NEXT (Table 6) in the local variables is set to a value representing 128. With the value 128 stored in the variable NEXT, the high order bit of the binary coded value NEXT is a 1, whereas all the rest of the bits in the value NEXT are zero (indicating the initial state of 0). In addition the CURCHAR variable in the local variables is set to the value of SIZE in the QS structure (Table 6), less 1. The SIZE value is the size or length of the query stem in the query stem structure QS (Table 6).

During block 3 of the flow (FIG. 10) the PSUFIX program causes the 1 value in the high bit (which represents 128) to be masked from the rest of the variable NEXT leaving a NEXT value of 0. The NEXT value of 0 thus selects row 0 of the SUFFIX_STRIP_STATE_TABLE (FIG. 4B, Table 9). The position of the current character of the query word being processed is now designated by the value in CURCHAR. In this regard the characters of the query string are numbered starting with 0. Accordingly, after block 2 when CURCHAR was stored with the value of SIZE-1, the CURCHAR value actually points to the end character of the query character string in STEM(58). Continuing with the operation, the character S of the query word HELPS, now pointed to by the variable CURCHAR, is used as an index into the CLASSIFY_TABLE (Table 8). More specifically, the ASCII coded value representing the letter S is used as an index into the table (indexed from 0) to select the character type value 6 from the CLASSIFY_TABLE.

The current character type value 6 is now used to select a column in the SUFFIX_STRIP_STATE_TABLE (FIG. 4B, Table 9). To this end the character type 6 is stored in the CURCHAR variable in internal RAM 1126,1128 (Table 6). Thus at this point the values to be kept in mind are as follows: NEXT=0 (after masking), CHARTYPE=6, CURCHAR=4 (i.e., SIZE-1). The SUFFIX_STRIP_STATE_TABLE (FIG. 4B) is now accessed using variable NEXT to select row 0 and CHARTYPE to select column 6. With reference to Table 9 it will be seen that the ACTION (A) value is 0 whereas the NEXT (N) value is S3. The value S is used in front of a number in Table 9 to indicate a state value. If an S appears in front of a number for a particular NEXT value, the high order bit (corresponding to the decimal value 128) is a 1. Returning to the example, the ACTION value 0 and the NEXT value S3 are read out from the SUFFIX_STRIP_STATE_TABLE and are stored in the variables ACTION and NEXT in internal RAM 1126,1128 (Table 6). The value in NEXT will be used the next time block 3 is entered unless it is changed by subsequent ACTION processing or the NO path at block 18 is taken.

Returning to the example, at this point the pertinent values are ACTION=0 and NEXT=3. Block 4 of the flow (FIG. 10) is now entered. Block 4 is a decision block that directs the processing flow based upon the variable ACTION.

The ACTION value causes one of four blocks of the flow to be entered. ACTION may vary between 0 and 3. ACTION 0 through 3 corresponds to flow blocks 5 through 8, respectively.

In the example for the query word HELPS, the variable ACTION=0 causes block 5 to be entered where no action is taken (i.e., do nothing). Following block 5, bullet T1.2 is followed to bullet S1.4 to block 16 of the flow.

Before continuing with the example for the query word HELPS, consider the actions taken during the other blocks 6 through 15 (FIG. 10).

Return to the example for the query word HELPS. The pertinent values are still ACTION=0, NEXT=3 and CURCHAR=4. Block 16 (FIG. 10) is entered following the do nothing block 5 where the CURCHAR and NEXT values stored in internal RAM 1126,1128 are checked to see if both CURCHAR is a 0 and NEXT is less than 128 (i.e., did not have an S preceding the value for NEXT in Table 9). If this condition is true, then the data processor has run out of characters in the query character string for processing (CURCHAR=0) and NEXT is a state value. Therefore the machine would not have detected an acceptable suffix. Under these conditions no stripping of any characters is to be made and accordingly block 21 of the flow is entered. Block 21 of the flow causes the variable NEXT to be set to a selection code value of 30 which is the default non-strip selection code. Accordingly during block 21 the SIZE value in the query stem structure QS (Table 6) is set equal to the value QCHARS in the PARM structure (Table 4) and therefore now stores the total number of characters in the query character string.

Returning to the example for the query word HELPS, CURCHAR is not 0 but 4. Therefore the value in NEXT is disregarded in block 16 and accordingly the NO route out of block 16 is followed to block 17. During block 17 the CURCHAR value in internal RAM 1126,1128 (Table 6) is decremented by 1 to 3 so that it now points to the letter P in the example.

Flow block 18 (FIG. 10) is now entered where the NEXT value in internal RAM 1126,1128 (Table 6) is checked to see whether it is equal to or greater than 128, i.e., the high bit is set to 1, and therefore indicates a state code (this occurs when Table 9 shows an S in front of a NEXT item). In the example for HELPS, NEXT is now storing S3 and therefore the condition is true. Accordingly the YES route out of block 18 is followed through bullet S1.1 back to block 3 of the flow. To be explained in more detail, should the NO route out of block 18 be followed because NEXT now stores a selection code, blocks 19 et seq. would be entered because the end of the query stem would have been located and the processing steps of blocks 19 et seq. would be taken on the query stem.

Returning to the example for the query HELPS, block 3 of the flow is now entered where again the high bit of the variable NEXT=S3 is masked, creating the variable 3. The variable 3 masked from NEXT points to row 3 of the SUFFIX_STRIP_STATE_TABLE (Table 9). Additionally the CURCHAR variable is now 3, pointing to the letter P of HELPS. The ASCII coded equivalent of the letter P is used to enter Table 8 where the character type value 0 is located, read out and stored into the variable CHARTYPE in internal RAM 1126,1128 (Table 6).

At this point the pertinent variables are NEXT=3 (after masking high order bit), CHARTYPE=0, and CURCHAR=3 (corresponds to letter P). Therefore during block 3 the SUFFUX_STRIP_STATE_TABLE (Table 9) is accessed using the NEXT value 3 and the CHARTYPE value 0, thereby accessing row 3, column 0 where the values ACTION=1 and NEXT=2 are read out and stored into the variables ACTION and NEXT in internal RAM 1126,1128 (Table 6). Block 4 of the flow (FIG. 10) is again entered where the pertinent variables are ACTION=1 and NEXT=2. Therefore block 6 is entered causing the SIZE value in query stem structure QS (Table 6) to be decremented by 1, thereby reflecting that one suffix character, namely the character S, has been determined and stripped from the query character string. Following block 6, bullets T1.2 and S1.4 are followed to block 16.

During block 16 (FIG. 10) a check is again made to see if the query stem and therefore the characters of the query character string have been exhausted. At this point the pertinent values are NEXT=2, CURCHAR=3. Accordingly during block 16 it is found that CURCHAR is not 0, therefore the first condition is not met, and accordingly the NO route out of block 16 is followed to block 17.

During block 17 the CURCHAR variable in internal RAM 1126,1128 (Table 6) is decremented by 1 so that it now contains the value 2 pointing to the letter L of HELPS. Block 18 of the flow is entered where a check is made to see whether the value in NEXT is a state code, i.e., the high order bit is set to 1. Since NEXT is now the value 2, the high order bit is not set and therefore the NEXT value is actually now a selection code. The NO route out of block 18 is then followed to block 19.

The NEXT value being a selection code (does not include an S) is actually a suffix classification indication. The value therefore indicates and can be considered as a pointer or a linkage to all acceptable suffixes for the stem of the query word HELPS and the actual acceptable suffixes are determined using Tables 10 and 11.

In any event, block 19 of the flow (FIG. 10) is now entered where certain final processing of the query stem takes place. Although not essential to the present invention, the present embodiment assumes that all query stems are at least two characters long. If not, then the stem length value SIZE in the query stem structure QS (Table 6) is set to the original query word length QCHARS in the PARM structure (Table 4) and a NON-STRIP acceptable suffix list selection code of 1 is stored into the variable NEXT. To this end during block 19 the value in variable SIZE (Table 6) in the query structure QS is checked to see whether it is less than 2. If it is less than 2 then the YES route out of block 19 is taken through bullet T1.5 to block 27 where 1 is stored into the variable NEXT (Table 6) and the SIZE value in the query stem structure QS (Table 6) is set to the value of QCHARS in the PARM structure (Table 4).

Returning to block 19 (FIG. 10) in the example being given, SIZE is greater than 2 and therefore the NO route from block 19 is followed to block 20.

During block 20 a check is made to see whether there are any vowels in the stem. The stem for the example is HELP and accordingly there are vowels in the stem and the YES route out of block 20 is followed through bullet S1.6 to block 24.

During block 24 the characters left after the suffix is stripped, namely, the stem of the query character string, are checked to see whether they are all numerals. If they are numerals, then the YES route out of block 24 is followed to block 28 where the variable NEXT (Table 6) in internal RAM 1126,1128 is set to the numeric stem selection code of 0 and the variable QTYPE (Table 6) in internal RAM 1126,1128 isa set to 1, indicating that the query stem is all numeric. Following block 28, block 26 is entered.

In the example for the query word HELPS, the stem is HELP and does not contain any numerals. Therefore in block 24 the remaining characters in the query character string, i.e., the stem, are not all numerals and the NO route is followed to block 25. During block 25 the variable QTYPE in internal RAM 1126,1128 (Table 6) is set to 0 indicating an alphanumeric query stem, and block 26 is entered.

During block 26 the variable WDSELECT in the query structure QS (Table 6) (in the internal RAM 1126,1128) is set to the value represented in the variable NEXT. Therefore the variable WDSELECT in internal RAM now contains the suffix classification indication for the query. The query stem is represented by the query stem character string in STEM(58) and the number of characters in the stem, i.e., the size of the query stem, is indicated by the value in the variable SIZE (Table 6) stored in internal RAM 1126,1128.

Return to block 20 and assume that it is found that there are no vowels in the stem and accordingly the NO route is taken via bullet S1.5 to block 21. Block 21 is used to determine if the selection code in NEXT indicates that an S has been stripped from the query character string. Thus during block 21 if the value in NEXT is 2 it indicates that S has been stripped from the end of a word which contains any other adjacent character in the stem and accordingly the YES route via bullet S1.6 to block 24 is followed. With reference to Table 9 it will be seen that NEXT=2 is the selection code for -/S. If the result of the test block 21 is no, then block 27 is entered.

Assuming the YES route is taken out of block 21 (FIG. 10), block 24 is entered (bypassing block 27) where the previously discussed test is made to determine whether the stem is all numerals. If the NO route out of block 21 is taken, or bullet T1.5 from block 19 is taken, then block 27 is entered where, as discussed above, the value in NEXT is set to the NON-STRIP selection code of 1 and the SIZE value in the query stem structure QS (Table 6) is set to the original length of the query string characters, namely, QCHARS (PARM structure, Table 4). Block 27 in effect creates a NON_STRIP condition. The reason this is done is that character strings that are normally considered as suffixes, such as S, ING and ED, may not always be suffixes. An example of this would be the words BRING and SHRED. In the case of the words BRING and SHRED, it is not desired to strip the ending characters. Accordingly block 27 is entered to set the QS.SIZE value back to the total number of characters in the query word (i.e., to PARM.CHARS).

Returning to the example, after the process depicted in the flow diagram (FIG. 10), the ASCII characters for the stem HELP are contained in the variable STEM(58), the value 4 is in the variable SIZE, and the select code or suffix classification indication 2 is retained in the WDSELECT variable, all in the query structure QS (Table 6). The process performed by the microprocessor 1118 under control of the PQAPCNTRL program will determine the acceptable suffixes for an entry word using the WDSELECT value.

During the operation controlled by the PQAPCNTRL program, by way of example, the WDSELECT value 20 selects row 2 in the ACCEPTABLE_SUFFIX_TABLE (Table 10). The count value in that row is 4 indicating that there are four acceptable suffixes. The next four values in row 2 are the suffix indices into the SUFFIX TABLE (Table 11). The four values in row 2 are read out and used to select the corresponding endings depicted in Table 11 which combined with the query word stem HELP give the acceptable inflected entry words depicted in Table 14.

E. Misspelling Classification System

1. Introduction

A method and means are disclosed for identifying possible candidates, also referred to as entries, in a stored data base which are potential misspellings, alternate misspellings, or garbles of a target word referred to herein generally as a query word. The various misspellings are summarized in Table 2.

More specifically a method is disclosed herein for use by a digital data processing means for determining and separating acceptable misspellings of words from nonacceptable misspellings. Additionally the acceptable and nonacceptable misspellings are classified. With reference to Table 2, misspelling classes 1 through 4 would typically be classified as acceptable misspellings and will incude the situation where an exact match is found. Classes 0 and 5 are nonacceptable misspelling errors. Class 0 is the situation where there are multiple spelling errors.

Figure 13:
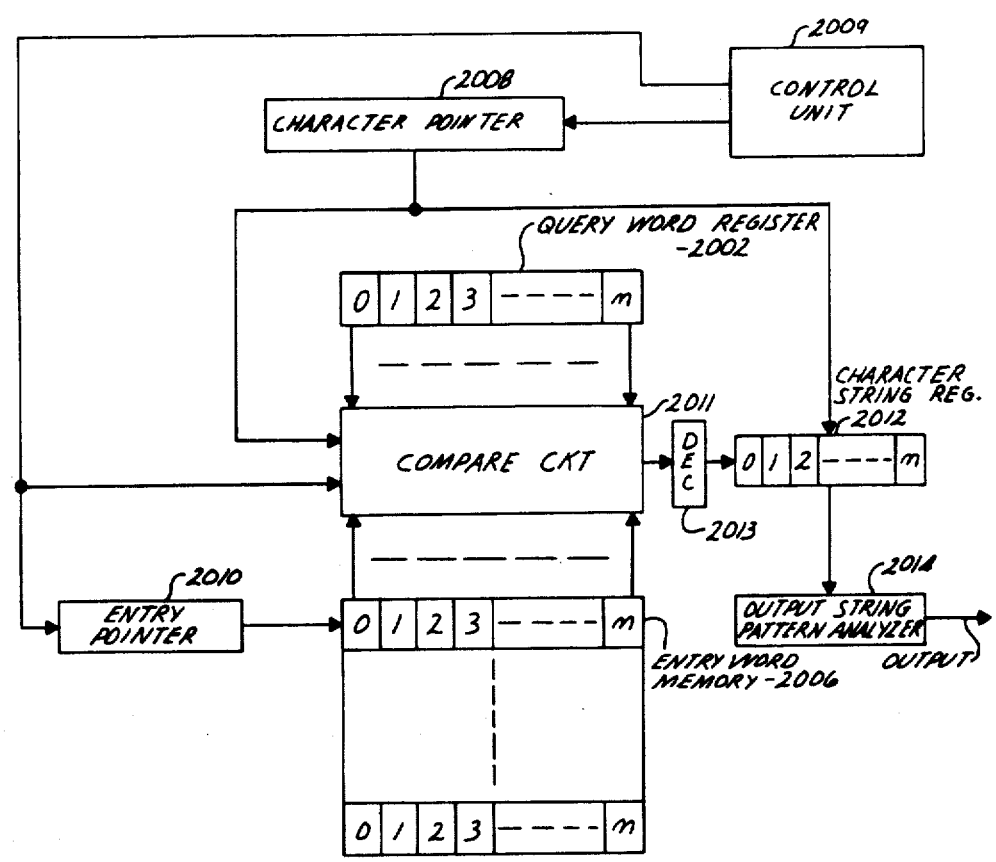
FIG. 13 is a schematic and block diagram depicting an alternate embodiment of a portion of the misspelling classification system of FIG. 11.

FIG. 13 depicts a general schematic and block diagram of a digital data processing means for practising the method and means. A query word represented by a left-justified character string is stored in a query word register 2002 or other equivalent means. A set of entry words, each entry word being represented by a left-justified character string, is stored in a candidate word memory 2006 or equivalent means. Initially a character pointer 2008 is set to an initial state by a control unit 2009. In the initial state the character pointer 2008 points so the leftmost position of the query word stored in the query word register 2002. The locations or positions for the characters of the query word in register 2002 and the entry words in memory 2006 are assigned increasing numbered values from left to right from one end of each word to the other. Positions the same number of characters away from the left end of each word are assigned the same value. This is depicted in FIG. 13 in that the query word in register 2002 is indicated as having character positions O through N, whereas the character positions of the entry words in each location of the entry word memory 2006 are assigned the same numbers.

Control unit 2009 causes the character pointer to be sequentially incremented thereby pointing to each of the characters in the query word 2002 from the leftmost position to the rightmost position of the query word. A compare circuit 2011 is provided for comparing characters of a query word in register 2002 with characters of an entry word in memory 2006. A candidate pointer 2010 points to or addresses one of the words in memory 2006 which is to be compared.

The compare circuit under control of character pointer 2008 and the control unit 2009 is operative for carrying out the following steps: First, if the characters in the same positions in the query and entry words, as specified by character pointer 2008, are the same, i.e., match, a value representing a symbol 0 is inserted in the position of an output string register 2012 having the same number as the query character pointed to by pointer 2008.

If step 1 does not produce a match then the compare circuit 2011, under control of character pointer 2008 and control unit 2009, compares the character of the query word in the position pointed to by the character pointer 2008 with the character in the next lower numbered position (i.e., the character to the left) in the entry word and if a match is detected, a value representing the symbol "-" is inserted in the same numbered position of the output string register as specified by the character pointer 2008.

Third, if neither of the preceding steps produces a match, the compare circuit 2011, under control of the character pointer 2008 and control unit 2009, compares the character in the position of the query word pointed to by the character pointer 2008 with the character in the next higher valued position of the entry word (i.e., the one to the right) and if a match is detected, a value representing the symbol "+" is inserted in the same numbered position of the character string register 2012 as specified by character pointer 2008.

Fourth, if none of the steps first through third produces a match, then a value representing the symbol "X" is inserted in the same position of the character string register 2012 as specified by the character pointer 2008. It will be understood that the symbols 0, −, + and × are merely used as representatives. A decoder 2013 is depicted for generating binary coded values representing the symbols 0, −, + and × for storage in register 2012.

Subsequently the character pointer 2008 is incremented to the next higher valued position in the query word register 2002 and the process is repeated using the characters of the entry word in the same, the next lower, and the next higher valued positions of the entry word as that pointed to by the character pointer 2008.

After all the characters of the query word have been compared the character string in register 2012 is analyzed by an output string pattern 2014 for generating a misspelling class indication of one of the six types indicated in Table 2 in accordance with the pattern of symbols stored in the character string register 2012.

After the query word in register 2002 has been compared with the word in one of the locations in the entry word memory 2006, control unit 2009 causes candidate pointer 2010 to be incremented by 1 so that it points to the entry word in the next location in memory 2006, and the foregoing process if repeated.

The symbols 0, −, + and × are referred to herein as compare type indications. Table 16 depicts the compare type indication symbols and their meaning for ease of reference.

The simplified schematic and block diagram of FIG. 13 assumes a null character (not shown) is in effect located at each end of the entry word (i.e., below position O and above position N) and that each of the characters in each of the entry and query words is unique, that is, the same character will not appear two or more times in the same word. The null character is different from any of the other characters used in the words.

For purposes of simplication, any word containing more than one error is said to have a multiple error, and is considered to be a nonacceptable misspelling.

The data processing method will be better understood by considering the examples of Table 17. Six examples are provided in Table 17 wherein the query word CARTON is compared against various spellings of that same word. Two steps are basically involved in performing the method. First a comparison takes place in the manner hereinafter described so as to form a compare type indication of one of the types depicted in Table 16 for each character of the query word. Second, the compare type indications are processed to form a misspelling class indication indicating one of the types of misspelling classifications depicted in Table 2.

In Example 1 the word CARTON is compared against itself, identically. That is, each of the characters of the query word (Q) matches each of the characters (E) in the same position of the entry word and therefore a 0 compare type indication (C.T.I.) is formed for each of the query characters in positions 0 through 5. During the subsequent processing step the series of 0 compare type indications will be processed, causing a misspelling class indication as noted at M.S.C. in Table 17.

Example 2 depicts an entry word having the characters T and R transposed. As a result the compare type indications in each of positions 0 through 5 are 0 0 + −

0 0. The subsequent processing procedure causes a misspelling class indication of 2, indicating a transposition.

Example 3 has the letter R removed from the entry word, resulting in a deletion in the entry word, that is, an insertion in the query word as compared with the entry word. Therefore the compare type indication in each of character positions 0–5 of the query are as depicted at C.T.I. and the subsequent processing step causes a misspelling class indication of 4, indicating an insertion.

Example 4 depicts an E inserted between the letters A and R of the entry word, causing an apparent deletion in the query word as compared with the entry word. As a result the compare type indications are as depicted at C.T.I. and the subsequent processing procedure causes a misspelling class indication number of 3, indicating a deletion.

Example 5 has the character E substituted for the character R in the entry word, causing an apparent substitution. Accordingly the compare type indications are as indicated at C.T.I. and the subsequent processing procedure causes a misspelling class indication of 5, indicating a substitution.

Example 6 has multiple errors. Specifically, the letter E has been substituted for the letter R and the letters T and R have been interchanged in the entry word resulting in two types of spelling errors. As a result the compare type indications for character positions 0–5 are as indicated at C.T.I. and the subsequent processing steps cause a misspelling class indication of 6, indicating multiple errors.

Assuming each of Examples 1 through 4 of Table 17, i.e., a match, transposition, insertion, and deletion, is an acceptable misspelling of the query word, these entry words would be separated from the nonacceptable misspellings of Examples 5 and 6.

2. Digital Data Processing Method and Means of FIGS. 11 and 12A–12L

The digital data processing method and means of FIGS. 11 and 12 are designed for use in the system of FIG. 1. Also, the method and means according to the present invention differ from the embodiment of FIG. 13 in that they are able to classify spelling errors where the characters are not all unique. For example, many words in the English language, such as the word CARTOON, have more than one of the same type of character.

Additionally the method and means disclosed in FIGS. 11 and 12 form a compare type indication which is represented by a triplet. Table 18 depicts the format of a compare type indication. Specifically, the compare type indication is formed of binary bits weighted according to the 1, 2, 4 code.

Table 18 depicts a truth table for the possible matches between a query character $Q_i$ (in position i) and query characters $E_{i-1}$, $E_i$, and $E_{i+1}$ (corresponding to the next lower, the same, and the next higher position as query character $Q_i$). A zero in the truth table represents the lack of a match; a 1 represents a match between the character $Q_i$ and the entry character indicated at the top of the column. At the second column from the left hand side of the truth table is a list of the various compare type indications in decimal values, numbered 0 through 7 according to the pattern of the binary bits in the truth table. For convenience the compare type indications used in the embodiment of FIG. 13 are shown along the left hand side of Table 18. Thus, compare type indications 0, 1, 2 and 4 (indicated by an asterisk) correspond to compare type indications ×, +, 0 and − in the earlier embodiment.

It will be noted in Table 16 that additional compare type indications 3, 5, 6 and 7 are incuded. A compare type indication of 3 indicates a match at both of entry positions $Ei-1$ and $Ei$ and therefore matches at more than one of the entry characters. Compare type indication of 5 indicates a match between $Qi$ and $Ei-1$ and $Ei+1$. Compare type indication 6 represents a match between $Qi$ and $Ei$ and $Ei+1$. Compare type indication 7 indicates a match between $Qi$ and $Ei-1$, $Ei$, and $Ei+1$. To be explained in more detail in connection with the flow diagram of FIG. 12, the triplets are used to accurately classify the various types of misspellings even though the characters in the words are not unique.

FIG. 12 consisting of FIGS. 12A–12L contain a step by step flow diagram illustrating the processing method performed by the misspelling class system of FIG. 11. For purposes of explanation each of the blocks of the flow has been labeled by a sequence number called a block number. The method is controlled by a misspelling classification (MSC) computer program 1234 stored in programmable read only memory (PROM) 1236 which in turn controls the operation of microprocessor 1240.

Execution of the misspelling classification program 1234 begins in sequence block 1 where the command ports are initialized. At sequence block 2 the misspelling classification system MCS 1210 reads the next word in the input portion of FIFO and during sequence block 3 the word is tested for the sync pattern AAAAH (Table 1-1). If such a sync pattern is not detected, the control returns to sequence block 2. The operation continues until the sync pattern AAAAH is detected. Detection of the sync pattern AAAAH by the misspelling classification system 1210 is used as a flag to assure that the microprocessor 1118 and the MCS 1114 are both operating and can establish 2-way communication.

Assume that the sync pattern AAAAH is detected by the MCS 1114. The RAM 1242 is cleared and set to zero during sequence block 4. This is a desirable feature to facilitate program debugging but is not essential to the present invention.

Sequence block 5 is now entered where MCS 1114 sends the MCS response (Table 1). This response consists of the sync pattern AAAAH which is sent to the output section of FIFO and an interrupt-1 signal applied on line 1133. The microprocessor 1118 reads the sync pattern AAAAH from FIFO, recognizes the MCS 1114 response and goes on to start providing a query word with a format of the type depicted at 3 in Table 1.

During sequence block 6 the MCS reads the next word from the input portion of FIFO and during sequence block 7 the MCS 1114 reads and inspects the word. Assume that a query flag FFH is detected in the command byte. A query word (Table 1-3) is being read and therefore a branch is taken via bullet 1-B to sequence block 10 where the query word is read from the input portion of FIFO and stored in RAM 1242.

Sequence block 6 is reentered where the next input is read from the input of FIFO. The microprocessor 1118 after providing a query word then provides an entry word. Assume that the entry word (Table 1-4) is now ready to be read from the FIFO by the MCS 1114. During sequence blocks 8 and 9 the MCS 1114 checks the word in the input portion of FIFO 1130 and finds that a query word, the place mark word, or a sync, is not being provided and accordingly sequence block 12 is entered. During sequence block 12 the entry word in the input portion of FIFO 1130 is stored into the RAM 1242.

During sequence block 13 the program pointers necessary for the misspelling classification process are set up. These are housekeeping steps which need not be disclosed for a complete understanding of the invention.

Control then proceeds to sequence block 100. FIGS. 12B through 12J commencing with sequence block 100 depict the program method for misspelling determination. The blocks are numbered beginning with 100 for ease of reference. The nodal blocks are also identified by reference symbols N1–N10, N12–N13, N13–N20, N28 and N32 in addition to the block numbers for convenience.

Each of the nodes N1–N32 is similar to the others but the sequence of operation following each node depends on the compare type indication formed due to the comparison of a given query character with the three characters of the entry. Each node consists of a call to a compare procedure.

A flow diagram depicting the sequence of operation during the compare procedure is contained in FIG. 12L. Following the call to the compare procedure, the operation returns to the calling nodal block and there is a 9-way jump as depicted in FIGS. 12B through 12J, depending on the value of the compare type indication returned by the compare procedure. Some compare type indications are not possible at particular nodes. Note by way of example compare types 4, 5, 6, 7 and 8 indicated below node block N1 in FIG. 12B. An asterisk is used to indicate when particular compare types are not possible at particular nodes.

The compare type indication following each nodal block determines a tentative misspelling class. The tentative misspelling class is indicated by the symbols M, T, D, I, S, and MS following the compare type indications. The meaning of these symbols is shown in the second column of Table 2.

Execution continues as determined by the compare type indication until either a mismatch occurs or the query stem character string of the query word stored in the RAM 1242 is exhausted.

Consider now the compare procedure as depicted in the flow diagram of FIG. 12L. The compare procedure utilized by each of the nodes of FIGS. 12B through 12J begins with sequence block 26 where a check is made to see if a query chaacter $Qi$ in the query stem character string in RAM exists that has not been processed. If all the query characters have been processed, control exits through the path labeled NO to sequence block 27 where the compare type indication is set to 8. The compare type indication is a value set in a variable called COMPARE TYPE stored in a predetermined location in RAM. The variable COMPARE TYPE is the same one that stores the triplet compare type indication. A compare type indication of 8 is used herein to indicate that all query characters have been processed. After sequence block 27, the procedure is exited and the process is returned to the node block where the compare procedure was called.

Assuming that another query character exists, the YES route from sequence block 26 to block 28 is taken where the relationship of the query character $Qi$ (now being processed or under comparison) is compared against entry character $Ei-1$ (i.e., the next lower entry character of entry character string in RAM 1242, see Table 1-4), and if there is equality, then control moves to sequence block 29 where the variable COMPARE TYPE is set equal to 4. As seen in Tables 2 and 18, a compare type indication of 4 results in a decimal compare type indication of 4 or a triplet compare type indication of 100.

If during sequence block 28 query character Qi is not equal to entry character Ei−1 (i.e., the next lower entry character), control goes to sequence block 30 where the variable COMPARE TYPE in RAM 1242 is set to a decimal value of 0 or a triplet COMPARE TYPE indication of 000.

During sequence blocks 31 and 32, query character Qi is compared with the entry character in the corresponding position of the entry, i.e., query character Qi is compared with entry character Ei. If there is equality between Qi and Ei, then sequence block 32 is entered where 2 is added to the variable COMPARE TYPE. Specifically, binary bit 2 of the triplet in COMPARE TYPE is set to 1. Following sequence block 31 and sequence block 32 (in the event Qi does not equal Ei), sequence block 33 is entered where query character Qi is compared with entry character Ei+1 (the next higher entry character). If Qi is equal to Ei+1, then sequence block 34 is entered (skipping block 34) where 1 is added to the triplet in the variable COMPARE TYPE (i.e., bit 1 is set to 1). Following sequence block 34 and in the event that Qi does not equal Ei+1, sequence block 35 is entered where program pointers (not shown) keeping track of the query and entry characters under comparison are incremented by 1. Following sequence block 35 the sequence of operation returns to the node which called the compare procedure (i.e., the compare procedure is exited).

From the foregoing and with reference to Table 18 it will be appreciated that after the compare procedure is completed, bit 1, bit 2 and bit 3 of the triplet COMPARE TYPE indication will be a 1 if the corresponding entry character indicated in Table 18 matches the query character Qi. If more than one of the entry characters match, then each of the ones that match will have the corresponding bit in a 1 state.

Consider now FIGS. 12B through 12J and the corresponding operation. During FIG. 12B of the sequence block noted by the node numbered N1, the compare procedure is called causing the variable COMPARE TYPE to be formed for the first query character Qi. Since there is no character below entry character Ei, a null character is used for the Ei−1 position. Thus the query character Q1 is compared with the following characters: null, Ei, and E2, and a triplet is stored in the variable COMPARE TYPE corresponding to one of those indicated in Table 18, in a prefixed location in RAM 1242. When the procedure returns from the compare procedure, block 102 of the flow is entered where the variable COMPARE TYPE in RAM 1242 is examined and a jump is made via the line which has the decimal value equal to that in the variable COMPARE TYPE noted on the lines below block 102.

As disussed above, the Ei−1 position is a null and the first character of the entry word will always match the first character of the entry. Therefore control should normally branch from sequence block 102 to one of the paths corresponding to decimal values 2 or 3, decimal value 2 indicating that Q1 matches Ei, and decimal value 3 indicating a match between Q1 and both E1 and E2. If the variable COMPARE TYPE is a decimal 0 or 1, there is a mismatch, causing a branch through block 104 to bullet 11-A where the procedure ends. COMPARE TYPE variables of 4 through 8 are not possible following node N1 and are errors.

Assuming the COMPARE TYPE variable is either 2 or 3 during block 102, a branch is taken to sequence block N2 block 106 where the compare procedure is again called so as to determine the COMPARE TYPE for the next query chracter in the query stem character string in RAM 1242. In the example being given this would be query character Q2. However it should be noted that the variable COMPARE TYPE in combination with the node N1 gives a tentative misspelling class indication of a match, as indicated by M at jump points 2 and 3. However this is only a tentative match and the operation following node N2 needs to be considered to determine whether the same or a different tentative misspelling class indication will apply or whether a final misspelling class indication can be determined.

Consider now node N2 block 106 and the corresponding sequence of operation. The compare procedure is again called this time for the second query character, i.e., Q2, and entry characters E1, E2 and E3 are now used in the comparison and another 9-way jump occurs depending on the compare type indication in the variable COMPARE TYPE located in RAM 1242 resulting from the previous compare procedure. To this end, during sequence block 108 the compare type indication in variable COMPARE TYPE is inspected and if it is a decimal 0, there is a tentative substitution and a jump is taken via bullet 3A to node N3 block 112; if a decimal 1, there is a tentative deletion and a jump is taken via bullet 3B to node N4 block 122; if any one of decimal match types 2, 3, 6 and 7 there is a tentative match (M) and control returns to node N2 block 106; if a decimal 4, there is also a tentative substitution and a jump takes place via bullet 3A to node N3 block 122. As discussed above, the compare procedure will provide a decimal match type of 8 in the COMPARE TYPE variable in RAM 1242. This is done by adding a fourth bit to the triplet and making it 1. When this occurs it indicates that the query is now completely processed and the tentative match (M) becomes the final result. Accordingly a jump is made through block 110 to bullet 11A where the operation ends.

The operation for nodes N3–N32 and the following nine branches for each of the nodes may be analyzed in a similar way to that explained hereinabove with respect to nodes N1 and N2. For each of the nine branch points there is a tentative or final misspelling class indication as determined by the variable COMPARE TYPE formed by the preceding compare procedure and the node block which caused the compare procedure to be called. Each time a jump is made through bullet 11A, the operation will terminate and pass to the same place in FIG. 12K.

Following the jump through bullet 11A of any nodal block, sequence block 24 is entered. When block 24 is entered the final variable in COMPARE TYPE in combination with the node block from which the branch occurred are used to form the misspelling class indication. The final misspelling class indication is formed in a variable called MTYPE located in a predetermined location in RAM 1242. The value of the variable stored in MTYPE is determined by the node blocks N1–N32 from which block 24 is entered and the variable COMPARE TYPE which caused the jump. The actual MTYPE value is indicated by the symbols M,T,D,I,S, and MS appearing adjacent the compare type indication Q-8 causing the jump in Table 2. For example, the branch from nodal block N2 by way of the jump at the compare type indication 8(M) will result in an MTYPE of 1 corresponding to M for an exact match; the branch from nodal block N3 by way of the jump at the compare type indication O(MS) will result in an MTYPE of 6 corresponding to the MS for a multiple spelling error.

Returning to block 24 the misspelling class indication in MTYPE is checked to see whether it is one of the acceptable misspelling class indications or whether it is a nonacceptable class indication. The embodiment of the invention disclosed in FIGS. 1 and 11 considers only misspelling class indications 2-5 as acceptable. If an acceptable misspelling class indication (PMCI) has been formed for a particular entry word, then sequence block 25 is entered where the response word format depicted in Table 5 is transferred from RAM 1242 back to the output portion of FIFO 1130 (FIG. 11) as discussed above following which the process returns via bullet 1A to sequence block 6.

During sequence block 6 the next word is read from the input portion of FIFO. If it is another entry word of the type depicted at 4 in Table 1, sequence blocks 12 and 13 are reentered following which one or more of nodes N1 through N32 are entered, calling the compare procedure, all as discussed above. After the microprocessor 1118 (FIG. 11) sends the last entry word from the RAM 1126,1128, the place mark pattern depicted at 2 in Table 1-2 is generated. Accordingly control goes from sequence block 6 to sequence block 8 where the place mark pattern FFQQH is deteced in the input portion of FIFO, causing a branch via bullet 1C to sequence block 11 where the MCS 1114 sends the MCS response FFOOH to the output portion of FIFO.

Having in mind the details of the MCS system 1114 and the controlling MCS program 1234 illustrated in FIGS. 11 and 12, consider an actual example. Table 19 has the same examples 1 through 6 as depicted in Table 17. In addition Table 19 incudes example 7 which involves the word CARTOON which has two nonunique characters OO. Table 19 indicates the nodal blocks through which the MCS sequences and hence the data processing method, in comparing the characters of the query and entry, the decimal compare type indications (DCTI) formed following each node, and the tentative misspelling class indication using the abbreviations indicated in Table 2. Examples 2 and 7 will now be discussed in detail. The other examples may be followed using the same analysis used for these examples.

In example 2 the word CARTON is compared with the misspelling CATRON. Therefore there is a transposition error (MSC=1). After the initialization of the pointers and counters for the misspelling classification process, as noted in sequence block 13, nodal block N1 is entered where the compare procedure is called. During the compare procedure the query character C is compared with the characters in the next lower, the same, and the next higher positions of the entry word, which characters are a null, C, and A. Since the only match is in the same position, a compare type indication of 2 is formed. During sequence block 102 the compare type indication of 2 is detected and hence there is a tentative misspelling class indication (MSC) of M (Table 2) and a branch is made to sequence block N2. During sequence block N2 the compare procedure is again called. The query character A is now compared with the entry characters C, A and T. The only match is in the same position of the entry and accordingly a decimal compare type indication of 2 is again formed. During sequence block 106 a compare type 2 is detected thereby indicating a tentative misspelling class indication of a match (M) and accordingly a branch is taken back to sequence block N2.

The next call on the compare procedure compare the query character R with the entry characters A, T and R and a match is found only with the entry character in the next higher position. Accordingly a compare type indication of 1 is formed. During sequence block 108 the compare type indication 1 results in a tentative misspelling class indication of a deletion (D) and a branch is taken via bullet 3B to nodal sequence block N4.

During sequence block N4 the call on the compare procedure causes the query character T to be compared with the entry characters T, R and 0. The only match is with the character in the next lower position of the entry. Accordingly a compare type indication of 4 is formed. During sequence block 108 the decimal compare type indication of 4 is detected which indicates a tentative misspelling classification for a transposition (T) and accordingly a branch is taken via bullet 6B to nodal sequence block N10.

The call on the compare procedure during sequence block N10 compares the query character O with the entry characters R, 0 and N. The only match is in the same position of the entry and query and accordingly a compare type indication of 2 is formed. During the subsequent sequence block 168, the decimal compare type indication of 2 is detected, indicating a tentative misspelling classification indication for a transposition (T) error. Accordingly a branch is taken via bullet 10B to nodal sequence block N32.

During nodal sequence block N32 the call on the compare procedure causes the query character N to be compared with the entry characters O, N and null. The only match is with the characters in the same position of the entry and query and accordingly a decimal compare type indication of 2 is formed. During sequence block 234 the compare type indication 2 is detected indicating a tentative misspelling classification indication of a transposition (T) and accordingly a jump is taken back to nodal sequence block N32.

During sequence block N32 the call on the compare procedure detects that the last character of the query has already been processed. This is accomplished in the compare procedure by taking the SIZE value from the query word character and storing it as a variable Nq in RAM 1242 and counting it down each time a character of the query word is processed. Therefore at this point in time the value in variable Nq has been counted down to 0. Referring to the previously discussed compare procedure of FIG. 12L, sequence block 26 detects the fact that variable Nq has been counted to 0 (a query character does not exist), and accordingly a branch is taken from sequence block 26 to sequence block 27 where the compare type indication is set to 8.

Returning to the flow of FIG. 12J, block 234 is entered where the compare type indication of 8 is detected, indicating a final misspelling class indication of a transposition has been detected and accordingly a branch is taken through bullet 11A to sequence block 24.

The final compare type indication following nodal block N32 is an 8 (T) indicating a transposition. Accordingly the misspelling class indication to be stored in MTYPE is a 2 for a transposition (Table 2). Since this is one of the acceptable misspelling class indications, sequence block 25 is entered where the response word indicated at 5 in Table 1 is composed. Specifically, a misspelling class indication of 2 is placed in MTYPE and added at the left side of the entry word format of Table 1. As a result the word format of item 5 of Table 1 is formed and is sent back to the output portion of the FIFO for processing by microprocessor 1118.

Consider now example 7 of Table 19 where two non-unique characters are included in the same word. Nodal sequence block N1 is entered where the call on the compare procedure results in a decimal compare type indication of 2, indicating a tentative misspelling classification of a match. A branch is taken from there to nodal sequence block N2 where the call on the compare procedure again detects a decimal compare type indication of 2. The decimal compare type indication of 2 indicates a tentative match (M) and accordingly a branch is taken back to nodal sequence block N2. During the call on the compare procedure it is found that the query character R does not match any of the characters of the entry and accordingly a decimal compare type indication of 0 is formed, indicating a tentative misspelling class indication of a substitution (S) and accordingly a branch is taken via bullet 3A to nodal sequence block N3. During nodal sequence block N3 a call is made on the compare procedure resulting in a decimal compare type indication of 2, indicating a tentative misspelling class indication for a substitution (S). Accordingly a branch is made via bullet 4A to nodal sequence block N5.

During the call on the compare procedure during sequence block N5, the first character in the query is compared against the entry characters T, O and O. There is a match between the same and the next higher positions of the query and entry, resulting in a compare type indication of 3. Accordingly during the subsequent sequence block 130 a decimal compare type indication of 3 is detected, indicating a tentative substitution and a branch is made back to nodal sequence block N5.

During sequence block N5 the call on the compare procedure causes the second O in the query to be compared with the entry characters O, O and N. This time there is a match with the characters in the next lower and the same positions in the entry. Accordingly a decimal compare type indication of 6 will result.

During sequence block 103 the decimal compare type indication 6 is detected, indicating a tentative substitution (S) and accordingly a jump is made back to nodal sequence block N5. During sequence block N5 the query character N is compared with the entry characters O, N and null and accordingly a decimal compare type indication of 2 results, indicating a tentative misspelling class indication for a substitution (S). Accordingly sequence block N5 is reentered.

This is the last entry to the sequence block N5. Also the last character of the query has been processed. Accordingly a compare type indication of 8 is returned from the compare procedure.

The sequence block 130 detects the decimal compare type indication of 8 and thus a final tentative misspelling class indication for a substitution (S) has been arrived at and accordingly a branch is taken through bullet 11A to block 24 in FIG. 12K. The nodal block N5 and compare type indication of 8 just prior to entering block 24 results in misspelling class indication of 5 for a single substitution (S). The 5 is stored in the variable MTYPE in RAM 1242. Since the MTYPE value of 5 is for a substitution this is a nonacceptable misspelling in this embodiment of the invention, and is not returned to the FIFO between the entry word and the query word and the entry word is thus separated from the rest of the entry words being compared with the query word.

3. Alternate Embodiment of FIG. 14

Consider now the schematic and block diagram of an alternate digital data processing means. FIG. 14 discloses an alternate method and means according to the present invention for determining compare type indications and tentative and final misspelling class indications. FIG. 14 includes a query register 2110 and a memory or data base store 2112. The query register 2110 has 0 through X storage locations for storing query characters Q0 through QX of a query word. The data base store 2112 has memory locations 1 through Z which are depicted as rows in FIG. 14. Each memory location has character storage locations 0 through X for storing characters E0 through EX of an entry word.

A data base counter 2114 addresses any one of the storage locations 1 through Z of store 2112, causing the entry word in the corresponding location to be read out and presented to the input of a selection circuit or gate 2116 depicted at the upper side of the store 2112. A character counter 2118 is input to the selection circuit 2116. The character counter has states 0 through X corresponding to different characters of a query word in the query register 2110. Each state of the character counter 2118 causes the corresponding character in query register 2110 and three characters in the entry word of the store 2112 addressed by the data base counter 2114 to be coupled to the input of a compare circuit 2120. Significantly, the characters of the entry word which are coupled to the input of the compare circuit 2120 for any particular query character Qi, where i designates the position of the query characters, are Ei−1, Ei and Ei+1, which are the characters in the next lower lower, the same position, and the next higher position in the entry word. For query character Qi, the E0 character is a null character (NC) which for purposes of illustration is stored in register 2122. For last query character QX, the EX+1 character is a null character which for purposes of illustration is stored in register 2124. The null characters are used since there are obviously no characters below Ei and no characters which do not match any of the other characters in either the query or the entry word. Alternately, and preferably, logic could be provided to form the equivalent result by detecting that there should be a comparison with a null character.

The compare circuit 2120 compares the query character Qi with each of the entry characters Ei−1, Ei and Ei+1, coupled thereto by the selection circuit 2116, and generates one of four unique binary coded signals representing one of the four compare type indications depicted in Table 16, depending on the relationship between the character of the query word and the three characters of the entry word under comparison. Each compare type indication formed by the compare circuit 2120 is stored into register 2126 which has storage locations 0 through X, each storage location for storing a different one of the compare type indications. The location in register 2126 where a character is stored is determined by the state of character counter 2118.

A pattern analyzer 2127 is provided for scanning the compare type indications in positions 0 through X in register 2126 and for forming one of the six misspelling class indications noted in Table 2 for the particular entry word in the memory location of the store 2112 under comparison. The misspelling class indication is a binary coded signal.

A misspelling class store 2128 has a storage location for each one of the memory locations 1-Z in the data base store 2112. The misspelling class indication for each of the entry words is stored into the storage location of the misspelling class store 2128 corresponding to the entry word under comparison and hence the entry word which caused the series of compare type indications in register 2126.

A gating circuit 2132 in combination with a decoder 2130 forms a separator for reading out and thereby separating those entry words in the data base store 2112 which are acceptable misspellings of the query word from the nonacceptable ones. To this end, each state of the data base counter 2114 selects a different location in data base store 2112 and the corresponding location in the misspelling classification store 2128, causing the contents of the related locations in both of stores 2112 and 2128 to be read out and applied to the input of gate 2132. A decoder 2130 also monitors the misspelling class indications from store 2128 and if the misspelling class indication from store 2128 is any one of the acceptable misspelling class indications 2 through 5, decoder 2130 will apply a control signal to gate 2132 causing the entry word in the selected memory location to be shifted into memory 2134. The gate 2132 also stores the corresponding misspelling class indication from store 2128 into the same location in memory 2134 along with the entry word. The memory 2134 is by way of example a first-in first-out memory and stores each new misspelling class indication and entry word combination into a different memory location. A control unit 2141 controls the sequence of operation of the circuits of FIG. 14 and hence the method in accordance with the foregoing description and the following example.

Figure 14:
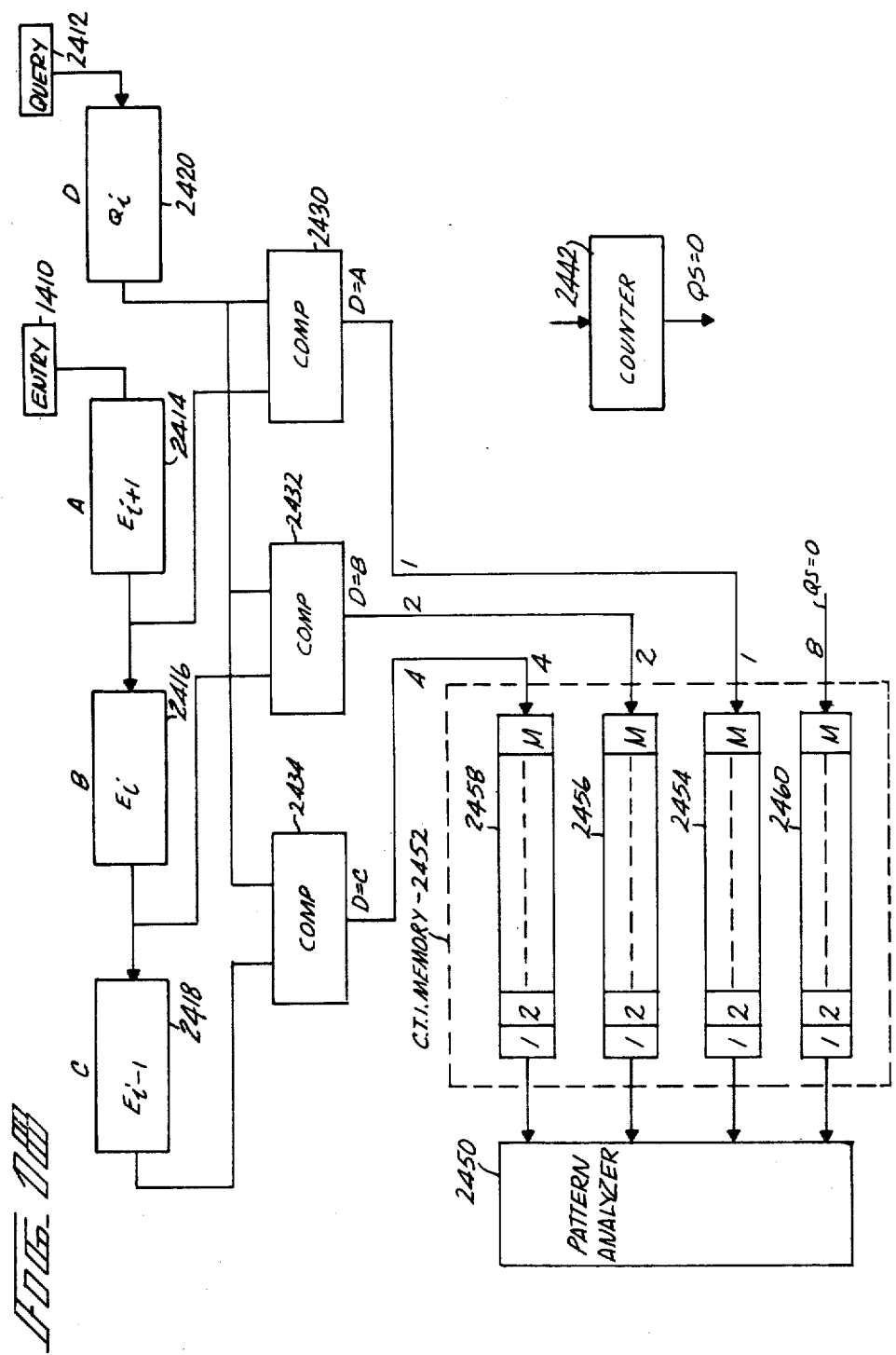
FIG. 14 is a schematic and block diagram depicting an alternate embodiment of a portion of the misspelling classification system of FIG. 11.

Consider now an example of the operation of the digital data processing means of FIG. 14 for separating acceptable misspellings from non-acceptable misspellings. Initially control circuit 2141 forms a control signal at the reset output 2144 which is connected by means (not shown) to each of the counters, registers, stores and memories in FIG. 14 by lines, causing each to be cleared or reset to a zero condition. Assume that the query word CARTON is stored in query register 2110 and the entry words depicted at examples 1 through 6 of Table 17 are stored in memory locations 1 through 6 of the data base store 2112. Initially a query word is input to register 2110 at input 2140 and the entry characters are input to data base store 2112 through input 2142 and hence and received by these circuits.

Character counter 2118 is in a state pointing to query character Q0 and data base counter 2114 is in a state corresponding to memory location I of the data base store 2112 and misspelling classification store 2128. This causes gate 2116 to couple query character Q0 to the input of compare circuit 2120 and causes the null character in register 2122 and characters E0 and E1 of memory location 1 in the data base store to be coupled to the input of the compare circuit 2120. With reference to example 1 in Table 17, Q0 is a C, whereas characters E0−1, E0 and E0+1 are the characters null, C, and A. The compare circuit 2120 detects equality between the characters Q0 and E0 and therefore a compare type indication of 0 (Table 16) is stored into location 0 of register 2126 under control of a control signal (not shown) from control unit 2141.

Control counter 2141 then forms a count signal at input 2148 to character counter 2118 causing it to count up to its next state, corresponding to query character Q1. At this point character Q1 of the query and entry characters E0, E1 and E2 of the entry words are coupled by gate 2116 to the input of the compare circuit 2120 which detects a match between characters Q1 and E1 and again a compare type indication of 0 is shifted into register 2126, causing the prior compare type indication to be shifted to the left as the new compare type indication is stored in register 2126. This operation continues causing character counter 2118 to increment for each subsequent character of query register 2110 until the end character of the query word is reached.

It is assumed for purposes of illustration that each of the storage locations in query register 2110, after the last significant character, are filled with null characters. Therefore character counter 2118 now causes gate 2116 to couple a null character to the input of compare circuit 2120 and hence to the input of a decoder 2150. The decoder 2150 detects the null character, applying a corresponding signal to output 2152 which in turn causes control unit 2141 to switch from the phase wherein compare type indications are generated, to the analysis phase wherein the misspelling class indications are formed.

The pattern analyzer 2128 is preferably a programmed microprocessor which examines the pattern of compare type indications in register 2126. Referring to example 1 of Table 17, all compare type indications are 0. Therefore a misspelling class indication for a match (M), namely, a value 1 (see Tables 2 and 17) is formed, applied and stored into misspelling class store 2128.

After the compare type indications in register 2126 have been analyzed, the control unit 2141 then forms a control signal at its output 2156, causing data base counter 2114 to count to the next state and thus point to location 2 in the data base store 2112 and applies a signal via output 2149 to character counter 2118 resetting it to zero. Location 2 of the data base store 2112 contains the entry word CATRON which, with reference to Table 17, will be seen to be a transposition. Character counter 2118 points to query character Q0. Register 2116 couples query character Q0 to the compare circuit 2120 along with the characters null, C and A from location 2 of data base store 2112. Compare circuit 2120 detects a match and therefore compare type 0 is stored into storage location 0 of register 2126. Character counter 2118 is now incremented by one state pointing to query character Q1. Again a match is detected and a compare type indication 0 is stored in location 1 of register 2126. Character counter 2118 is again incremented, this time pointing to character Q2. With reference to Table 17, example 2, Q2 is an R whereas E2 is a T. Gate 2116 now couples the character R from the query word and characters A, T and R from the entry word to the input of the compare circuit 2120. Compare circuit 2120 now detects a match between the next higher position in the entry word and the query character and therefore forms a representation of a + compare type indication which is stored at location 2 of the register 2126.

Control unit 2141 now causes character counter 2118 to count up to the next state, pointing to query character Q3. Thus gate 2116 now couples query character T and entry characters T, R and O to the compare circuit 2120. The compare circuit 2120 detects a match between the next lower position of the entry word and the query character, causing a − compare type indication to be formed and stored in location 3 of register 2126. Control unit 2141 now increments character counter 2118, pointing to query character Q4. Gate 2116 couples query character O and entry characters R, O and N to the compare circuit 2120. Compare circuit 2120 now detects a match between the same positions of the query and entry and forms a compare type indication which is stored in location 4 of register 2126.

The character counter 2118 is again incremented thus pointing to query character Q5. Again a match between the same position of the query and entry is detected and the compare circuit 2120 causes a 0 compare type indication to be stored in location 5 of register 2126.

The character counter 2118 is again incremented. This time the query character Qi is a null. Decoder 2150 forms a control signal at 2152 causing the control unit 2141 to then form a control signal at 2,54, causing the pattern analyzer to commence its operation. From the pattern represented in register 2126, namely, 00+−00, a transposition is found and therefore analyzer 2127 forms a misspelling class indication of 2 (see Tables 2 and 17).

The same analysis may be used for the examples of 3, 4 and 5 for insertions, deletions and substitutions. In each case the entry word as indicated by the misspelling class indication stored in misspelling class store 2128 is found to be an acceptable misspelling and therefore the entry and the corresponding misspelling class indication are transferred from data store 2112 and misspelling class store 2128 to memory 2134.

The operation is substantially as discussed above for the remaining example 6 except that the compare types 00X0++ are stored in register 2126. This causes a misspelling class indication (MS) of 6 for multiple misspelling errors which will be stored at location 6 of store 2118. Since the misspelling class indication in storage location 6 of store 2128 indicates a multiple error, the entry word in storage location 6 of data base store 2112 is not transferred to store 2134 since it is a nonacceptable or multiple error.

The foregoing discussion has assumed that the pattern analyzer 2128 is effective for analyzing the compare type indications in register 2126 after all of the characters of the query have been compared. It will be understood that the pattern analyzer could do its operation as each compare type indication is formed rather than waiting until all of the compare type indications for a particular query word have been formed.

4. Alternate Embodiment of FIGS. 15 and 16

FIGS. 15 and 16 are a schematic block diagram of an alternate arrangement for carrying out a portion of the method and process described in connection with FIGS. 11 and 12 for determining compare type indications and misspelling class indications. FIG. 15 includes a control unit 2130 having sequence count outputs designated by the symbol S which control the sequence of operation of the system. A shift type entry register 2312 is provided having storage for three characters of an entry word, the three characters of storage being labeled Ei−1, Ei and Ei+1, corresponding to the next lower, the same, and the next higher position of the entry word compared with a given query character Qi.

A query character 2314 is provided for storing a character of the query which is under comparison. A compare type indication (CTI) regiter 2316 has four bits of storage labeled 1, 2, 4, 8 corresponding to the 1, 2, 4, 8 number code. The CTI register 2316 is the one in which the triplet compare type indications noted in Table 18 are formed. Bit 8 is added in order to allow the formation of the value 8 after the last character of the query has been processed.

A base relative addressing arrangement is provided for addressing the characters of the entry and query, to the right of the count bytes depicted at 4 and 3 in Table 1. To this end an entry base register 2318 stores a base address which points to the character in RAM immediately to the right of the last entry character of ENTRY(58). An NE register 2322 stores the SIZE value from the entry format and, when added to the base address in the E base register 2318, forms the address of the leftmost or first character of the entry character string in ENTRY(58) contained in RAM 1242.

Similarly, the Q base register 2320 stores the address of the location in RAM 1242 for the character immediately to the right of the last character of the query character string in QUERY(58) and an NQ counter 2324 stores the SIZE value for the query word. By way of example, the SIZE value in NQ when added to the address in the Q base register 2320 forms the address of the leftmost or first character of the query character string in ENTRY(58).

An adder 2326 combines the values in registers 2318 and 2322 to form an address in RAM 1242 of a character in the entry and combines the values in the Q base registers 2320 and 2324 to form an address in RAM 1242 of a character in the query. The output of adder 2326 is stored in a RAM address register 2328 and is then used to address the RAM 1242.

A null register 2330 stores a null value (a unique character which does not match any of the other characters of an entry or query).

Gates 2340, 2342, 2344 and 2346 are provided for setting the bits 1, 2, 4, 8 of the CTI register 2316 to 1 states in the manner hereinafter to be described. CLR line 2348 clears the CTI register 2316 to zero. Gates 2350 and 2351 store the null character from register 2330 and an entry character from the RAM 1242 into the Ei+1 storage location of entry register 2312. The entry register 2312 is a shift type register which shifts the contents of Ei+1 into location Ei and the content of storage location Ei into storage location Ei−1 as a character is shifted into location Ei+1.

Gates 2354, 2356 and 2358 connect the storage locations Ei−1, Ei and Ei+1 to an input of a compare circuit 2360. The compare circuit 2360 compares the character in one of storage locations Ei−1, Ei and Ei+1 of the entry register to the character in query register 2314. If a match occurs a true signal is formed at the output 2362 of the compare circuit 2360. In the absence of a match, a false signal is formed at the output 2362.

A gate 2364 stores query characters read from the RAM 1242 into the query register 2314. The control unit 2310 has outputs numbered corresponding to the numbers assigned to nodal blocks N1, N2 through N32 of the flow of FIG. 12. With reference to FIG. 12, nodal blocks N1,N2 ... N32 are labeled S100,S106 ... S232, respectively. FIG. 15 only shows outputs S100, S106 and S232 corresponding to nodal blocks N1, N2 and N32, the others being indicated by dashed lines. These outputs are input to decoder 2310 of FIG. 16.

Referring to FIG. 16, a decoder 2370 is provided having an input from output 2317 of the CTI register 2316 and having inputs from the outputs S100,S106 ...

S232 of control unit 2310 which correspond to nodal blocks N1 through N32. Decoder 2370 is arranged to form misspelling class indications (one of values 1 through 6) depending on which one of outputs S100, S106 ... S232 (corresponding to one of nodal blocks N1 through N32) is true and the value of the compare type indication in CTI register 2316.

By way of example, during sequence block 100 (N1) a true signal is formed at the S100 output of the control unit 2310. Assuming that the compare type indication in CTI register 2316 is zero, the decoder 2370 forms a misspelling class indication of 0 (MS) (Table 2). Similar comments apply for a compare type indication of 1. A compare type indication of 2 will cause decoder 2370 to form a misspelling class indication of 1 (M). Similar analyses may be made for each of the other nodes in the flow diagram of FIG. 12.

The jumps indicated in the flow diagram of FIG. 12 going through the "result" boxes 104, 110, 118, 120, 126, 128, 134, 136, 142, 144, 150, 152, 158, 160, 165, 166, 172, 174, 180, 182, 188, 190, 196, 198, 204, 206, 212, 214, 220, 222, cause a control signal at the RES output of the control unit 2310. This control signal causes a gate 2376 to gate the misspelling classification indication value formed at the output of decoder 2370 into a result register 2378. A decoder 2380 decodes the misspelling class indication value stored in result register 2378 and forms a control signal at one of two outputs 2382 and 2384. When the misspelling class indication in result register 2378 is for any one of the acceptable misspellings, a true signal is formed at the output 2382 by decoder 2380. If the value in result register 2378 is for any of the nonacceptable misspellings, a true signal is formed at the output 2384.

Consider now the operation of the system of FIGS. 15 and 16 in more detail, making reference to the blocks of the flow of FIG. 12 which have the same number as the state of control unit 2310. Initially control unit 2310 enters state 13 where all of the registers depicted in FIGS. 15 and 16 are initialized or reset to zero by control unit 2310 and the query base address and the entry base address are stored in registers 2318 and 2320 (by means not shown). The control unit 2310 enters state 13 (block 13 of the flow) and forms control signals at its outputs S13a, S13b, S13c, S13d, S13e and S13f (not shown on control unit 2310). Additionally the SIZE value for the query word and the SIZE value from the entry word are sequentially read out from RAM 1242 and applied to gate 2351. A control signal at S13a causes the Nq counter 2324 to store the SIZE value for the query and later a control signal at S13b causes the NE counter 2322 to store the SIZE value for the entry.

A control signal is formed at S13c and causes gate 2350 to store the null value from register 2330 into location Ei+1 of the entry register 2312. The adder 2326 combines the address in E base register 2318 and the value in Ne counter 2322 to form the address of the first character of the entry character string and the result is stored in RAM ADD register 2328. The address in register 2328 is then provided to address latches 1158 (FIG. 11) to address RAM 1242 and read out the first (leftmost) character of the entry character string and apply it to gate 2351. The control signal formed at output S13d by the control unit 2310 causes the first character of the entry applied to gate 2351 to be shifted into location Ei+1 and the null value to be shifted into location Ei of the entry register 2312. The control signal at S13d additionally causes a control signal at the count (CT) input of the Ne counter 2322, causing the SIZE value to be counted down by one to thereby point at the entry character in the next higher position of the entry word.

A control signal is now formed at the S13e output and the adder 2326 now combines the content of the E base register 2318 and the Ne counter 2322, forming an address which is stored in RAM ADD register 2328 which in turn is applied to the address latches and used to address the RAM 1242 and read out the second entry character, causing it to be applied to gate 2351. The control signal at S13d causes gate 2351 to shift the second character into location Ei+1 and causes the content of locations Ei and Ei+1 to be shifted to the left, one location. Entry register 2312 now contains a null value in location Ei−1, the first entry character in Ei and the second entry character in Ei+1.

The control signal at S13d also causes the SIZE value in the Ne counter 2322 to be counted down one more value and thereby point to the third character of the entry.

A control signal is now formed at the S13f output and the adder 2326 combines the content of the Q base register 2320 and the Nq counter 2324, forming the address of the character in the first (leftmost) location of the query character string. The address is stored in RAM ADD register 2328, applied to the address latches and used to address the RAM 1242, causing the first character of the query to be read out and applied to gate 2351. The control signal at S13f causes gate 2364 to store the first query character into the query register 2314.

At this point entry register 2312 contains, in order from left to right, a null character, the first character E1 and the second character E2 of the entry character string, whereas the query register 2314 contains the character Q1 from the first position of the query character string.

Following sequence block 13 of the flow the nodal block 100 (N1) is entered where there is a call on the compare procedure where sequence blocks 26-35 are entered. As pointed out hereinabove, a call on the compare procedure causes the compare procedure depicted in FIG. 12 to be entered. The following operation performs the essential portion of the compare procedure.

Returning to the system of FIGS. 15 and 16, during state 26 of the control unit it forms a control signal at the S28 output. Assuming that the entry register 2312 still contains characters null, E1 and E3 and that the query register 2314 still contains the character Q1, the control signal at S28 causes gate 2354 to couple the null character to the compare circuit 2360 which then compares the null character with the query character Q1 in register 2314. There is a lack of comparison and accordingly a false signal is applied to gate 2344. A control signal is formed at the S29 output during the control signal at the S28 output. However, gate 2344 is not activated because of the false signal from the compare circuit 2360. As a result each of the bits in storage in CTI register 2316 remains in a zero condition. This is the condition depicted at sequence block 30 of FIG. 20. Assuming that the comparison of the characters in Ei−1 and Qi resulted in a match, the control signal at S26 would cause gate 2344 to set bit 4 of register 2316 to a 1. This would correspond to block 29 of the flow.

During state 31 of the control unit 2310, a control signal is formed at the S31 output causing gate 2356 to couple the character in Ei to the comparator 2360 which in turn compares that character with the query character in Qi register 2314. If there is a lack of comparison, a false signal is formed at the 2362 output which, as discussed above, will cause gate 2342 not to be activated. Assuming a comparison, a true signal will be formed at the 2362 output.

Assuming a match and therefore a true signal at the 2362 output, a control signal is formed at the S32 output while the signal is still formed at the S31 output. The true signal at the S32 output in combination with the true signal at the 2362 output causes gate 2342 to set bit 2 of the CTI register 2316 to a 1, thereby causing the value 2 to be stored in the CTI register 2316.

State 33 of the control unit is now entered and a control signal is formed at output S33 causing gate 2358 to couple the entry character, located in Ei+1 of register 2312, to the comparator 2360, causing that character to be compared with character Q1 in Qi register 2314. Assuming a lack of comparison, a false signal is formed at output 2362 preventing any of gates 2340-2344 from being activated. Assuming a match, a true signal is formed at the 2362 output. While the true signal is formed at the 2362 output, a control signal is formed at the S34 output causing gate 2340 to store a 1 value in bit 1 of the CTI register 2316. This corresponds to block 34 of the flow. This then is in effect an additive process in the sense that, for example, a 1 in both bit locations 1 and 2 forms a representation of a decimal value 3. A 1 in all three bit positions will be a decimal value 7. It will now be evident that compare type indications with values corresponding to that indicated at Table 18 are formed in register 2316.

Returning now to block 26 of the flow and state 26 of the control unit 2310, a control signal is formed at the S26 output forming one input to gate 2346. If the Nq counter 2324 had been counted down to zero thereby indicating that no further query characters exist for processing, then state 27 of the control unit 2310 would be entered which corresponds to flow block 27. Here a control signal is applied at the S27 output of the control unit 2310. The value in Nq of zero causes a true signal at the Nq=0 output which in turn causes gate 2346 to set bit 8 of the CTI register 2316 to a 1 condition. This then corresponds to jump point 8 from each of the nodes N1-N32 of the flow.

Assume now that the compare procedure has been completed and consider the operation of the system of FIGS. 15 and 16 during the rest of the flow following oneof the nodal blocks. First consider nodal block N1 (FIG. 12B) and assume that the call on the compare procedure has been completed and as a result a compare type indication has been formed in the CTI register 2316 of FIG. 15. The CTI register 2316 is an input to the control unit 2310 and is an input to decoder 2370 (FIG. 16). The control unit entered the steps corresponding to the call procedure following state 100. Accordingly nodal register 2371 stored a value corresponding to node 1 and that value is still contained in the nodal register 2371. This value in combination with the compare type indication in the CTI register 2316 causes decoder 2370 to form tentative misspelling class indications corresponding to the letters M, T, D, I, S, and MS (see Table 2) at the jump points from the flow. For example, in the example following node 1 if the compare type is either a zero or a 1, the decoder 2370 will form an output signal corresponding to an MS, indicating a multiple spelling error.

Consider now another example and assume that the call procedure was made after entering block 106 corresponding to node N2 of the flow. The nodal register 2371 now stores a value corresponding to node N2. Assume that the compare procedure has been completed and that the CTI register 2316 contains one of the 8 compare type indications following block 108. If for example the compare type indication is a zero then decoder 2370 will form a tentative misspelling class indication corresponding to a substitution (S). If the class indication in CTI register 2316 is a 1 then decoder 2370 forms an output signal corresponding to a deletion (D). Other examples will be evident from the flow diagram and the foregoing discussion. Where the tentative misspelling class indication results in any one of blocks 104, 136, 142, 144, 150, 152, 158, 160, 166, 172, 174, 180, 182, 188, 190, 196, 198, 204, 206, 212, 214, 220, 222, 228, 230, 236, or 238, the final misspelling class indication has been determined. Accordingly the control unit 2310 will enter a state causing a control signal at input 2377 to gate 2376 causing it to store the representation of the misspelling class indication formed by decoder 2370 into results register 2378 for the purpose hereinabove described.

5. Alternate Embodiment of FIG. 17

FIG. 17 depicts an alternate embodiment of the invention for determining compare type indications. Table 20 depicts the sequence of operation of the schematic block diagram of FIG. 17 using symbolic notation. The meaning of the symbols used in Table 20 will become evident during the following discussion. Refer now to FIG. 17 and Table 20 and consider the operation. A source of characters for an entry word is contained in memory 2410. The characters of a query word are stored in another memory 2412. During step 0, Table 20, the first character of an entry word is provided by memory 2410 and stored in A register 2414.

During step 1 the following action takes place. The entry character in A register 2414 is shifted to a B register 2416. A second character is provided by memory 2410 and is stored in A register 2314. Memory 2412 provides the first character of a query word and the character is stored in register 2420. A counter 2442 is provided for initially storing a SIZE value representing the total number of characters in the query word being provided by source 2412. Also during step 1 the SIZE value in counter 2442 is decremented by 1, reflecting the fact that one query character has been stored in register 2420. The comparators 2434, 2432 and 2430 now compare the entry characters and the query character and form a compare type indication in compare type indication (CTI) register 2440. C register 2418 is for storing the Ei−1 character, B register 2416 is for storing the Ei character, and A register 2414 is for storing the Ei+1 character of the entry where "i" is the position of the query character contained in D register 2420. Comparator 2434 compares the Ei−1 character in register 2418 with the Qi character in register 2420 and if an equality, forms a true signal and if not an equality, forms a zero at the output D=C. If a true output is formed at output D=C, bit 4 of CTI register 2440 is set to 1. This being the first character of the query, the C register 2418 for entry character Ei−1 contains a zero or null value. Therefore comparator 2434 does not detect an equality and bit 4 of the CTI register 2440 remains in a zero state. Comparator 2432 compares the Ei character in register 2416 with the Qi character in register 2420 and if an equality is detected, forms a true signal at the D=B output and if no equality is detected, forms a false signal at the D=B output. If a true signal is formed, bit 2 of the CTI register 2440 is set to 1 whereas if a false signal is formed at the D=B output, bit 2 remains in a zero state. Comparator 2430 compares the Ei+1 character in register 2414 with the Qi character in register 2420 and if an equality is found, forms a true signal at the D=A output. If no equality is found, a false signal is formed at the D=A output. A true signal at the D=A output of comparator 2430 sets bit 1 of the CTI register 2440 to a 1 state whereas a false signal causes bit 1 to remain in a zero state. CTI register 2440 therefore at the end of state 2 has a compare type indication representing the result of the comparison between the character Qi in register 2420 and characters Ei−1, Ei and Ei+1 of the entry in registers 2418, 2416 and 2414. pattern analyzer 2444 now analyzes the compare type indication in accordance with the jump conditions indicated following the first block N1 (100) of the flow depicted in FIG. 12B. For example if the compare type indication is zero or 1, the operation is ended because a multiple misspelling error (MS) is detected. If the compare type indication is a 2 or a 3 then the analyzer proceeds to the next nodal block N2 (106).

Following step 1, step 2 of the operation depicted in Table 20 is entered where the following action takes place: The character in B register 2416 is shifted to C register 2418, the character in A register 2414 is shifted to B register 2416, and the third character of the entry word is provided by memory 2410 and is stored in A register 2414. Additionally, the second character of the query word is provided by memory 2412 and is stored in D register 2420 and the decremented SIZE value in counter 2442 is again decremented by 1. The comparators 2434, 2432 and 2430 now compare the query character Qi in the D register 2420 with the entry characters in registers 2418, 2416 and 2414 in the manner described above to form another compare type indication in the CTI register 2440. Assuming that the pattern analyzer 2444 proceeded from block N1 (100)1 to nodal block N2 (106), then the compare type indication in CTI register 2440 is analyzed in accordance with the jump steps indicated following nodal block N2 (106) of the flow. For example, if the value in CTI register 2440 is a zero or a 4, it indicates a tentative substitution (S) and accordingly the pattern analyzer will then go to a state corresponding to nodal block N3 (112) of the flow. If the compare type indication in CTI register 2440 is a 2, 3, 6 or 7, then nodal block N2 (106) is reentered to await the next compare type indication in CTI register 2440; if the compare type indication in CTI register 2440 is a 1 or a 5, then a state corresponding to nodal block N4 (122) of the flow is entered to await the next compare type indication. If this had been the last character of the query word, counter 2442 would have been at zero and bit 8 of the CTI register would have been set to zero in which case the result had been reached and accordingly step 3 of Table 20 would have been entered where the pattern analyzer would have formed the final misspelling class indication forming a misspelling class indication for a match (M).

The sequence of operation of the system of FIG. 8 proceeds through the flow of FIGS. 12B through 12J in the manner discussed above. For example, the next query of the entry is shifted into the A register 2414 and the characters in the A and B registers are shifted to the left to the B and C registers and the next character of the query is stored in register 2420 while counter 2442 is decremented by 1. Comparators 2434, 2432 and 2430 make their comparison and a new compare type indication is formed in CTI register 2440. Assuming for example that the pattern analyzer 2444 is in a state corresponding to nodal block N2 (106) of the flow (FIG. 12B) and assuming by way of example that the compare type indication in CTI register 2440 is a zero corresponding to a substitution error, the pattern analyzer 2444 goes to a state corresponding to nodal block N3 (112) of the flow corresponding to a misspelling class indication for a tentative substitution (S).

The pattern analyzer 2444 will then remain in the state corresponding to nodal block N3 (112) awaiting the next compare type indication in register 2440 and will then jump following one of the paths depicted following nodal block N3 (112) of the flow depending on the compare type indication in CTI register 2440.

The system of FIG. 17 is arranged so that the compare type indications are analyzed serially by the pattern analyzer 2444 as they are formed in the CTI register 2440.

6. Alternate Embodiment of FIG. 18

FIG. 18 depicts an alternate embodiment of the invention wherein compare type indications are accumulated in a memory and are then analyzed after all of the characters of the query have been compared with the characters of the entry. FIG. 18 depicts the same registers 2418, 2416, 2414, 2420 and the same comparators 2434, 2432 and 2430 as depicted in FIG. 17 and using the same reference numerals for identification thereof. Similarly the memory 2410 for entry characters and the same memory 2414 for query characters are provided. Similarly the system of FIG. 18 includes a counter 2442 for storing and decrementing a SIZE value corresponding to the number of characters in the query provided by memory 2412.

The construction and operation of the aforegoing circuits are similar to that discussed hereinabove with respect to FIG. 17 except that instead of the comparators 2434, 2432 and 2430 storing bits in a single register 2440 in FIG. 17, the outputs of comparators 2434, 2432 and 2430 are connected to the input of a compare type indication memory 2452. The memory 2452 has a shift register 2458 coupled to the output of comparator 2434 for storing the bits corresponding to bit 4 of the compare type indication, a shift register 2456 coupled to the output of comparator 2432 for storing the bits corresponding to bit 2 of the compare type indication, a register 2454 coupled to the output of comparator 2434 for storing the bits corresponding to bit 1 of the compare type indication, and a shift register 2460 for storing the bits corresponding to bit 8 of the compare type indication. Register 2460 is connected to the output of counter 2442. For a given set of values in registers 2418, 2416, 2414 and 2420, comparator 2434 will store a 1 into register 2458 if equality is detected, and a zero if inequality is detected, compartor 2432 will store a 1 into register 2456 if equality is detected and a zero if inequality is detected, and comparator 2430 will store a 1 into register 2454 if equality is detected and a zero if inequality is detected. Similarly for a given set of values in registers 2420, 2418, 2416 and 2414, register 2460 will store a zero if counter 2442 is in any state other than zero and a 1 if counter 2442 is zero. The registers in the CTI register 2452 have the same number of bit storage positions and the bit storage locations in each of the registers are numbered 1 through M. A given compare type indication is stored in the same numbered bit position of the registers starting with bit N. As each new compare type indication is stored, the bits of the previous compare type indication or indications in the registers are shifted one bit position to the left. After all of the characters of the query have been compared, the last compare type indication will be an 8, indicated by a 1 in register 2460. The pattern analyzer 2450 will then commence its operation, looking at the compare type indications one by one starting with the earliest and moving to the most recent one (the compare type indication of 8). The analyzer follows the sequence of operation depicted in the flow diagram of FIGS. 12B through 12J in the manner discussed above. For each nodal block a tentative compare type indication is formed based on the present nodal block and the compare type indication. A jump is then taken depending on the tentative misspelling class indication to one of the other nodal blocks in the flow. If a multiple error is detected before reaching the compare type indication of 8, then operation is terminated at that point and the tentative misspelling class indication becomes the final misspelling class indication. By way of example, if for nodal block N1 (100) the compare type indication is zero or 1, the final misspelling class indication is a multiple spelling error (MS). If during nodal block N3 (112) the compare type indication is zero, 1, or 5, the misspelling class indication is a multiple spelling error (MS) and the operation is terminated.

Assuming that the operation is not earlier terminated because of a multiple error, the program analyzer will continue until the compare type indication 8 is reached in the memory at which point the particular jump point following one of the nodal blocks will be used to determine the final misspelling class indication. For example, assuming that the compare type indication 8 is found following nodal block N9 (146), a substitution error is found and the program analyzer will form a final misspelling class indication corresponding to a substitution error (S).

Alternatively, register 2460 could be replaced with a single flip flop or equivalent storage means and when set true would be used to cause the pattern analyzer to commence its operation.

Although an exemplary embodiment of the invention has been disclosed for purposes of illustration it will be understood that various changes, modifications and substitutions may be incorporated into such embodiment without departing from the spirit of the invention as defined by the claims appearing hereinafter.

V. TABLES

TABLE 1

| WORD FORMAT AND SYNC SIGNALS | | |
|---|---|---|
| (1) | SYNC PATTERN | |
| | CPU to MCS | MCS RESPONSE |
| | AAAAH | AAAAH INTERRUPT 1 |
| (2) | PLACE MARK PATTERN | |
| | CPU to MCS | MCS RESPONSE |
| | FF00H | FF00H INTERRUPT |
| (3) | QUERY WORD FORMAT | |

| COMMAND BYTE | SIZE BYTE | QUERY (58) |

(4) ENTRY WORD FORMAT

| UNUSED BYTE | PKINDEX 2 BYTES | SIZE BYTE | ENTRY (58) |

(5) RESPONSE WORD FORMAT

| MTYPE BYTE | UNUSED BYTE | PKINDEX 2 BYTES | SIZE BYTE | ENTRY (58) |

TABLE 2

| ACCEPTABLE AND NONACCEPTABLE MISSPELLING CLASSES | | |
|---|---|---|
| MISSPELLING CLASS INDICATION | ABBREVIATION | |
| 0 | MS | MULTIPLE SPELLING ERROR - the query word stem contains multiple errors with respect to the first N characters of the entry word, where N is the length of the query word stem. |
| 1 | M | MATCH - the query word stem is an exact match to the entry word for each character of the query word stem when the query word stem and the entry word are aligned so that the first characters of each coincide. |
| 2 | T | TRANSPOSITION - the query word stem contains a single transposition of two characters wth respect to the first N characters of the entry word, where N is the length of the query word stem. |
| 3 | D | DELETION - the query word stem contains a deletion of a single character, i.e., a single deletion error, with respect to the first N characters of the entry word, where N is the length of the query word stem. |
| 4 | I | INSERTION - the query word stem contains an insertion of a single character, i.e., a single insertion error, with respect to the first N characters of the entry word, where N is the |

TABLE 2-continued
ACCEPTABLE AND NONACCEPTABLE MISSPELLING CLASSES

| MISSPELLING CLASS INDICATION | ABBREVIATION | |
|---|---|---|
| 5 | S | length of the query word stem. SUBSTITUTION - the query word stem contains the substitution of a single character, i.e., a single substitution error, with respect to the first N characters of the entry word, where N is the length of the query word stem. |

TABLE 3
QRIO STRUCTURE IN EXTERNAL RAM 1104

| COMMAND | BYTE, | Command to QAP: 0 - initiate query 1 - continue query 2 - diagnose 3 - reset 4 - execute foreign code |
|---|---|---|
| ENTRIES | POINTER, | Ptr to entry data or code to execute; |
| NUMENT | WORD, | Number of entries or bytes of code to move; |
| PACKETS | POINTER, | Ptr to corresponding packets, one per entry; |
| RESULTS | POINTER, | QAP acceptable packets; |
| NUMAVAIL | WORD, | Maximum number of packets result buffer will hold; |
| QCHARS | BYTE, | Number of characters in query word; |
| QUERY(58) | BYTE, | Query character string; queries may be up to 58 characters long. |

TABLE 4
PARM STRUCTURE QUERY INFORMATION TRANSFERRED FROM EXTERNAL RAM 1104 TO INTERNAL RAM 1126,1128

| COMMAND | BYTE | Command to QAP: 0 - initiate 1 - continue 2 - diagnose 3 - reset 4 - execute foreign code |
|---|---|---|
| ENTRIES | POINTER, | Ptr to entry data for query or code to execute; |
| NUMENTS | WORD, | Number of entries decremented by one whenever an entry is sent to MCS; |
| PACKETS | POINTER, | Ptr to corresponding entry packets, one per entry; |
| RESULTS | POINTER, | Ptr to buffer to receive QAP acceptable packets, i.e., valid entry result; |
| NUMAVAIL | WORD, | Maximum number of packets result buffer will hold; |
| QCHARS | BYTE, | Number of characters in query word; |
| QUERY(58) | BYTE | Query character string. |

TABLE 5
VARIABLES/TABLES USED BY PQAPCNTRL

ACCEPTABLE_SUFFIX_TABLE (1202)
Table in ROM 1122,1124 which determines the acceptable suffixes that may appear on entry words that are considered acceptable misspellings by the MCS 1114 when compared against a query stem. Each row of the table contains, logically speaking, a list of acceptable suffix strings. The particular row to be used is dependent on the character patterns within the query word sent to the suffix

TABLE 5-continued
VARIABLES/TABLES USED BY PQAPCNTRL stripping program PSUFIX. PSUFIX will examine the end of the query word and possibly strip off some characters (the suffix) and, based upon the suffix and characters preceding the suffix), determines which set of suffixes can appear on entry words. The set determined is indicated by PSUFIX in the variable QS.WDSELECT (Table 6) which is an indication of a row of this Table. In actuality, the ACCEPTABLE_SUFFIX_TABLE does not contain the actual suffix strings but indexes into another table (SUFFIX TABLE) where the actual strings are located. In each row, the indices are preceded by a count value indicating how many indices are of interest in the row.

SUFFIX_TABLE (2104)
Table in ROM 1122,1124 which contains all possible suffix strings that can be considered as acceptable suffixes in entry words for all possible query words. Each row of the table determines one suffix string. A row consists of a count of the number of characters in the string, followed by the actual ASCII character string.

STORED IN INTERNAL RAM 1126,1128

| | |
|---|---|
| M8612 | A global variable indicating an interrupt has been received from microprocessor 1108 if it is nonzero. It is initialized to zero. |
| MCS | A global variable indicating the number of entities that currently are stored in the output portion of FIFO 1130. It is incremented by one whenever MCS 1114 initiates an interrupt signifying that it has stored a result in the output portion of FIFO 1130. MCS is initialized to zero. |
| TIMER | A global variable indicating an MCS timeout has occurred when it is nonzero. It is initialized to zero. |
| SUFFIX_OK | Boolean item set when comparing an entry word's suffix with a set of acceptable suffixes. TRUE = suffixes match, FALSE = match not found. |
| QUERY_IN_PROGRESS | Boolean item set to TRUE after call to PSUFIX is made to determine query stem. Set to FALSE after all entry words have been sent to MCS and the place mark pattern has been sent and received. It is initialized to FALSE. |
| QUERY_SENT | Boolean item set to TRUE whenever a query has been sent to MCS. Initialized to zero. Used to catch illegal continue command from microprocessor 1108 (block 21). |
| TASK_COMPLETE | Boolean item which is set to TRUE when a place mark pattern is returned to MCS 1114. This indicates that the processing for query word is finished for the current initiate or |

TABLE 5-continued

VARIABLES/TABLES USED BY PQAPCNTRL

| | |
|---|---|
| | continue command. It is initialized to FALSE. |
| PLACE_MARK_SENT | Boolean item which is set to TRUE when place mark pattern is sent to MCS. Initialized to FALSE. |
| ENTRY_INDEX | OFFSET to suffix of an entry word string returned by MCS 1114. |
| SUFF_IX | Index into a specific row of the SUFFIX_TABLE. |
| RESULT_IX | Counter/index indicating how many PACKETS corresponding to result entry words have been stored in the results buffer in external RAM 1104. Also used as results buffer store offset, giving the offset to the location where the next packet may be stored. This item is initialized to zero. |
| PACKET_IX | Index indicating PACKET in packets buffer corresponding to next entry word to be sent to MCS 1114. Initialized to zero. Incremented by 1 after an entry word is sent. |
| I | Index to acceptable suffix indices with the ACCEPTABLE_SUFFIX_TABLE 1202. |
| J | Index to characters within character string within a row of SUFFIX_TABLE 1204. |
| K | Index to characters in suffix of an entry word character string returned by MCS 1114. |

TABLE 6

PSUFIX RELATED DATA ITEMS INCLUDING PARAMETERS, VARIABLES AND TABLES (1) QS structure - query stem variable's structure located in internal RAM 1126,1128

| | | |
|---|---|---|
| QFLAG | BYTE, | Query command flag (initialized to FFH) |
| SIZE | BYTE, | Size of query stem, in bytes |
| STEM(58) | BYTE, | Query stem character string |

(2) Parameters associated with query stored in RAM 1126,1128

| | | |
|---|---|---|
| QTYPE | BYTE, | Type of query: 0 - alphanumeric  1 - numeric |
| WDSELECT | WORD | Selection code - index into ACCEPTABLE_SUFFIX_TABLE |

(3) Local Variables used by PSUFIX in form QS structure stored in RAM 1126,1128

| | |
|---|---|
| CURCHARS | index of current character in stem being processed |
| ACTION | current action value |
| NEXT | holds state/selection code |
| CHARTYPE | character type of current stem character |

(4) Tables used by PSUFIX stored in ROM 1122,1124

| | |
|---|---|
| CLASSIFY_TABLE 1200 | maps query word characters into character types for SUFFIX_STRIP_STATE_TABLE processing |
| SUFFIX_STRIP STATE_TABLE 1201 | used to drive logic of PSUFIX program in stripping suffix from query word |

TABLE 7

ENTIN STRUCTURE
ENTRY WORD FORMAT RETURNED BY MCS 1114
TO RAM 1126,1128 ON QAP BOARD 1109

| | | |
|---|---|---|
| MTYPE | BYTE, | Match type: 0 - mismatch (multiple errors) |

TABLE 7-continued

ENTIN STRUCTURE
ENTRY WORD FORMAT RETURNED BY MCS 1114
TO RAM 1126,1128 ON QAP BOARD 1109

| | | |
|---|---|---|
| | | 1 - exact match |
| | | 2 - single transposition |
| | | 3 - single character deletion |
| | | 4 - single character insertion |
| | | 5 - single character substitution |
| UNUSED | BYTE, | Unused byte (= 0) |
| PKINDEX | WORD, | Packet index corresponding to entry word |
| SIZE | BYTE, | Size of entry in bytes |
| ENTRY(58) | BYTE | Entry character string. Entries may be up to 58 characters long. |

TABLE 8

CLASSIFY_TABLE 1200

| 0, | 0, | 0, | 0, | 0, | 0, | 0, | 0, |
|---|---|---|---|---|---|---|---|
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| | A | B | C | D | E | F | G |
| 0, | 0, | 0, | 0, | 1, | 2, | 0, | 3, |
| H | I | J | K | L | M | N | O |
| 0, | 4, | 0, | 0, | 0, | 0, | 5, | 0, |
| P | Q | R | S | T | U | V | W |
| 0, | 0, | 0, | 6, | 0, | 0, | 0, | 0, |
| X | Y | Z | | | | | |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |

TABLE 9

SUFFIX_STRIP_STATE_TABLE 1201

CHARACTER TYPES →

| **N | | 0 | 1 | 2 | 3 | 4 | 5 | 6 | |
|---|---|---|---|---|---|---|---|---|---|
| E | | | | | | | | | |
| X | | * | D | E | G | I | N | S | |
| T | | | | | | | | | State Description |
| ↓ | | | | | | | | | |
| 0 | A | 0 | 0 | 1 | 0 | 0 | 0 | 0 | Initial State |
| | N | 1 | S1 | 3 | S2 | 1 | 1 | S3 | (use last char. of word) |
| 1 | A | 0 | 0 | 2 | 0 | 0 | 0 | 0 | D passed |
| | N | 1 | 1 | 4 | 1 | 1 | 1 | 1 | |
| 2 | A | 0 | 0 | 0 | 0 | 0 | 1 | 0 | G passed |
| | N | 1 | 1 | 1 | 1 | 1 | S4 | 1 | |
| 3 | A | 1 | 1 | 2 | 1 | 1 | 1 | 1 | S passed |
| | N | 2 | 1 | 2 | 2 | 2 | 2 | 2 | |
| 4 | A | 3 | 3 | 3 | 3 | 2 | 3 | 3 | N/G NG at end |
| | N | 1 | 1 | 1 | 4 | 1 | 1 | 1 | G stripped |

| | |
|---|---|
| ACTION(A) = 0 | Do nothing |
| ACTION(A) = 1 | Decrement stem length by one |
| ACTION(A) = 2 | Decrement stem length by two |
| ACTION(A) = 3 | Decrement stem length by one |
| NEXT(N): | S4 means "state 4" |
| NEXT(N): | 4 means selection code 4, i.e. row 4 (indexed from 0) of ACCEPTABLE_SUFFIX_TABLE |

*For all other characters
**NEXT used to select each row or state of table

TABLE 10

ACCEPTABLE_SUFFIX_TABLE 1202

| WDSELECT (ACCEPTABLE SUFFIX INDICATION) | COUNT | ACCEPTABLE SUFFIX INDICES | SUFFIX STRIPPING RULE(S) |
|---|---|---|---|
| 0 | 2 | 0 2 — — — | numeric stem |
| 1 | 5 | 0 2 3 4 5 — | default non-strip: —/null |
| 2 | 4 | 0 2 3 5 — — | —/S |
| 3 | 4 | 1 3 4 5 — — | —/E, —/ES |
| 4 | 6 | 0 1 2 3 4 5 | —/ED, —/ING |

TABLE 11

SUFFIX_TABLE 1204

| SUFFIX INDEX | CHARACTER STRING OF EACH SUFFIX |       |   |   |   |   |
|---|---|---|---|---|---|---|
| 0* | 0 | . | . | . | . | . |
| 1  | 1 | E | . | . | . | . |
| 2  | 1 | S | . | . | . | . |
| 3  | 2 | E | D | . | . | . |
| 4  | 2 | E | S | . | . | . |
| 5  | 3 | I | N | G | . | . |

*null suffix

TABLE 12

STRIPPING RULES, ACCEPTABLE SUFFIX LISTS AND EXAMPLES

Notation Conventions:
"—" = any character
"/" = strip point
"null" = suffix of zero characters

| | Rule | Acceptable Suffixes | Examples |
|---|---|---|---|
| (1) | —/E | E,ED,ES,ING | RATE, TABLE |
| (2) | —/ES | E,ED,ES,ING | STATES,COMPUTES |
| (3) | —/ED | null,E,S,ED,ES,ING | INTERESTED, COMPUTED |
| (4) | —/ING | null,E,S,ED,ES,ING | RATING, DISPOSING |
| (5) | —/S | null,S,ED,ING, | REASONS,ADDS, INTERESTS |
| (6)* | —/null | null,S,ES,ED,ING | HEBREW,CREDIT, INTEREST |

*(default nonstrip rule)
Exceptions to above rules:
If stem length less than 2, or no vowels in stem and suffix is not "S", then do not strip any characters and use default non-strip acceptable suffixes list
If stem is all numerals, then acceptable suffixes are: null, S

TABLE 8A

CLASSIFY_TABLE 1200

| 0, | 0, | 0, | 0, | 0, | 0, | 0, | 0, |
|---|---|---|---|---|---|---|---|
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
|    | A  | B  | C  | D  | E  | F  | G  |
| 0, | 0, | 0, | 0, | 1, | 2, | 0, | 3, |
| H  | I  | J  | K  | L  | M  | N  | O  |
| 0, | 4, | 0, | 0, | 7, | 0, | 5, | 0, |
| P  | Q  | R  | S  | T  | U  | V  | W  |
| 0, | 0, | 0, | 6, | 0, | 0, | 0, | 0, |
| X  | Y  | Z  |    |    |    |    |    |
| 0, | 8, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |

TABLE 9A

SUFFIX_STRIP_STATE_TABLE 1201 FOR RULE —L/Y ADDITION

CHARACTER TYPES → → →

| **N E X T ↓ | | 0 | 1 | 2 | 3 | 4 | 5 | 6 | 7 | 8 | State Description |
|---|---|---|---|---|---|---|---|---|---|---|---|
| | | * | D | E | G | I | N | S | L | Y | |
| 0 | A | 0 | 0 | 1 | 0 | 0 | 0 | 0 | 0 | 0 | Initial State |
|   | N | 1 | S1 | 3 | S2 | 1 | 1 | S3 | 1 | S5 | (use last char of word) |
| 1 | A | 0 | 0 | 2 | 0 | 0 | 0 | 0 | 0 | 0 | D passed |
|   | N | 1 | 1 | 4 | 1 | 1 | 1 | 1 | 1 | 1 | |
| 2 | A | 0 | 0 | 0 | 0 | 0 | 1 | 0 | 0 | 0 | G passed |
|   | N | 1 | 1 | 1 | 1 | 1 | S4 | 1 | 1 | 1 | |
| 3 | A | 1 | 1 | 2 | 1 | 1 | 1 | 1 | 1 | 1 | S passed |
|   | N | 2 | 2 | 3 | 2 | 2 | 2 | 2 | 2 | 2 | |
| 4 | A | 3 | 3 | 3 | 3 | 2 | 3 | 3 | 3 | 3 | N/G NG at end |
|   | N | 1 | 1 | 1 | 1 | 4 | 1 | 1 | 1 | 1 | G stripped |
| 5 | A | 0 | 0 | 0 | 0 | 0 | 0 | 0 | 1 | 0 | Y passed |
|   | N | 1 | 1 | 1 | 1 | 1 | 1 | 1 | 5 | 1 | |

ACTION(A) = 0 Do nothing
ACTION(A) = 1 Decrement stem length by one
ACTION(A) = 2 Decrement stem length by two
ACTION(A) = 3 Decrement stem length by one
NEXT(N): S4 means "state 4"
NEXT(N): 4 means selection code 4, i.e. row 4 (indexed from 0) of ACCEPTABLE_SUFFIX_TABLE
*For all other characters
**NEXT used to select each row or state of table

TABLE 10A

ACCEPTABLE_SUFFIX_TABLE 1202 AFTER RULE —L/Y ADDITION

| WDSELECT (ACCEPTABLE SUFFIX INDICATION) | COUNT | ACCEPTABLE SUFFIX INDICES | | | | | | SUFFIX STRIPPING RULE(S) |
|---|---|---|---|---|---|---|---|---|
| 0 | 2 | 0 | 2 | — | — | — | — | numeric stem |
| 1 | 5 | 0 | 2 | 4 | 5 | 7 | — | default non-strip: —/null |
| 2 | 4 | 0 | 2 | 4 | 7 | — | — | —/S |
| 3 | 4 | 1 | 4 | 5 | 7 | — | — | —/E, —/ES |
| 4 | 6 | 0 | 1 | 2 | 4 | 5 | 7 | —/ED, —/ING |
| 5 | 3 | 1 | 3 | 6 | — | — | — | —L/Y |

TABLE 11A

SUFFIX_TABLE 1204 FOR RULE —L/Y ADDITION

| SUFFIX INDEX | CHARACTER STRING OF EACH SUFFIX | | | | | |
|---|---|---|---|---|---|---|
| 0* | 0 | . | . | . | . | . |
| 1  | 1 | E | . | . | . | . |
| 2  | 1 | S | . | . | . | . |
| 3  | 1 | Y | . | . | . | . |
| 4  | 2 | E | D | . | . | . |
| 5  | 2 | E | S | . | . | . |
| 6  | 3 | I | E | S | . | . |
| 7  | 3 | I | N | G | . | . |

*null suffix

TABLE 12A

STRIPPING RULES, ACCEPTABLE SUFFIX LISTS AND EXAMPLES AFTER —L/Y RULE ADDITION

Notation Conventions:
"—" = any character
"/" = strip point
"null" = suffix of zero characters

| | Rule | Acceptable Suffixes | Examples |
|---|---|---|---|
| (1) | —/E | E,ED,ES,ING | RATE, TABLE |
| (2) | —/ES | E,ED,ES,ING | STATES,COMPUTES |

TABLE 12A-continued
STRIPPING RULES, ACCEPTABLE SUFFIX LISTS AND EXAMPLES AFTER —L/Y RULE ADDITION Notation Conventions:
"—" = any character
"/" = strip point
"null" = suffix of zero characters

| Rule |  | Acceptable Suffixes | Examples |
|---|---|---|---|
| (3) | —/ED | null,E,S,ED,ES ING | INTERESTED COMPUTED |
| (4) | —/ING | null,E,S,ED,ES ING | RATING, DISPOSING |
| (5) | —/S | null,S,ED,ING, | REASONS,ADDS, INTERESTS |
| (6) | —L/Y | E,Y,IES | ASSEMBLY,PROBABLY |
| (7)* | —/null | null,S,ES,ED,ING | HEBREW,CREDIT, INTEREST |

*(default nonstrip rule)
Exceptions to above rules:
If stem length less than 2, or no vowels in stem and suffix is not "S", then do not strip any characters and use default non-strip acceptable suffixes list
If stem is all numerals, then acceptable suffixes are: null, S

TABLE 14
EXAMPLE

| SUFFIX INDICES | SUFFIX CHARACTERS | ACCEPTABLE INFLECTIONS IN ENTRY WORD |
|---|---|---|
| 0 | NONE | HELP |
| 2 | S | HELPS |
| 3 | ED | HELPED |
| 5 | ING | HELPING |

TABLE 16
COMPARE TYPE INDICATION

| COMPARE TYPE INDICATION |  |
|---|---|
| 0 | if character in same position of entry word matches |
| — | if character in next lower position of entry word matches |
| + | if character in next higher position of entry word matches |
| X | if character in none of positions (next lower, same, next higher) match |

TABLE 17
EXAMPLE OF MISSPELLING CLASS FORMATION (1)
```
       E  C  A  R  T  O  N
       Q  C  A  R  T  O  N
C.T.I. 0  0  0  0  0  0
```
match MSC = 1

(2)
```
       E  C  A  T  R  O  N
       Q  C  A  R  T  O  N
C.T.I. 0  0  +  —  0  0
```
transposition MSC = 2

(3)
```
       E  C  A  T  O  N
       Q  C  A  R  T  O  N
C.T.I. 0  0  X  —  —  —
```
insertion MSC = 4

(4)
```
       E  C  A  E  R  T  O  N
       Q  C  A  R  T  O  N
C.T.I  0  0  +  +  +  +
```
deletion MSC = 3

(5)
```
       E  C  A  E  T  O  N
       Q  C  A  R  T  O  N
C.T.I. 0  0  X  0  0  0
```
substitution MSC = 5

(6)
```
       E  C  A  E  T  R  O  N
       Q  C  A  R  T  O  N
C.T.I. 0  0  X  0  +  +
```
multiple error MSC = 6

TABLE 18
TRIPLET COMPARE TYPE INDICATION

| DECIMAL COMPARE TYPE INDICATION (D.C.T.I.) |  | TRIPLET COMPARE TYPE INDICATION (C.T.I.) | | |
|---|---|---|---|---|
| | | Bit 1 Ei−1 | Bit 2 Ei | Bit 3 Ei+1 |
| X | 0* | 0 | 0 | 0 |
| + | 1* | 0 | 0 | 1 |
| 0 | 2* | 0 | 1 | 0 |
| 0,+ | 3 | 0 | 1 | 1 |
| — | 4* | 1 | 0 | 0 |
| +,— | 5 | 1 | 0 | 1 |
| 0,— | 6 | 1 | 1 | 0 |
| +,0,— | 7 | 1 | 1 | 1 |

TABLE 19
EXAMPLE OF MISSPELLING CLASS DETERMINATION FOR USE WITH NON UNIQUE CHARACTERS (1)
| | | 1 | 2 | 3 | 4 | 5 | 6 | |
|---|---|---|---|---|---|---|---|---|
| E | null | C | A | R | T | O | N | null |
| Q | — | C | A | R | T | O | N | |
| nodes | — | N1 | N2 | N2 | N2 | N2 | N2 | N2 |
| D.C.T.I. | — | 2 | 2 | 2 | 2 | 2 | 2 | 8 |
| tentative M.S.C. | — | M | M | M | M | M | M | M | match MSC = 1

(2)
| | | 1 | 2 | 3 | 4 | 5 | 6 | |
|---|---|---|---|---|---|---|---|---|
| E | null | C | A | T | R | O | N | null |
| Q | — | C | A | R | T | O | N | |
| nodes | — | N1 | N2 | N2 | N4 | N10 | N32 | N32 |
| D.C.T.I. | — | 2 | 2 | 1 | 4 | 2 | 2 | 8 |
| tentative M.S.C. | — | M | M | D | T | T | T | T | transposition MSC = 2

(3)
| | | 1 | 2 | 3 | 4 | 5 | 6 |
|---|---|---|---|---|---|---|---|
| E | null | C | A | T | O | N | null |
| Q | — | C | A | R | T | O | N |

TABLE 19-continued

EXAMPLE OF MISSPELLING CLASS DETERMINATION
FOR USE WITH NON UNIQUE CHARACTERS

|     |       |      |    |    |    |    |    |    |    |      |                       |
|-----|-------|------|----|----|----|----|----|----|----|------|-----------------------|
|     | nodes | —    | N1 | N2 | N2 | N3 | N6 | N6 |    | N6   |                       |
|     | D.C.T.I. | — | 2  | 2  | 0  | 4  | 4  | 4  |    | 8    |                       |
|     | tentative |   |    |    |    |    |    |    |    |      |                       |
|     | M.S.C. | —   | M  | M  | S  | I  | I  | I  |    | I    | insertion MSC = 4     |
| (4) |       |      | 1  | 2  | 3  | 4  | 5  | 6  |    |      |                       |
|     | E     | null | C  | A  | E  | R  | T  | O  |    | N null |                     |
|     | Q     | —    | C  | A  | R  | T  | O  | N  |    |      |                       |
|     | nodes | —    | N1 | N2 | N2 | N4 | N13| N13|    | N13  |                       |
|     | D.C.T.I. | — | 2  | 2  | 1  | 1  | 1  | 1  |    | 8    |                       |
|     | tentative |   |    |    |    |    |    |    |    |      |                       |
|     | M.S.C. | —   | M  | M  | D  | D  | D  | D  |    | D    | deletion MSC = 4      |
| (5) |       |      | 1  | 2  | 3  | 4  | 5  | 6  |    |      |                       |
|     | E     | null | C  | A  | E  | T  | O  | N  |    | null |                       |
|     | Q     | —    | C  | A  | R  | T  | O  | N  |    |      |                       |
|     | nodes | —    | N1 | N2 | N2 | N3 | N5 | N5 |    | N5   |                       |
|     | D.C.T.I. | — | 2  | 2  | 0  | 2  | 2  | 2  |    | 8    |                       |
|     | tentative |   |    |    |    |    |    |    |    |      |                       |
|     | M.S.C. | —   | M  | M  | S  | S  | S  | S  |    | S    | substitution MSC = 5  |
| (6) |       |      | 1  | 2  | 3  | 4  | 5  | 6  |    |      |                       |
|     | E     | null | C  | A  | E  | T  | R  | O  |    | N null |                     |
|     | Q     | —    | C  | A  | R  | T  | O  | N  |    |      |                       |
|     | nodes | —    | N2 | N2 | N2 | N3 | N5 |    |    |      |                       |
|     | D.C.T.I. | — | 2  | 2  | 0  | 2  | 1  |    |    |      |                       |
|     | tentative |   |    |    |    |    |    |    |    |      |                       |
|     | M.S.C. | —   | M  | M  | S  | S  | MS |    |    |      | multiple error MSC = 6 |
| (7) |       |      | 1  | 2  | 3  | 4  | 5  | 6  | 7  |      |                       |
|     | E     | null | C  | A  | E  | T  | O  | O  | N  | null |                       |
|     | Q     | —    | C  | A  | R  | T  | O  | O  | N  |      |                       |
|     | nodes | —    | N1 | N2 | N2 | N3 | N5 | N5 | N5 | N5   |                       |
|     | D.C.T.I. | — | 2  | 2  | 0  | 2  | 3  | 6  | 2  | 8    |                       |
|     | tentative |   |    |    |    |    |    |    |    |      |                       |
|     | M.S.C. | —   | M  | M  | S  | S  | S  | S  | S  | S    | substitution MSC = 5  |

TABLE 20

SEQUENCE OF OPERATION - FIGS. 7, 8

| STEP | ACTION |
|------|--------|
| 0 | A ← E |
| 1 | B ← A |
|   | A ← E |
|   | D ← Q |
|   | QS ← QS ← 1 |
|   | PATTERN ANALYZER |
| 2 | C ← B |
|   | B ← A |
|   | A ← E |
|   | D ← Q |
|   | QS ← QS ← 1 |
|   | PATTERN ANALYZER CTI |
|   | If QS not = 0, go to 2 |
|   | If QS = 0, then CTI = 8 |
|   | and go to 3 |
| 3 | PATTERN ANALYZER |

What is claim is:

1. A method using a digital data processing means for separating words with acceptable spellings from words with nonacceptable spellings wherein each word comprises characters assigned character positions, character position in each word being assigned increasing values from one end of the word to the other, characters at the same number of positions from one end of each word being assigned the same value, the two words to be compared being called a query word and a candidate word, the method comprising the steps of:

(a) comparing representation of a character in a given character position of the query word with representations of characters in the next lower character position, the same character position, and the next higher character position in the candidate word, and forming a compare type indication representing a match or a mismatch between such query word character and each of such candidate word characters under comparison;

(b) changing the given character position of the query word under comparison in the preceding step of comparing to the next higher valued character position of the query word and repeating the preceding step of comparing at least once to form another compare type indication; and (c) processing and utilizing said compare type indications to thereby form a spelling classification indication for one of the words under comparison representing an acceptable spelling or a nonacceptable spelling.

2. A method according to claim 1 comprising the steps of:

repeating the preceding step of comparing, the step of changing and the step of processing and utilizing, for each of a plurality of different candidate words, to thereby form a spelling classification indication, for each of said plurality of candidate words; and utilizing the spelling classification indication for each of said plurality of candidate words for physically separating representations of those candidate words indicated to be acceptable spellings from representations of those candidate words indicated to be nonacceptable spellings of the query word.

3. A method according to claim 2 comprising the step of combining a representation of each of said plurality of candidate words which are indicated to be an acceptable spelling with a representation of the corresponding spelling classification indication.

4. A method according to claim 3 wherein the step of physically separating comprises the step of physically transferring the combined representations of candidate words and acceptable spelling classifications.

5. A method according to claim 1 wherein the step of comparing and forming a compare type indication comprises the additional steps of:
   forming for a query character under comparison a compare type representation comprising a lower storage position, a same storage position, and a next higher storage position which correspond respectively to such next lower character position, the same character position, and the next higher character position in the candidate word,
   forming in each binary storage position a binary representation of a first value when the comparison with the candidate character in the corresponding character position of the candidate word results in an equality, and
   forming in each storage position a binary representation of a second value when the comparison with the candidate character in the corresponding character position of the candidate word results in an inequality.

6. A method according to claim 1 wherein first and second compare type indications are formed using, respectively, a query character in a first character position and a second query character in a second higher valued character position of the query word, the steps of processing and utilizing comprising the steps of:
   utilizing at least the first compare type indication for forming a first tentative spelling classification indication; and
   utilizing at least the second compare type indication and the first tentative spelling classification indication for forming a second tentative spelling classification indication.

7. A method according to claim 6 including the step of utilizing the second tentative spelling classification indication in forming said spelling classification indication.

8. A method according to claim 1 comprising the step of forming a digitally coded signal representative of the spelling classification indication.

9. A method according to claim 1 comprising the step of forming a spelling classification indication comprising a digitally coded signal identifying any one of at least the following acceptable spelling errors between the query word and the candidate word:
   a character insertion error,
   a character deletion error, and
   a character transposition error.

10. A method according to claim 9 wherein the acceptable spelling errors include equality and inequality between the characters and their order in the candidate word and the query word.

11. A method according to claim 1 wherein the step of processing and utilizing said compare type indications to form a spelling classification indication is partially performed following the formation of each compare type indication for each query character.

12. A method according to claim 1 comprising the additional step of accumulating the compare type indications in a store, and wherein the step of processing and utilizing said compare type indications comprises the step of processing and utilizing the compare type indications after they have been accumulated in the store.

13. A method using a digital data processing means for separating words with acceptable spellings from words with nonacceptable spellings wherein each word comprises characters assigned character positions, character positions in each word being assigned increasing values from one end of the word to the other, character at the same number of positions from one end of each word being assigned the same value, two words to be compared being called a query word and a candidate word, the method comprising the steps of:
   (a) comparing representations of each of plural given characters in each of different given character positions of the query word with representations of characters in the candidate word;
   (b) forming representations of a plurality of compare type indications, a different compare type indication for each of said plural given characters of the query word, each compare type indication representing whether a match was found in the step of comparing between one of the given characters of the query word and the three characters of the candidate word located in the next lower character position than, the same character position as, and the next higher character position than, such given character of the query word; and
   (c) processing and utilizing said compare type indications in order of the corresponding given characters of the query to form a spelling classification indication for one of the words under comparison representing an acceptable spelling or a nonacceptable spelling.

14. A method according to claim 13 wherein the digital data processing means is programmable and comprising the steps of:
   initiating the execution of a compare procedure enabling the data processing means to perform such steps of comparing representations and forming representations of a plurality of compare type indications.

15. A method according to claim 14 comprising the steps of initiating the operation of a branching procedure for performing the step of processing and utilizing said compare type indications, said branching procedure having a plurality of nodal junctions, each nodal junction having plural branches therefrom to one or more other nodal junctions, a different one of the plurality of nodal junctions being reached for each of said compare type indications, the particular branch which is taken from one nodal junction to another being conditioned upon the value represented by a compare type indication and the one nodal junction.

16. Digital data processing means for separating words with acceptable spellings from words with nonacceptable spellings wherein each word comprises characters assigned character positions, character positions in each word being assigned increasing values from one end of the word to the other, characters at the same number of positions from one end of each word being assigned the same value, two words to be compared being called a query word and a candidate word, comprising:
   (a) means operative for comparing a representation of a character in a given character position of the query word with representations of characters in the next lower character position, the same character position, and the next higher character position in the candidate word, and for forming a compare type indication representing a match or a mismatch between such query word character and each of such candidate word characters under comparison;
(b) means for changing the given character position of the query word under comparison by the means for comparing to the next higher valued character position of the query word, the means for comparing comprising means operative for repeating the recited operation using the next higher valued character position of the query word to form another compare type indication; and
(c) means for processing and utilizing said compare type indications to thereby form a spelling classification indication for one of the words under comparison representing an acceptable spelling or a nonacceptable spelling.

17. Digital data processing means according to claim 16 comprising:
means for enabling a repeat of the recited operation for the comparing means, for the means for changing and for the means for processing for each of a plurality of different candidate words to thereby form a spelling classification indication for each of said plurality of candidate words; and
means for utilizing the spelling classification indication for each of said plurality of candidate words for physically separating representations of those candidate words indicated to be acceptable spellings from representations of those candidate words indicated to be nonacceptable spellings of the query word.

18. Digital data processing means according to claim 17 comprising means for combining a representation of each of said plurality of candidate words which are indicated to be an acceptable spelling with a representation of the corresponding spelling classification indication.

19. Digital data processing means according to claim 18 wherein the means for physically separating comprises means for physically transferring the combined representations of candidate words and acceptable spelling classifications.

20. Digital data processing means according to claim 16 wherein the means for comparing and forming a compare type indication comprises:
means for forming for a query character under comparison a compare type representation comprising a lower storage position, a same storage position, and a next higher storage position corresponding, respectively, to such next lower character position, the same character position, and the next higher character position in the candidate word, and
means for forming in each storage position a binary representation of a first value when the comparison with the candidate character in the corresponding character position of the candidate word results in an equality, and
means for forming in each storage position a binary representation of a second value when the comparison with the candidate character in the corresponding character position of the candidate word results in an inequality.

21. Means according to claim 16 wherein the first and second compare type indications are formed using a query character in a first character position and a second query character in a second higher valued character position of the query word, the means for processing and utilizing comprising:
means for utilizing at least the first compare type indication for forming a first tentative spelling classification indication; and
means for utilizing at least the second compare type indication and the first tentative spelling classification indication for forming a second tentative spelling classification indication.

22. Means according to claim 21 comprising means for utilizing the second tentative spelling classification indication in forming said spelling classification indication.

23. Means according to claim 16 comprising means for forming a digitally coded signal representative of the spelling classification indication.

24. Means according to claim 16 comprising means for forming a spelling classification indication comprising a digitally coded signal identifying any one of at least the following acceptable spelling errors between the query word and the candidate word:
a character insertion error,
a character deletion error, and
a character transposition error.

25. Digital data processing means according to claim 34 wherein the acceptable spelling errors include equality between the characters and their order in the candidate word and the query word.

26. Digital data processing means according to claim 16 wherein the operation of the means for processing and utilizing said compare type indications to form spelling classification indications is partially performed following the formation of each compare type indication for each query character.

27. Digital data processing means according to claim 16 comprising a store, means for accumulating the compare type indications in the store, and wherein the means for processing and utilizing said compare type indications comprises means for processing and utilizing the compare type indications after they have been accumulated in the store.

28. Digital data processing means for separating words with acceptable spellings from words with nonacceptable spellings wherein each word comprises characters assigned character positions, character positions in each word being assigned increasing values from one end of the word to the other, characters at the same number of positions from one end of each word being assigned the same value, two words to be compared being called a query word and a candidate word, comprising:
(a) means operative for comparing representations of each of plural given characters in each of different given character positions of the query word with representations of characters in the candidate word;
(b) means for forming representations of a plurality of compare type indications, a different compare type indication for each of said plural given characters of the query word, each compare type indication representing whether a match was found by the comparing means between one of the given characters of the query word and the three characters of the candidate word located in the next lower character position than, the same character position as, and the next higher character position than, such given character of the query word; and (c) means for processing and utilizing said compare type indications in order of the corresponding given characters of the query to form a spelling classification indication for one of the words under comparison representing an acceptable spelling or a nonacceptable spelling.

29. Means according to claim 28 wherein the digital data processing means is programmable and comprising:

means for initiating the execution of a compare procedure enabling the digital data processing means to perform such steps of comparing representations and forming representations of a plurality of compare type indications.

30. Means according to claim 29 comprising means for initiating the operation of a branching procedure for performing the step of processing and utilizing said compare type indications, said branching procedure having a plurality of nodal junctions, each nodal junction having plural branches therefrom to one or more other nodal junctions, a different one of the plurality of nodal junctions being reached for each of said compare type indications, the particular branch which is taken from one nodal junction to another being conditioned upon the value represented by a compare type indication and the one nodal junction.

31. A method using a digital data processing means for separating words with acceptable spellings from words with nonacceptable spellings wherein each word comprises characters assigned character positions, character positions in each word being assigned increasing values from one end of the word to the other, characters at the same number of positions from one end of each word being assigned the same value, the two words to be compared being called a query word and a candidate word, the method comprising the steps of:

(a) storing the query word in a store in the processing means;

(b) storing candidate words in a store in the processing means;

(c) enabling the data processing means to operatively compare a representation of a character in a given character position of the stored query word with representations of characters in the next lower character position, the same character position, and the next higher character position in each of the stored candidate words, and form a compare type indication representing a match or a mismatch between such query word character and each of such candidate word characters under comparison;

(d) enabling the processing means to change the given character position of the stored query word in the preceding operation of comparing in sequence to higher valued character positions of the stored query word and for each such character position repeat the preceding step of comparing to form a plurality of compare type indications for each of the stored candidate words; and (e) enabling the processing means to process and utilize the plurality of compare type indications formed for each of the stored candidate words to thereby form a spelling classification indication for each of the candidate words representing an acceptable spelling or a nonacceptable spelling.

* * * * *

UNITED STATES PATENT AND TRADEMARK OFFICE
CERTIFICATE OF CORRECTION

PATENT NO. : 4,471,459

DATED : September 11, 1984

INVENTOR(S) : Dickinson et al

It is certified that error appears in the above-identified patent and that said Letters Patent is hereby corrected as shown below:

Col. 18, line 11, "an" should be -- and --;
Col. 18, line 53, "13" (both occurrences) should be -- $\underline{\phantom{1}}$ --;
col. 20, lines 58,59, "13" (both occurrences) should be -- $\underline{\phantom{1}}$ --;
        line 66, "13" should be -- $\underline{\phantom{1}}$ --;
Col. 21, line 12, "13" should be -- $\underline{\phantom{1}}$ --;
        lines 18, 19, "13" should be -- $\underline{\phantom{1}}$ --;
        line 56, "13" should be -- $\underline{\phantom{1}}$ --;
col. 23, line 47, "fices" should be -- fixes --;
col. 31, line 45, "strapped" should be -- stripped --;
col. 33, line 13, after "be" insert -- eventually --;
col. 36, line 19, "13" should be -- $\underline{\phantom{1}}$ --;
col. 37, line 59, "SIZE-1" should be -- SIZE+1 --;
        line 59, "13" should be -- $\underline{\phantom{1}}$ --;
col. 43, line 22, after "for" insert -- the --;
col. 49, line 11, "-/S" should be -- $\underline{\phantom{1}}$/S --;
col. 76, line 14, "Entrv" should be -- Entry --;
col. 79, about line 9, after "INTERESTED" insert -- COMPUTED --; about line 11, delete "COMPUTED"; about line 12, after "RATING" insert -- DISPOSING --; about line 13, delete "DISPOSING";
col. 81, line 65, after "comparing" insert -- a --;
col. 84, line 8, "character" should be -- characters --;

UNITED STATES PATENT AND TRADEMARK OFFICE
CERTIFICATE OF CORRECTION

PATENT NO. : 4,471,459

DATED : September 11, 1984

INVENTOR(S) : Dickinson et al

Page 2 of 2

It is certified that error appears in the above-identified patent and that said Letters Patent is hereby corrected as shown below:

```
Col. 85, line 65, "Means" should be -- Digital data processing
means --;
Col. 86, line 10, "Means" should be -- Digital data processing
means --;
         line 14, "Means" should be -- Digital data processing
means --;
         line 17, "Means" should be -- Digital data processing
means --;
Col. 86, line 27, "34" should be -- 24 --;
Col. 87, line 21, after "plurality of" insert -- the --.
```

Signed and Sealed this

Fourth Day of June 1985

[SEAL]

Attest:

DONALD J. QUIGG

Attesting Officer

Acting Commissioner of Patents and Trademarks